(12) United States Patent
Takeda et al.

(10) Patent No.: US 6,655,800 B2
(45) Date of Patent: Dec. 2, 2003

(54) LENS CONNECTING DEVICE AND A METHOD OF CONNECTING LENS FOR RIMLESS GLASSES

(75) Inventors: Kinji Takeda, Fukui (JP); Yukiko Kori, Fukui (JP)

(73) Assignee: Kabushiki Kaisha Takeda Kikaku, Fukui (JP)

( * ) Notice: Subject to any disclaimer, the term of this patent is extended or adjusted under 35 U.S.C. 154(b) by 0 days.

(21) Appl. No.: 10/152,917

(22) Filed: May 23, 2002

(65) Prior Publication Data
US 2002/0176047 A1 Nov. 28, 2002

(30) Foreign Application Priority Data
May 23, 2001 (JP) ........................................ 2001-154065

(51) Int. Cl.[7] ................................................ G02C 1/04
(52) U.S. Cl. ........................................ 351/110; 351/41
(58) Field of Search ............................ 351/110, 41, 86, 351/83, 103, 106, 108, 109, 124

(56) References Cited

U.S. PATENT DOCUMENTS 6,007,200 A * 12/1999 Tachibana ................... 351/110
6,210,002 B1 * 4/2001 Tachibana ................... 351/110

* cited by examiner

*Primary Examiner*—Hung Xuan Dang
(74) *Attorney, Agent, or Firm*—William H. Holt

(57) ABSTRACT

A lens connecting device and a method of connecting lenses for rimless glasses. Connecting means comprises a base plate to which a cylindrical element is provided to project, and a detent opening provided in the base plate. By pressingly inserting a shaft element into an insertion opening of the cylindrical element in a state that the cylindrical element is inserted into a circular-shaped connecting opening, the end part and the base plate can be integrated therewith. The shaft element is provided at the end part of the bracket to project, and the connecting opening is provided in the edge part of the lens. An opening is bored in the lens using the detent opening as a guide means by rotating the end part around the axis of the connecting opening.

26 Claims, 51 Drawing Sheets

LENS CONNECTING DEVICE AND A METHOD OF CONNECTING LENS FOR RIMLESS GLASSES

BACKGROUND OF THE INVENTION (1) Field of the Invention

This invention relates to a lens connecting device and a method of connecting lens for rimless glasses, what are called two-point glasses, in which end portions of a bridge or end portions of temples are connected to lenses.

(2) Prior Art

In the rimless glasses what are called two-point glasses, right and left plastic lenses are connected to each other with a bridge at inside edges of the lenses and an end part of each of brackets is connected to each of outside edges of the lenses. Generally, a connecting device of the lenses of the rimless glasses what are called two-point glasses was conventionally structured as follows.

Namely, as shown in FIGS. 49 and 50, a connecting section (a) was structured so that a curved contact element (c) for a detent function being in contact with a lens flank (b) was brazed to an end of a main body (d) of the connecting section, and a connecting element (f) was brazed to the contact element (c). The connecting element (f) projected toward a center of a lens and had a through opening (e) at an end of the projection thereof. In order to connect the connecting section (a) of such a structure to a lens (g), as shown in FIG. 50, a connecting screw (k) was inserted into a connecting opening (h) provided in the lens (g) from one end of the connecting opening (h) via a resin washer (j). Then the resin washer (j) was mounted to a screw shaft (m) of the connecting screw (k) projecting from the other end of the connecting opening (h), and a nut (n) was screwed down to an end of the screw shaft (m) projecting from the resin washer (j), by which the connecting section (a) was fixed to the lens (g). In that state of fixing, detent of the connecting section (a) was obtained by an engaging effect of the contact element (c) which was in contact with the lens flank (b).

However, according to the above-mentioned conventional connecting structure, it was necessary to bore the connecting opening (h) in the lens (g) after accurately determine a position of the connecting opening (h) according to a distance between the contact element (c) and the through opening (e). If the connecting opening (h) is formed too close to the edge of the lens (g), the contact element (c) can not be in contact with the lens flank (b) properly, whereby the contact element (c) does not work as a detent as required, and there arises a problem of shakiness in the connecting structure. To the contrary, if the connecting opening (h) is too far from the edge of the lens (g), there arises a problem that a position of the through opening (e) can not match the position of the connecting opening (h) while keeping the contact element (c) in contact with the lens flank (b). In both cases, required connection could not be attained.

To solve the above-mentioned problem, rimless glasses without the above-mentioned contacting element (c) is presented under Japanese Utility Model Registration No. 3003032.

As shown in FIG. 51, the rimless glasses was structured in such a manner, for example, that a through opening (r) was provided in a connecting section (q) being an end portion of a bracket (p), and each of engaging projections (s), (s) was mounted to each of upper and lower parts of the through opening (r) for a purpose of detent. Further, a connecting opening (h) was provided at the edge part of the lens (g) so that a position thereof could match a position of the through opening (r). Furthermore, on each of the upper and lower parts of the connecting opening (h), each of fixing openings (t) and (t) was provided. In order to connect the connecting section (q) having the above-mentioned structure to the lens (g), each of the upper and the lower engaging projections (s), (s) was put into each of the upper and lower fixing openings (t), (t). Next, from one side of the lens, a connecting screw (u) was inserted into the through opening (r) and the connecting opening (h), which were continued to each other. Then, a washer (v) was mounted to a screw shaft of the screw (u) projecting from the other side of the lens, and a nut (w) was screwed down to the screw shaft projecting from the washer (v), by which the bracket (p) could be connected to the lens (g) while keeping a detent function.

The rimless glasses according to the above-mentioned structure had an advantage that when the connecting opening (h) was made in the lens (g), the connecting section (q) could be connected to the lens (g) as required even if the boring position of the opening (h) deviated a little in a direction of width of the lens as far as the upper and lower fixing openings (t) (t) were made properly as required, because the rimless glasses did not have the contact element (c) for a purpose of detent.

As another embodiment of rimless glasses without the contact element (c), Japanese Patent Laid-Open No. 7-218870 is presented. The rimless glasses were structured in a manner that a square-shaped opening was formed at a edge part of a lens, into which a square-shaped cylinder was inserted, which cylinder was mounted, for instance, onto the end of a bracket to project. Then the square-shaped cylinder was connected to the lens by using a connecting screw and a nut in a state of having detent function.

The rimless glasses according to the above-mentioned structure had an advantage that when the square-shaped opening (h) was made in the lens, the connecting section could be connected to the lens in a state of having a detent function as required, even if boring position of the square-shaped opening deviated a little in a direction of width of the lens because the rimless glasses did not have the contact element (c) to function as a detent.

However, according to the above-mentioned Japanese Utility Model Registration No. 3003032, it was very difficult to form the upper and lower fixing openings (t), (t) after determining positions thereof so that the upper and lower fixing openings (t), (t) can precisely fit to the upper and lower engaging projections (s), (s) mounted to the connecting section in consideration of a direction of sideways projection of the bracket (p) from the lens. That was because a surface of the connecting element (q) to be in contact with the lens surface had to be formed to make a curving surface according to a curve of the lens so that the surface of the connecting element (q) can be in contact with the lens surface. That was also because the upper and lower fixing openings (t), (t) provided in the lens also had to be bored in consideration of the curve of the lens, in view of the upper and lower engaging projections (s), (s) being formed to project so as to form a right angle to the curving surface,. Consequently, such an unecomonical events occurred that expensive lenses became inferior goods due to wrong boring of the fixing openings.

In the meantime, in the rimless glasses according to the above-mentioned Japanese Patent Laid-Open No. 7-218870, as the opening for connecting the connecting section of the bracket or the like to the lens was not a simple circular-shaped opening but a square-shaped opening, the square-shaped opening was not be able to be easily formed by a drill wherefore a special tool was required. Further, the square-shaped opening had to be bored by precisely fixing a direction thereof so as to precisely set up a direction of outward projection of the bracket or the like vis-à-vis the lens. The boring work required skills and could not be done easily at retailers.

SUMMARY OF THE INVENTION

The present invention has been developed in view of the above-mentioned problems. A purpose of the present invention is to provide a lens connecting device and a method of connecting lens for rimless glasses, which are not equipped with a contact element to work as a detent, in which an opening for purpose of detent can be precisely and easily formed with a lens by means of late working processes.

In order to solve the above-mentioned problems, this invention adopts the following means.

Namely, according to this invention, in a lens connecting device for rimless glasses (hereinafter referred to as "a lens connecting device") in which right and left plastic lenses are connected to each other with a bridge at inside edges of the lenses and an end part of each of brackets is connected to each of outside edges of the lenses, the said device comprises connecting means for connecting an end part of the bridge and/or an end part of the bracket to the lens; said connecting means having a base plate, a connecting element inserted into a circular-shaped connecting opening which is formed with an edge part of the lens, said base plate being integrated with the end part(s) of the bridge an/or the bracket via the connecting element, a detent opening formed with a suitable portion of the base plate around the connecting element, said base plate also being structured to be rotatable by an axis of the connecting opening in a state that the base plate is integrated with the end part(s) of the bridge and/or the bracket, an opening formed with the lens by means of a drilling tool using the detent opening as a guide means thereto in a state that the end part(s) of the bridge and/or the bracket is(are) rotated and adjusted suitably, and a fixing shaft inserted into the opening and fixing a position of the connecting element.

The detailed first attitude of the invention is as follows. Namely, in a lens connecting device for rimless glasses in which right and left plastic lenses are connected to each other with a bridge at inside edges of the lenses and an end part of each of brackets is connected to each of outside edges of the lenses, said device comprises connecting means for connecting an end part of the bridge and/or an end part of the bracket to the lens; said connecting means having a base plate, said base plate having a cylindrical element which is inserted, in a tight fitting state, into a circular-shaped connecting opening which is formed with an edge part of the lens; said cylindrical element having an insertion opening, a shaft element provided with the end part(s) of the bridge and/or the bracket to project, a connecting element consisting of the cylindrical element and the shaft element, the base plate being integrated with the end part(s) of the bridge and/or the bracket via the connecting element by inserting under pressure the shaft element projecting from the end part(s) of the bridge and/or the bracket, into the insertion opening of the cylindrical element which is inserted into the connecting opening, a detent opening formed with a suitable portion of the base plate around the cylindrical element, the base plate also being structured to be rotatable by an axis of the connecting opening in a state that the base plate is integrated with the end part(s) of the bridge and/or the bracket, an opening formed with the lens by means of a drilling tool using the detent opening as a guide means thereto in a state that the end part(s) of the bridge and/or the bracket is(are) rotated and adjusted suitably, and a fixing shaft inserted into the opening and fixing a position of the connecting element.

The detailed second attitude of the invention is as follows.

Namely, in a lens connecting device for rimless glasses in which right and left plastic lenses are connected to each other with a bridge at inside edges of the lenses and an end part of each of brackets is connected to each of outside edges of the lenses, said device comprises connecting means for connecting an end part of the bridge and/or an end part of the bracket to the lens, the connecting means having a base plate from which a shaft element is projecting, the end part(s) of the bridge and/or the bracket having a cylindrical element which is inserted, in a tight fitting state, into a circular-shaped connecting opening which is formed with an edge part of the lens; said cylindrical element having an insertion opening, a connecting element consisting of the cylindrical element and the shaft element, the base plate being integrated with the end part(s) of the bridge and/or the bracket via the connecting element by inserting under pressure the shaft element projecting from the end part(s) of the bridge and/or the bracket, into the insertion opening of the cylindrical element which is inserted into the connecting opening, a detent opening formed with a suitable portion of the base plate around the shaft element, the base plate also being structured to be rotatable by an axis of the connecting opening in a state that the base plate is integrated with the end part(s) of the bridge and/or the bracket, an opening formed with the lens by means of a drilling tool using the detent opening as a guide means thereto in a state that the end part(s) of the bridge and/or the bracket is(are) rotated and adjusted suitably, and a fixing shaft inserted into the opening and fixing a position of the connecting element.

The detailed third attitude of the invention is as follows.

Namely, in a lens connecting device for rimless glasses in which right and left plastic lenses are connected to each other with a bridge at inside edges of the lenses and an end part of each of brackets is connected to each of outside edges of the lenses, said device comprises connecting means for connecting an end part of the bridge and/or an end part of the bracket to the lens, the connecting means having a base plate from which a screw shaft is projecting, which screw shaft is inserted into a circular-connecting opening formed with an edge part of the lens; the insertion of the screw shaft being made in an engaging state that detent of the screw shaft and the end par(s) of the bridge and/or the bracket may be carried out by inserting a tip part of the screw shaft into the insertion opening of the end part(s) after inserting the screw shaft into the connecting opening, a nut for the screw shaft, a connecting element consisting of the screw shaft and the nut, the base plate being integrated with the end part(s) of the bridge and/or the bracket via the connecting element by stopping disengagement of the screw shaft by screwing the nut onto the screw shaft projecting from the end part(s), a detent opening formed with a suitable portion of the base plate around the screw shaft, the base plate also being structured to be rotatable by an axis of the connecting opening in a state that the base plate is integrated with the end part(s) of the bridge and/or the bracket, an opening formed with the lens by means of a drilling tool using the detent opening as a guide means thereto in a state that the end part(s) of the bridge and/or the bracket is(are) rotated and adjusted suitably, and a fixing shaft inserted into the opening and fixing a position of the connecting element.

The detailed fourth attitude of the invention is as follows.

Namely, In a lens connecting device for rimless glasses in which right and left plastic lenses are connected to each other with a bridge at inside edges of the lenses and an end part of each of brackets is connected to each of outside edges of the lenses, said device comprises connecting means for connecting an end part of the bridge and/or an end part of the bracket to the lens, the connecting means having a base plate with which an insertion opening is formed, a screw shaft provided with the end part(s) of the bridge and/or the bracket, which screw shaft is inserted into a circular-connecting opening formed with an edge part of the lens; the insertion of the screw shaft being made in an engaging state that detent of the screw shaft and the base plate may be carried out by inserting a tip part of the screw shaft into the insertion opening of the base plate after inserting the screw shaft into the insertion opening, a nut for the screw shaft, a connecting element consisting of the screw shaft and the nut, the base plate being integrated with the end part(s) of the bridge and/or the bracket via the connecting element by stopping disengagement of the screw shaft by screwing the nut onto the screw shaft projecting from the base plate, a detent opening formed with a suitable portion of the base plate around the insertion opening, the base plate also being structured to be rotatable by an axis of the connecting opening in a state that the base plate is integrated with the end part(s) of the bridge and/or the bracket, an opening formed with the lens by means of a drilling tool using the detent opening as a guide means thereto in a state that the end part(s) of the bridge and/or the bracket is(are) rotated and adjusted suitably, and a fixing shaft inserted into the opening and fixing a position of the connecting element.

The detailed fifth attitude of the invention is as follows.

Namely, in a lens connecting device for rimless glasses in which right and left plastic lenses are connected to each other with a bridge at inside edges of the lenses and an end part of each of brackets is connected to each of outside edges of the lenses, said device comprises connecting means for connecting an end part(s) of the bridge and/or an end part of the bracket to the lens, a connecting screw having a screw shaft which is inserted into a circular-shaped connecting opening formed with the end part(s), the connecting means having a base plate with which an insertion opening is formed for inserting the screw shaft; the insertion of the screw shaft into the insertion opening being made in an engaging state that detent of the screw shaft and the insertion opening may be carried out, the screw shaft of the connecting screw being structured to be inserted into a tip part of the screw shaft into the insertion opening after inserting the screw shaft into the insertion opening in an engaging that the detent of the screw shaft and the end part(s) may be carried out; the insertion of the screw shaft into the insertion opening of the end part(s) being made in an engaging state that detent of the screw shaft and the end part(s) may be carried out, a nut for the screw shaft, a connecting element consisting of the screw shaft and the nut, the base plate being integrated with the end part(s) of the bridge and/or the bracket via the connecting element by stopping disengagement of the screw shaft by screwing the nut onto the screw shaft projecting from the end part(s), a detent opening formed with a suitable portion of the base plate around the insertion opening, the base plate also being structured to be rotatable by an axis of the connecting opening in a state that the base plate is integrated with the end part(s) of the bridge and/or the bracket, an opening formed with the lens by means of a drilling tool using the detent opening as a guide means thereto in a state that the end part(s) of the bridge and/or the bracket is(are) rotated and adjusted suitably, and a fixing shaft inserted into the opening and fixing a position of the connecting element.

The detailed sixth attitude of the invention is as follows.

Namely, in a lens connecting device for rimless glasses in which right and left plastic lenses are connected to each other with a bridge at inside edges of the lenses and an end part of each of brackets is connected to each of outside edges of the lenses, said device comprises connecting means for connecting an end part(s) of the bridge and/or an end part of the bracket to the lens; said connecting means having a base plate with which an insertion opening is formed, a connecting screw having a screw shaft, an insertion opening formed with the end part of the lens for inserting the screw shaft of the connecting screw which is inserted into a circular-shaped connecting opening formed with the edge part of the lens; the insertion of the screw shaft being made in an engaging state that detent of the screw shaft and the insertion opening may be carried out, a tip part of the screw shaft of the connecting screw being inserted into the insertion opening of the base plate; the insertion of the screw shaft being made in an engaging that detent of the screw shaft and the base plate may be carried out, a nut for the screw shaft, a connecting element consisting of the connecting screw and the nut, the base plate being integrated with the end part(s) of the bridge and/or the bracket via the connecting element by stopping disengagement of the screw shaft by screwing the nut onto the screw shaft projecting from the end part(s), a detent opening formed with a suitable portion of the base plate around the insertion opening, the base plate also being structured to be rotatable by an axis of the connecting opening in a state that the base plate is integrated with the end part(s) of the bridge and/or the bracket, an opening formed with the lens by means of a drilling tool using the detent opening as a guide means thereto in a state that the end part(s) of the bridge and/or the bracket is(are) rotated and adjusted suitably, and a fixing shaft inserted into the opening and fixing a position of the connecting element.

Further, to achieve the above object of the present invention, in a method of connecting a lens for rimless glasses in which at least one of a bridge for connecting right and left lenses of plastics and a bracket for connecting a temple to the lens is connected to an inside edge part of the lens or an outside edge part of the lens by means of connecting means which provides a base plate which is structured to be integrated with the end part(s) of the bridge and/or the bracket via s connecting element which is inserted into a circular-shaped connecting opening which is formed with the edge part of the lens, and in which a detent opening is formed with a suitable portion of the base plate around the connecting element so that the base plate may be rotatable about an axis of the connecting opening in a state that the end part(s) of the bridge and/or the bracket are integrated with the base plate, said method comprises the steps of forming an opening by means of a drilling tool for inserting a fixing shaft by using the detent opening of the connecting element as a guide means in a state that: the end part(s) of the bridge and/or the bracket are(is) rotated ar a suitable angle by the axis of the connecting opening, inserting the fixing shaft into the drilled opening, and then connecting the end part(s) of the bridge and/or the bracket to the lens in a suitable attitude.

This invention has excellent advantages as described below.

(1) The lens connecting means according to this invention comprises the connecting device in which the detent opening is provided in the base plate. The base plate is rotatable around the axis of the circular-shaped connecting opening (which is easy to be bored by drilling) provided in the lens in a state that the base plate is integrated with the end parts of the bracket or the bridge.

Accordingly, it is easy to rotate to adjust the end parts as necessary, and the opening for a purpose of detent can be precisely bored in the lens with a boring tool such as a drill and so on with the detent opening as a guide. Accordingly, as the opening can be precisely formed in a late process having the detent opening as a guide, such an uneconomical event does not happen that expensive lenses are damaged by a wrong boring work as in the case of the above-mentioned conventional rimless glasses in which a detent opening has to be bored in the lens in advance or as in the case of conventional rimless glasses in which a polygonal-shaped opening has to be bored.

By insertion (screwing or insertion under pressure) of the fixing shaft such as the self tapping screw, the screw shaft, or the fixing pin into the detent opening formed in the way as above-mentioned, a detent function of the bracket and the bridge can be obtained without fail in a state that angles of projecting directions of the bracket and the bridge from the sides of the lens are properly adjusted.

(2) When the base plate and the end part of the bracket or the end part of the bridge are connected by pressingly inserting the shaft element, which is provided with either one of the base plate or an end part thereof to project, into the cylindrical element which is provided with the other one of the base plate or an end part thereof to project, the connecting work can be done easily and without fail only by insertion under pressure.

(3) In case the base plate and the end part of the bracket or the end part of the bridge are connected by pressingly inserting a shaft element, which is provided with either one of the base plate or an end part thereof to project, into an insertion opening of a cylindrical element, which is provided with the other one of the base plate or an end part thereof to project, when the base end part of the insertion opening is embedded in the base plate, or when the base end part of the insertion opening is embedded in the end part, deep insertion under pressure can be done even when the lens is thick, whereby an enough friction force by the insertion under pressure is secured and the connection can be done firmly.

(4) In case the bracket or the bridge is arranged on a front side of the lens, when the detent opening is provided behind the bracket or the bridge so that the same cannot be seen from the front side of the glasses, the connecting part of the bracket or the bridge to the lens can be formed to be presentable.

(5) In case the connecting device is arranged on the rear surface of the lens, as the base plate can be formed as seen through the lens from the front side of the glasses, the connecting device can also work as an ornamental piece by properly designing the base plate, whereby the lens can be effectively decorated.

The other advantages of the present invention will be seen in the following description of the embodiments with reference to the drawings.

BRIEF DESCRIPTION OF THE DRAWINGS

The drawings show embodiments of a lens connecting device and a method of connecting lens for rimless glasses according to the present invention in which.

DETAILED DESCRIPTION OF THE PREFERRED EMBODIMENTS

Embodiments of the present invention are described below with reference to the drawings.
(First Embodiment)

Figure 1:
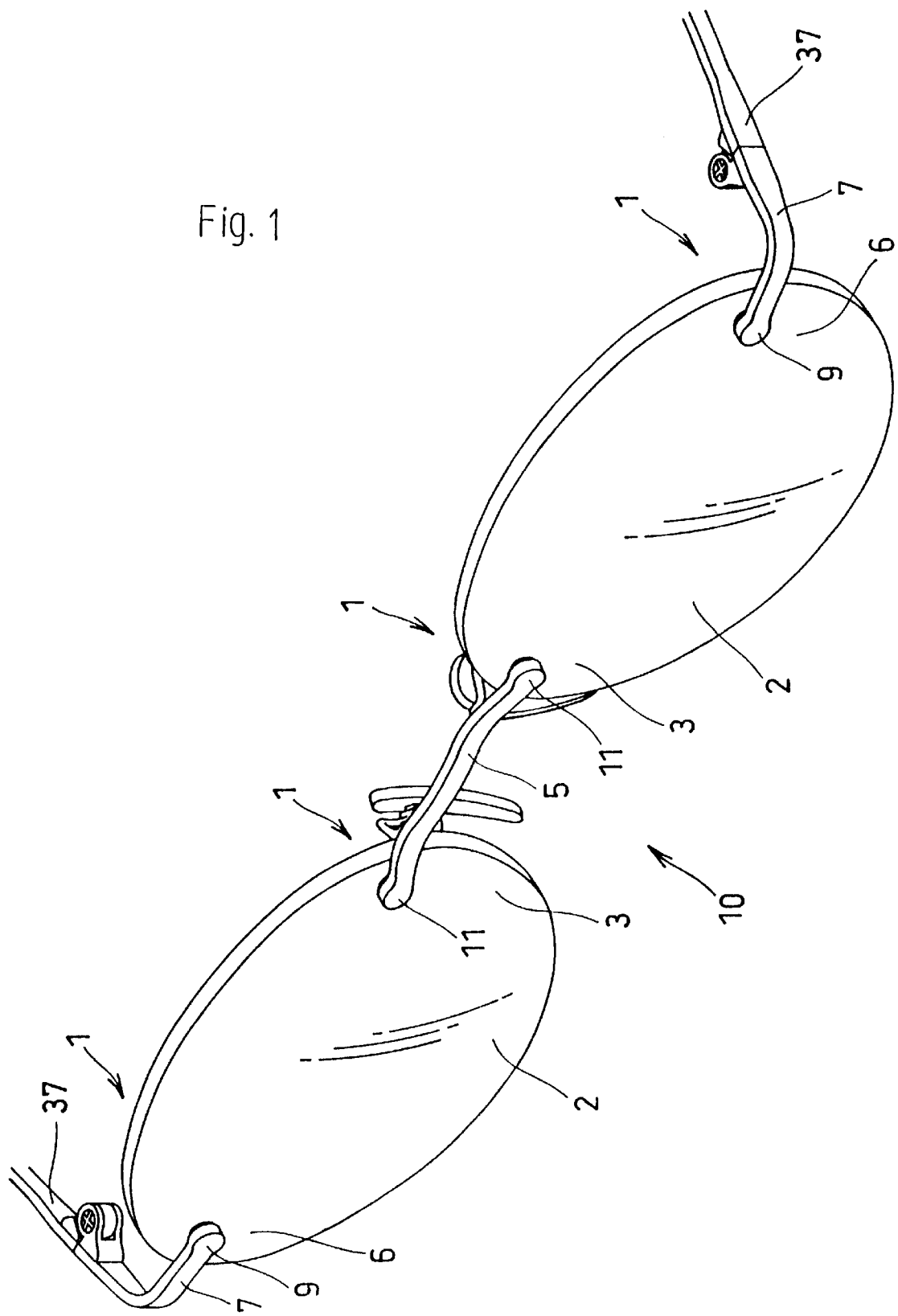
FIG. 1 shows a perspective view of rimless glasses using the lens connecting device according to this invention.
Figure 2:
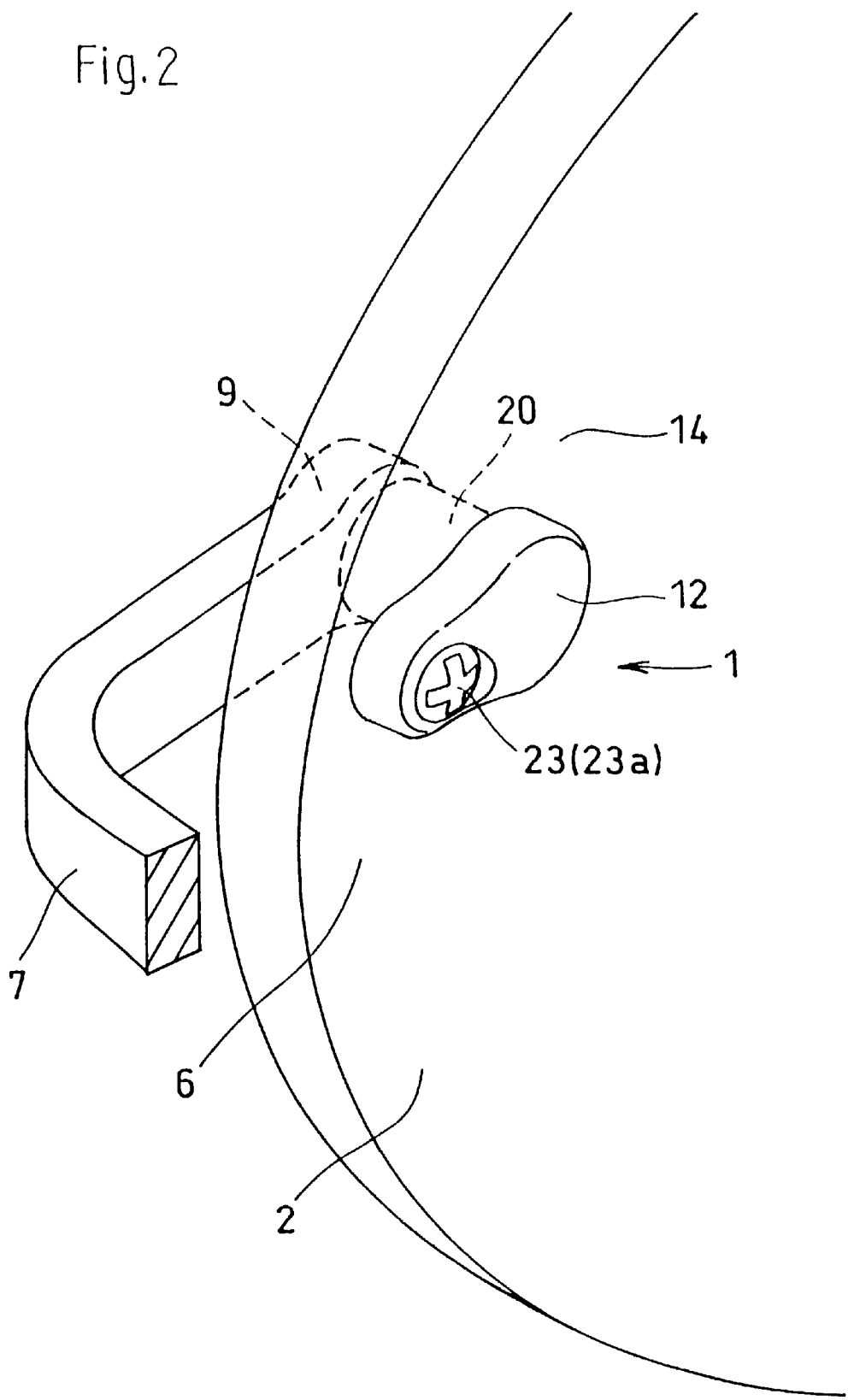
FIG. 2 shows a perspective view of the lens connecting device applied to a bracket.
Figure 3:
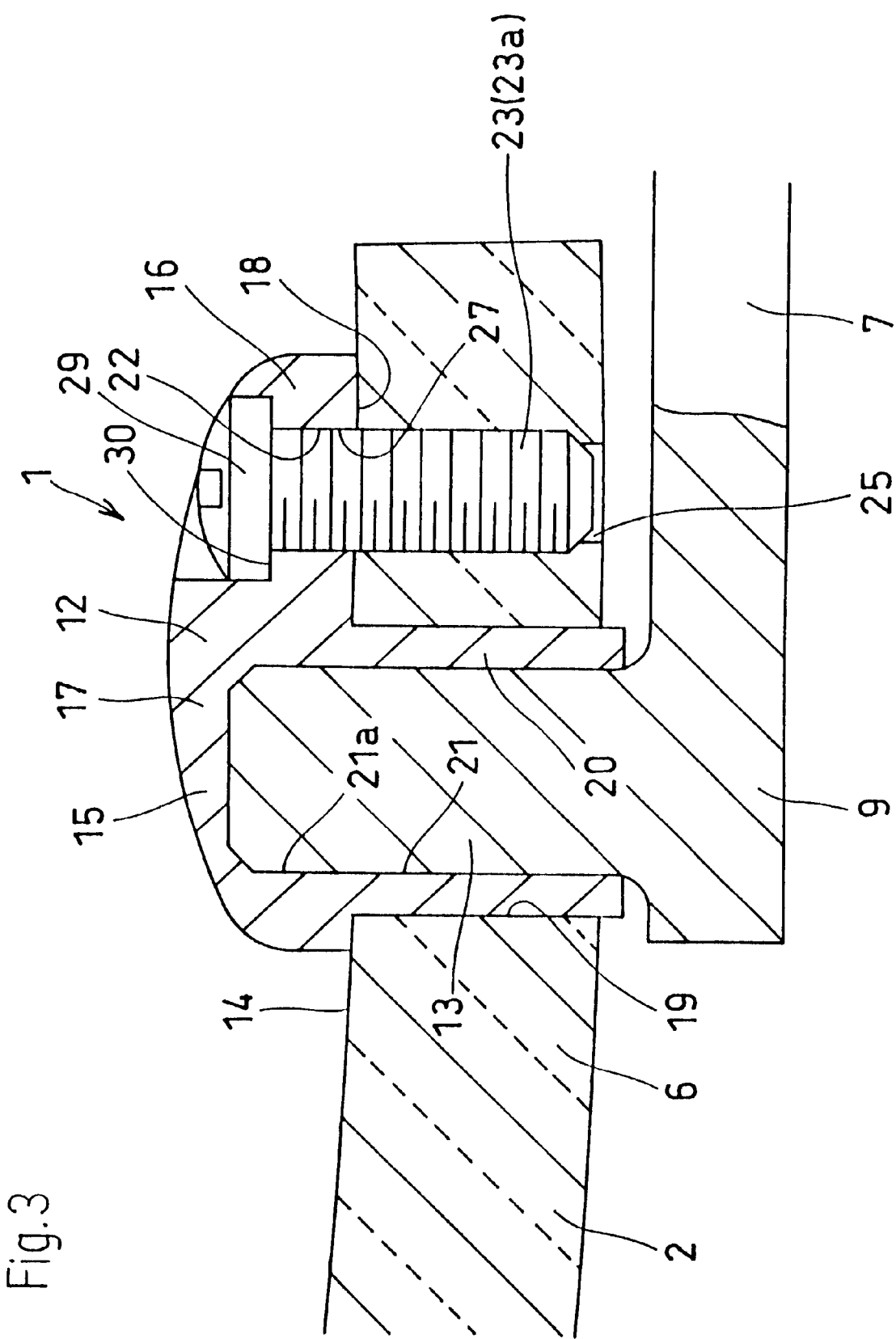
FIG. 3 shows a cross sectional view of the lens connecting device applied to the bracket.
Figure 4:
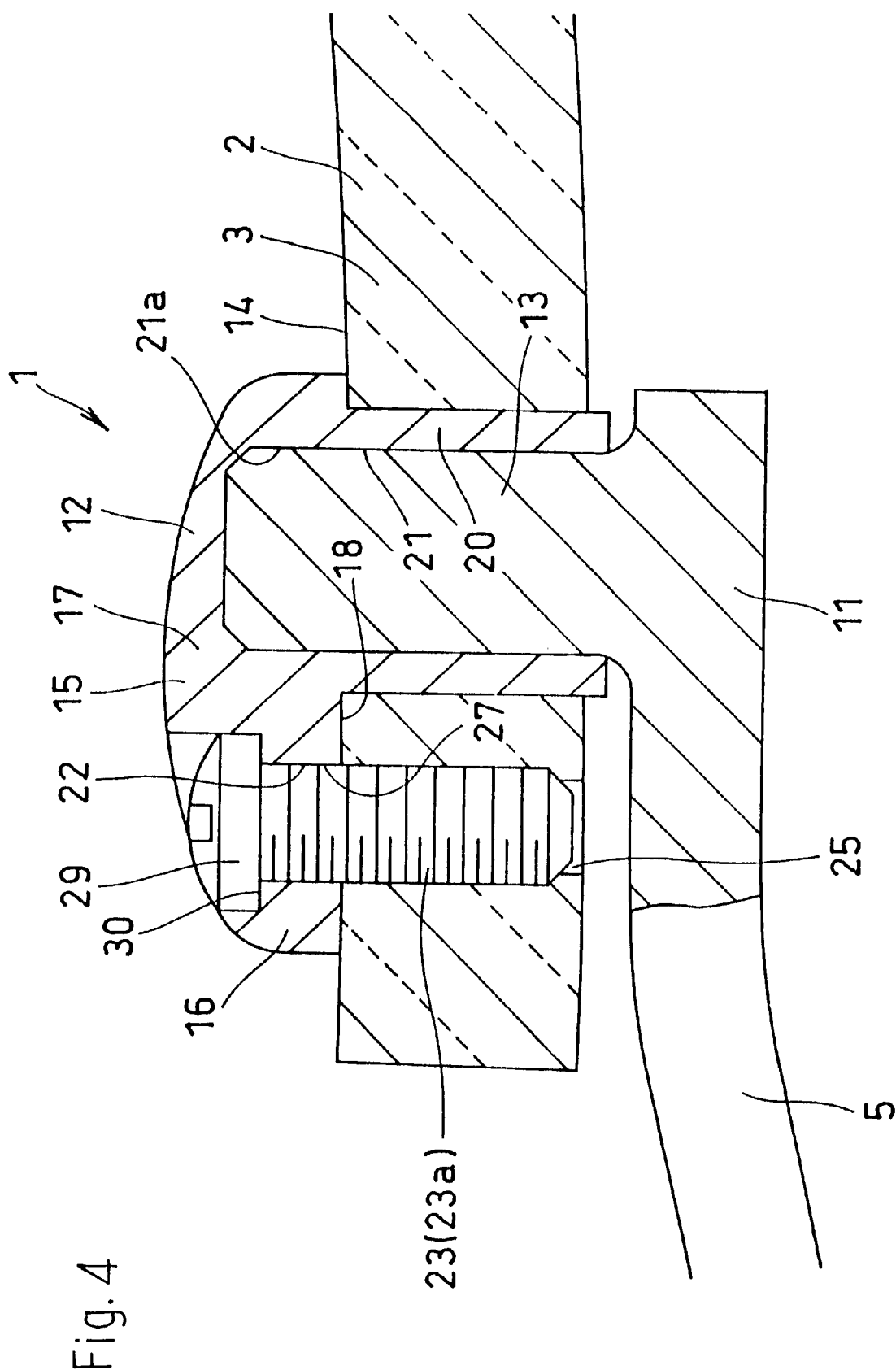
FIG. 4 shows a cross sectional view of the lens connecting device applied to a bridge.

In FIGS. 1 and 2, a lens connecting device 1 according to this invention is to connect each of an end part 9 of a bracket 7 and an end part 11 of the bridge 5 to a lens 2 by means of a connecting means 12 which is shown in FIGS. 2 to 4, when structuring a rimless glasses 10 what are called two-point glasses in which inner periphery parts 3, 3 of the right and left plastic lenses 2, 2 with each other by a bridge 5 and each of the end parts 9, 9 of the brackets 7, 7 is connected to each of outer periphery parts 6, 6 of the lenses 2, 2.

The end part 11 of the bridge 5 and the end part 9 of the bracket 7 are similarly structured. Therefore, following description mainly focuses on the end part 9 of the bracket 7 as a representative.

Figure 5:
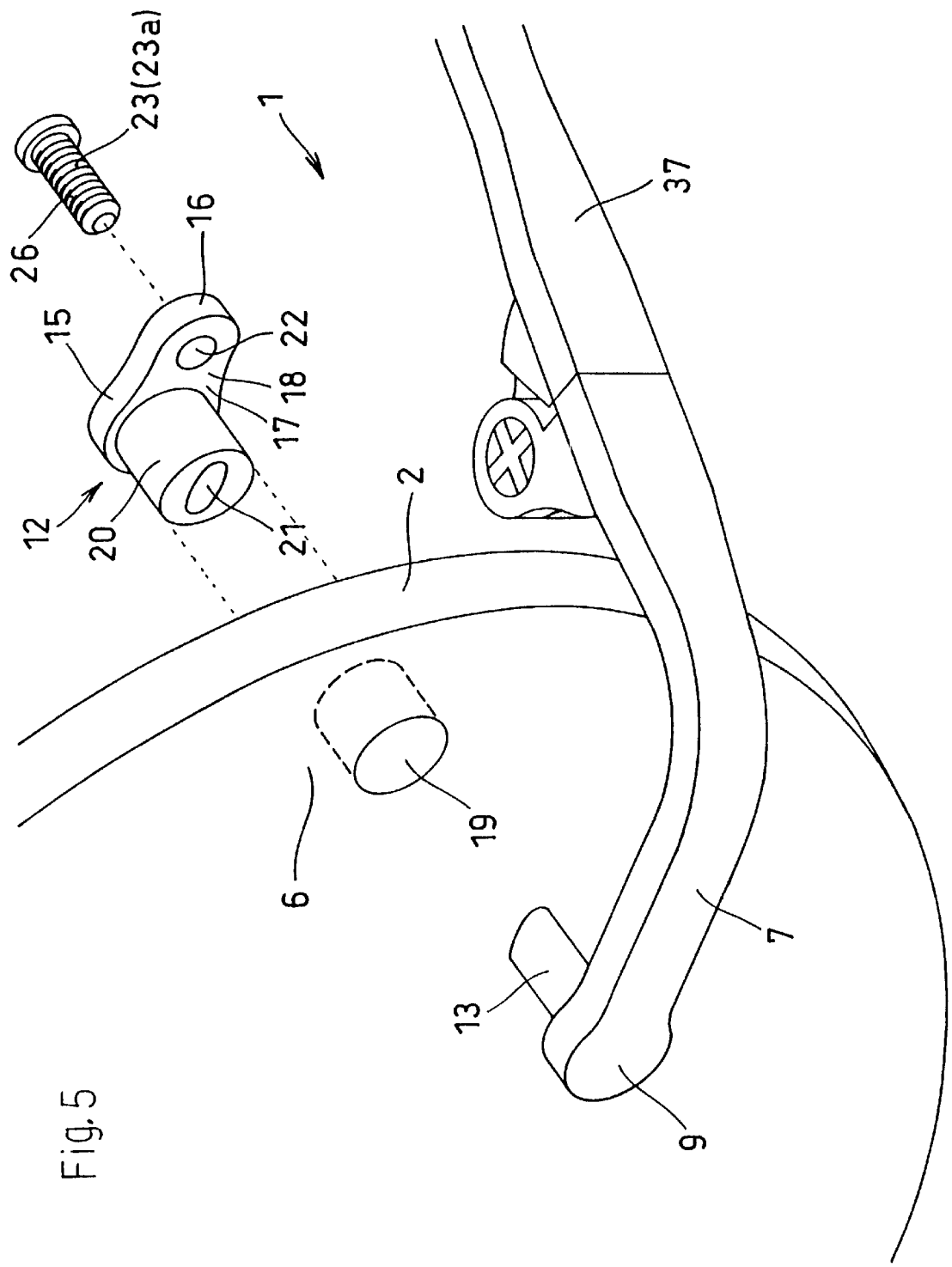
FIG. 5 shows a perspective view of the lens connecting device taken apart, which is applied to the bracket.
Figure 6:
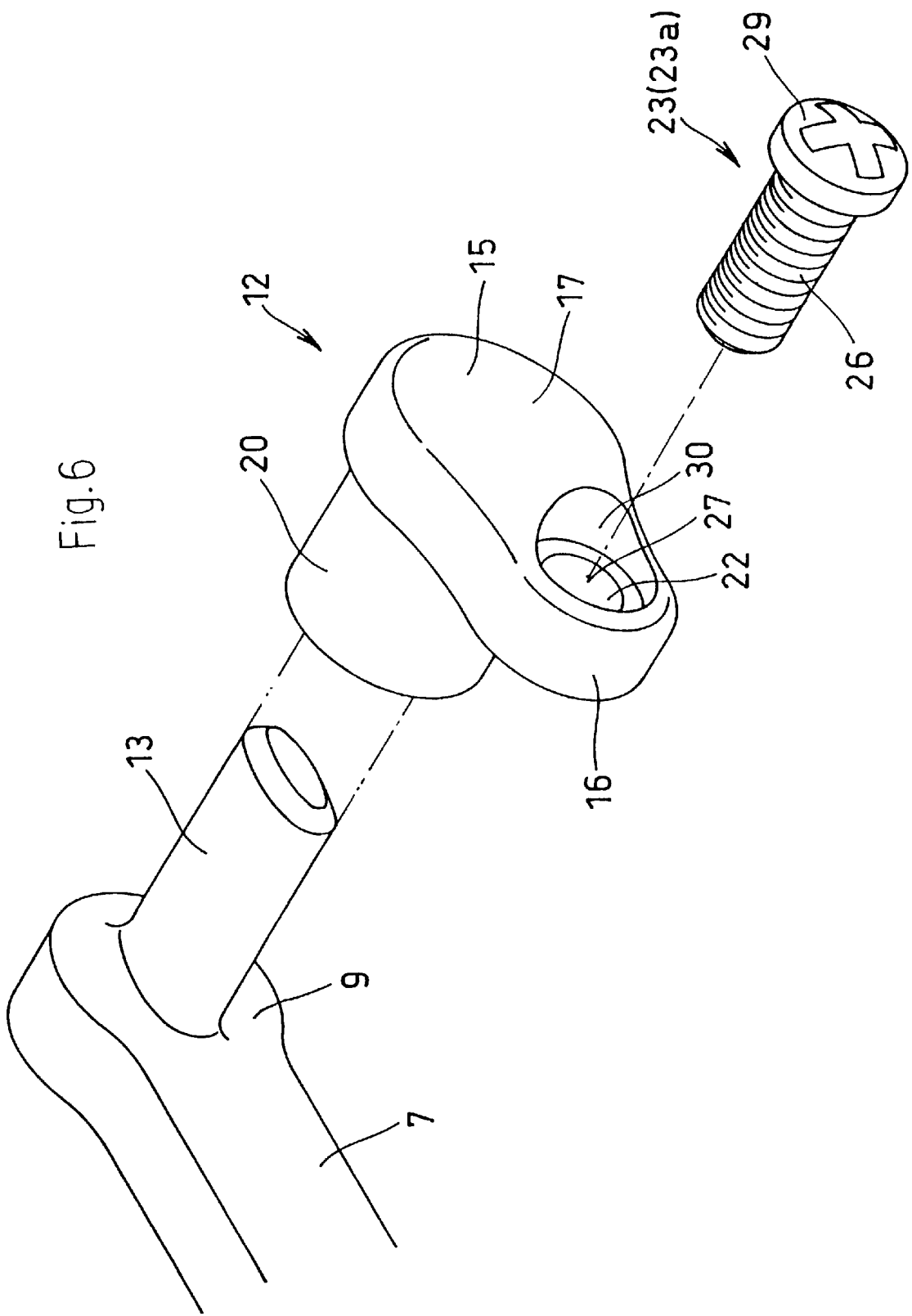
FIG. 6 shows a perspective view of the lens connecting device taken apart, which is applied to the bracket.
Figure 7:
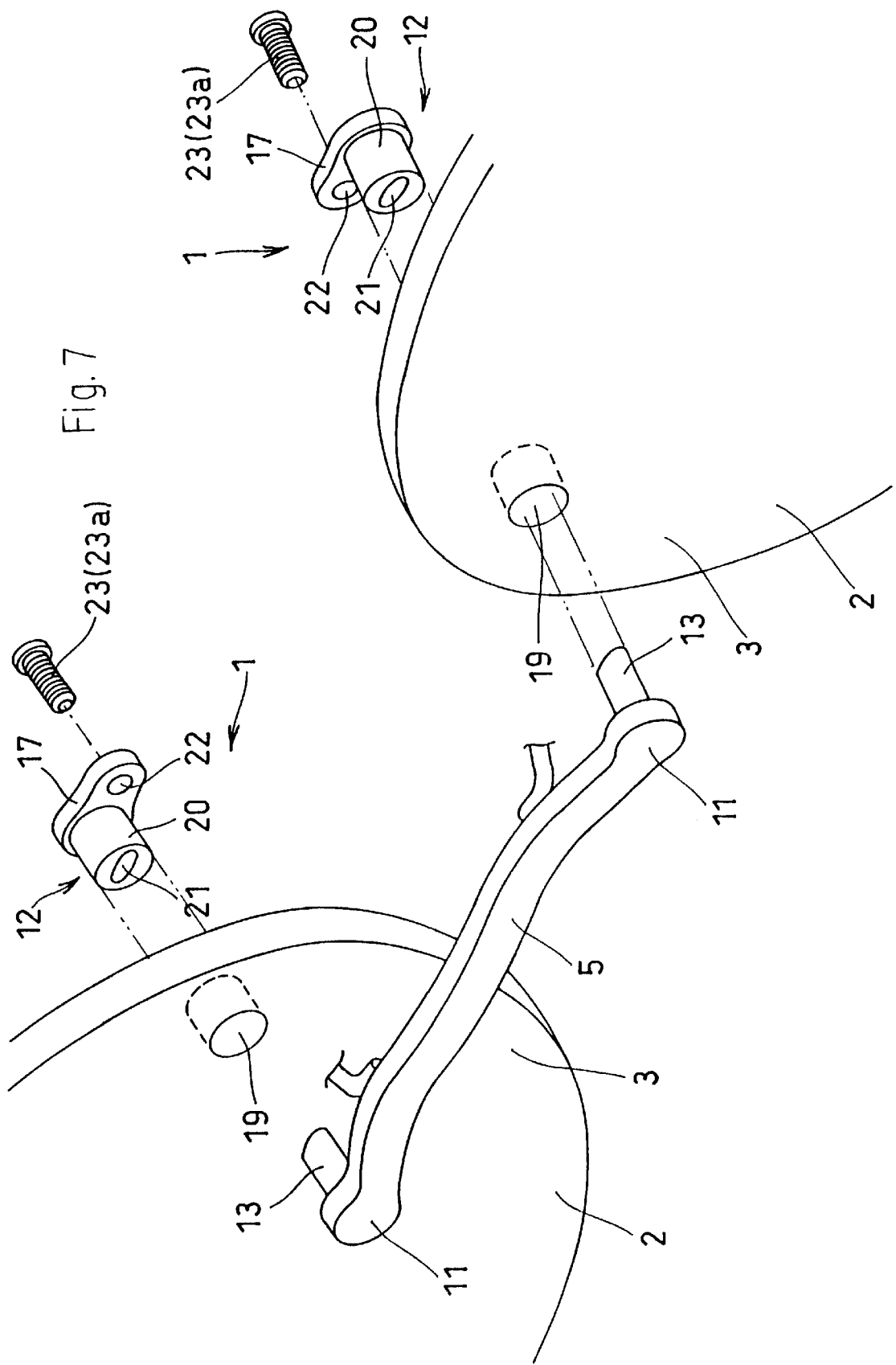
FIG. 7 shows a perspective view of the lens connecting device taken apart, which is applied to the bridge.

As shown in FIGS. 5, 6, and 7, a shaft element, which has oval-shaped cross section whose width is longer than the height, is mounted to project on each of the end part 9 of the bracket 7 and the end part 11 of the bridge 5 to face a front side of the lens 2.

In the present embodiment, the above-mentioned connecting means 12 is integrally made of one of such synthetic resins like super enforced plastics or enforced plastics which are flexible and have high anti-wear, tensile force, shock resistance, and weatherability, and is arranged, for example, on a rear surface of the lens 2. And as shown in FIGS. 3 to 7, the connecting means 12 is provided with a Dharma-doll-shaped base plate 17 comprising two base plate portions, one of which being a large-bore base plate portion 15 and the other is a small-bore base plate portion 16. A front surface 18 of the base plate 17 is formed to make a curve, which can for the most part come into contact with a rear surface 14 of the lens 2. And on a surface of the large-bore base plate portion 15 of the base plate 17, a cylindrical element 20 is mounted to project so as to face the rear surface of the lens. The cylindrical element 20 can be inserted into a circular-shaped connecting opening 19 (bored with a drill, for example, and as the same hereinafter), which is bored in the outer periphery part 6 of the lens 2 in a state of close contact.

An oval-shaped insertion opening 21, whose width is wider than the length, for example, is provided in the cylindrical element 20 as a blind hole, as is shown in FIGS. 3 to 6, in a state that a front end thereof is open into which the shaft element 13 can be inserted, and that a base end part 21a is in the large-bore base plate portion 15. The reason for the insertion opening 21 being provided not only in the cylindrical element but also in the large-bore base plate portion 15 is to secure such a frictional force that can prevent the shaft element 13 from coming out as described hereinafter even when a thickness of the lens 2 differs. Further, a detent opening 22, whose axis is almost in parallel with that of the insertion opening 21, is provided in the small-bore base plate portion 16. A fixing shaft 23 as a self-tapping screw 23a can be inserted into the detent opening 22, and the detent opening 22 can function as a guide to determine a position of a provisional opening 25 (FIG. 10) and bore the same in the lens 2. The detent opening 22 is a two-stage opening formed in a manner that a large-bore opening 30, into which a screw head 29 is to be embedded, is formed continuously with a small-bore opening 27, into which a screw shaft 26 of the self tapping screw 23a is inserted.

Figure 8:
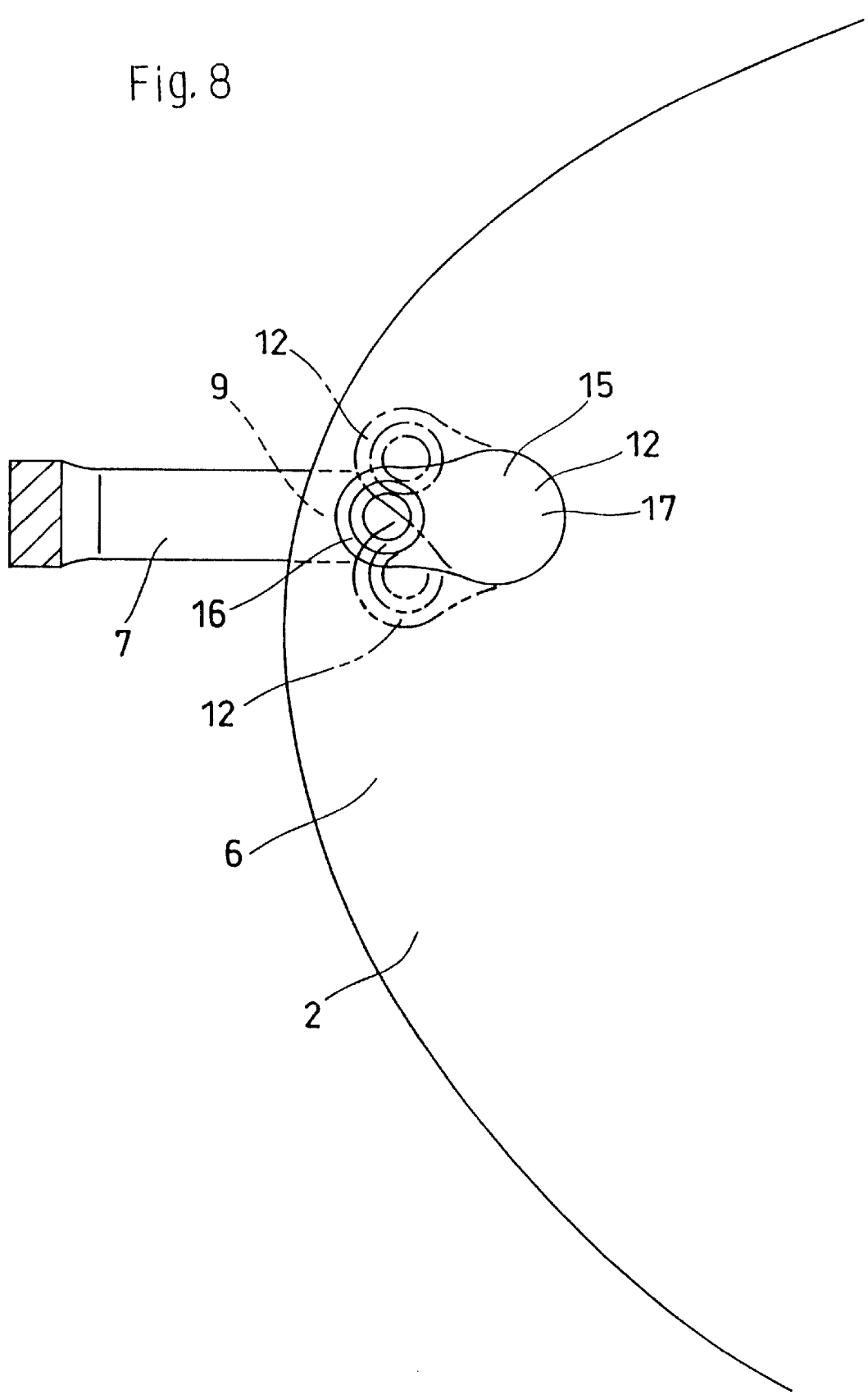
FIG. 8 shows a back view depicting how an angle of the bracket is adjusted.
Figure 9:
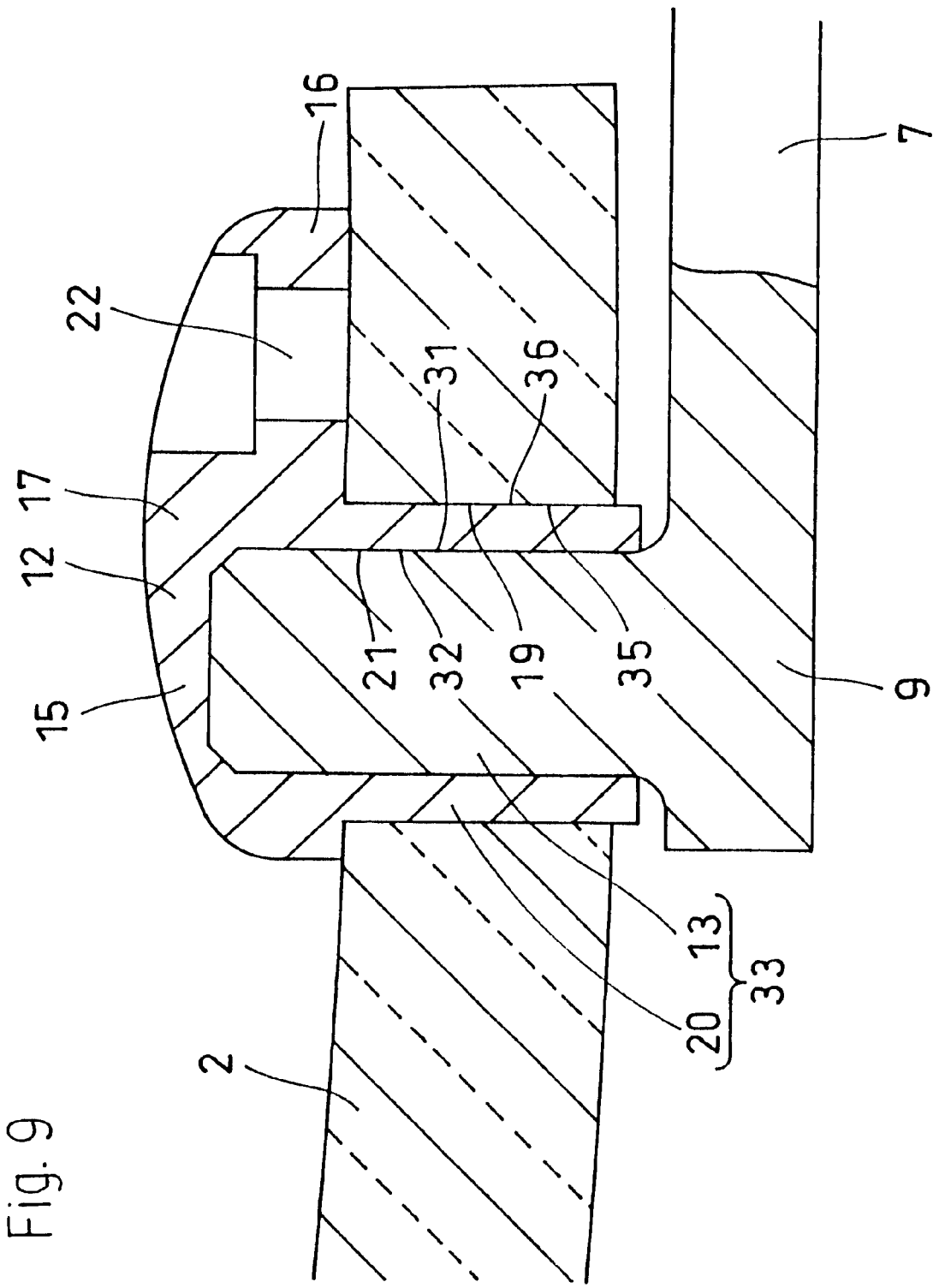
FIG. 9 shows a cross sectional view depicting a state of a connection of the bracket at an adjusted angle.

When each of the end part 9 of the bracket 7 and the end part 11 of the bridge 5 are connected to each of the outer periphery part 6 and the inner periphery part 3 of the lens 2 by means of the lens connecting device 1 having the above-mentioned structure, a process described below, referring to the bracket 7 as a representative, is taken. Namely, as shown in FIGS. 8 and 9, the connecting means 12 is placed on a rear side of the lens 2 while the cylindrical element 20 is inserted into the connecting opening 19 in a state that the base plate 17 is placed sideways so that the small-bore base plate portion 16 can be placed on the outer periphery of the lens 2 and the large-bore base plate portion 15 on the inner periphery of the lens 2. Then, as shown in FIG. 9, the shaft element 13, which is provided at the end part 9 of the bracket 7 to project, is pressed and inserted into the insertion opening 21, which is provided in the cylindrical element 20 of the connecting means 12. By the insertion under pressure, an outer peripheral surface 31 of the shaft element 13 comes into close contact with an inner peripheral surface 32 of the insertion opening 21 under pressure, and by a frictional force generated between the former and the latter, the shaft element 13 and the cylindrical element 20 become integrated with each other. Accordingly, the base plate 17 become integrated with the end part 9 via a connecting element 33 comprising the cylindrical element 20 and the shaft element 13. Namely, as the shaft element 13, whose cross sectional view is oval-shaped, is pressed and inserted into the oval-shaped insertion opening 21, the cylindrical element 20 and the shaft element 13 do not rotate relatively to each other around an axis thereof, and the cylindrical element 20 and the shaft element 13 do not come apart because of the frictional force.

By the insertion of the shaft 13 under pressure, pressure welding of an outer peripheral surface 36 of the cylindrical element 20 and an inner peripheral surface 35 of the connecting opening 19 may occur, however, the state of welding allows the bracket 7 to rotate.

Figure 10:
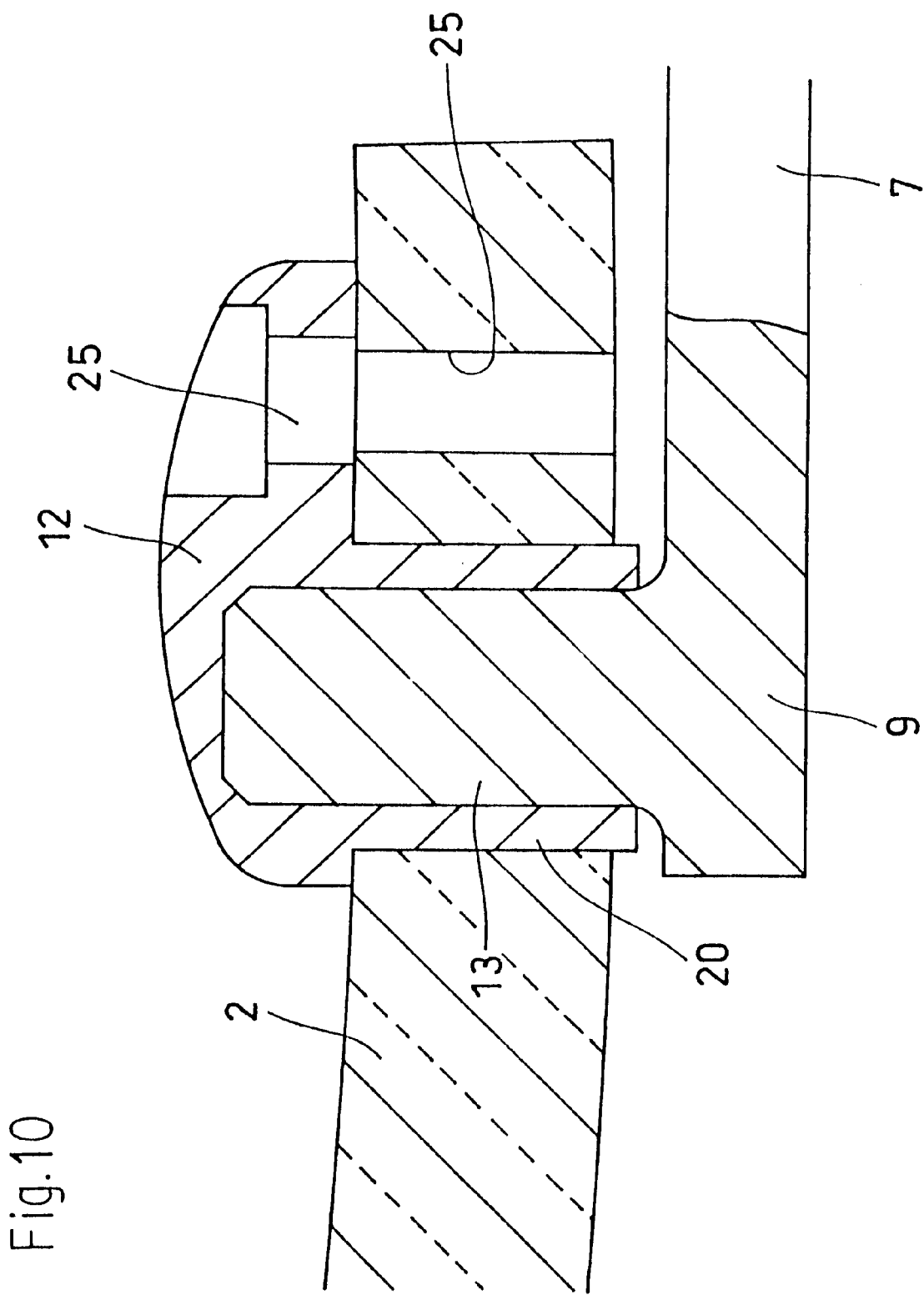
FIG. 10 shows a cross sectional view showing a opening provided in the lens having a detent opening as a guide.
Figure 11:
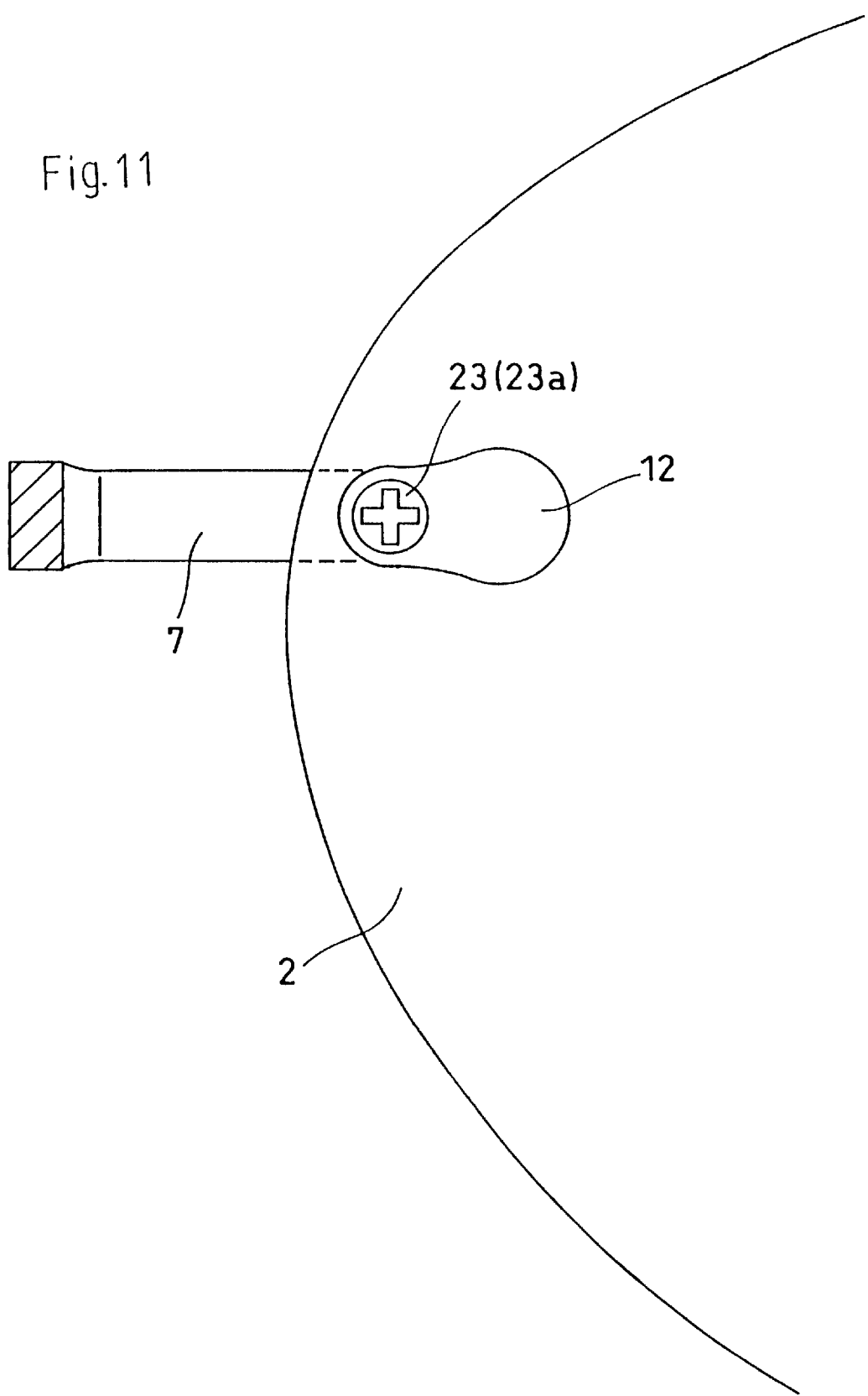
FIG. 11 shows a back view showing a state of a connection of the bracket at an adjusted angle.

Then, when the bracket 7 rotates around the axis of the connecting opening 19, the connecting means 12 can also rotate together with the bracket 7 in a state of integration. A state of the rotation of the connecting means 12 is shown in FIG. 8 by a solid line, a chain line, and a chain double-dashed line. A direction of outward projection of the bracket 7 from the lens 2 through an adjustment of the end part 9 by rotation, for example, is shown in FIG. 8 by a solid line. In a set state shown in FIG. 9, a boring tool such as a drill is inserted into the lens 2 using the detent opening 22 as a guide, as shown in FIG. 10, in order to form the opening (provisional opening) 25 for the self-tapping screw 23*a* to be inserted. Next, as shown in FIGS. 3 and 4, the self-tapping screw 23*a* coming through the detent opening 22 is screwed into the provisional opening 25 and fastened tightly. For example, by screwing the self-tapping screw with a diameter of 1 mm into the provisional opening 25 with a diameter of 0.8 mm, the direction of outward projection of the bracket 7 from the lens is adjusted properly as shown in FIGS. 2, 3, and 11, and the bracket 7 is connected to the lens 2. Accordingly, the direction of outward projection of the bracket 7 can be precisely set and a temple can be precisely connected to the bracket 7.

Figure 12:
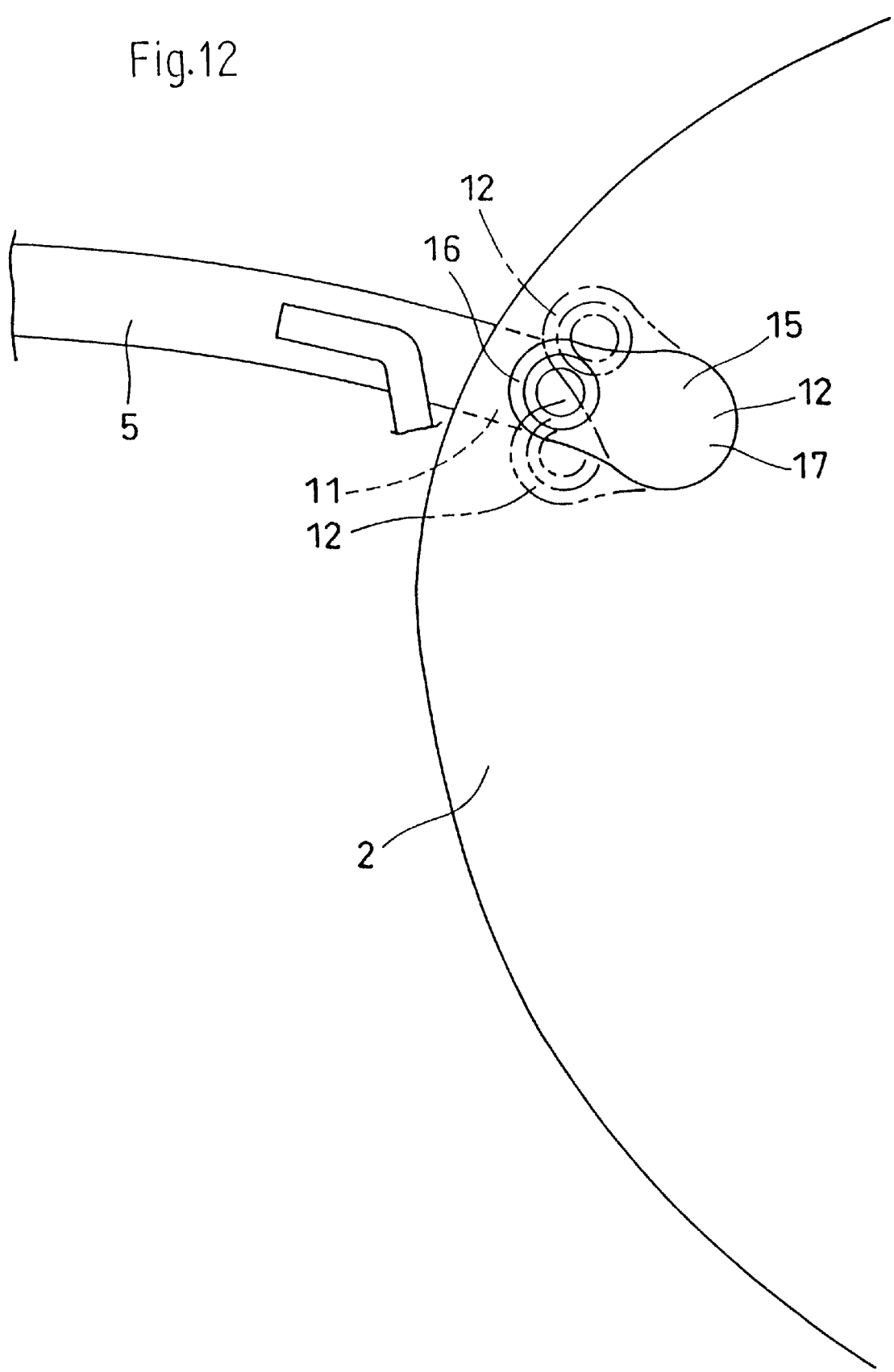
FIG. 12 shows a back view indicating how an angle of the bridge is adjusted.
Figure 13:
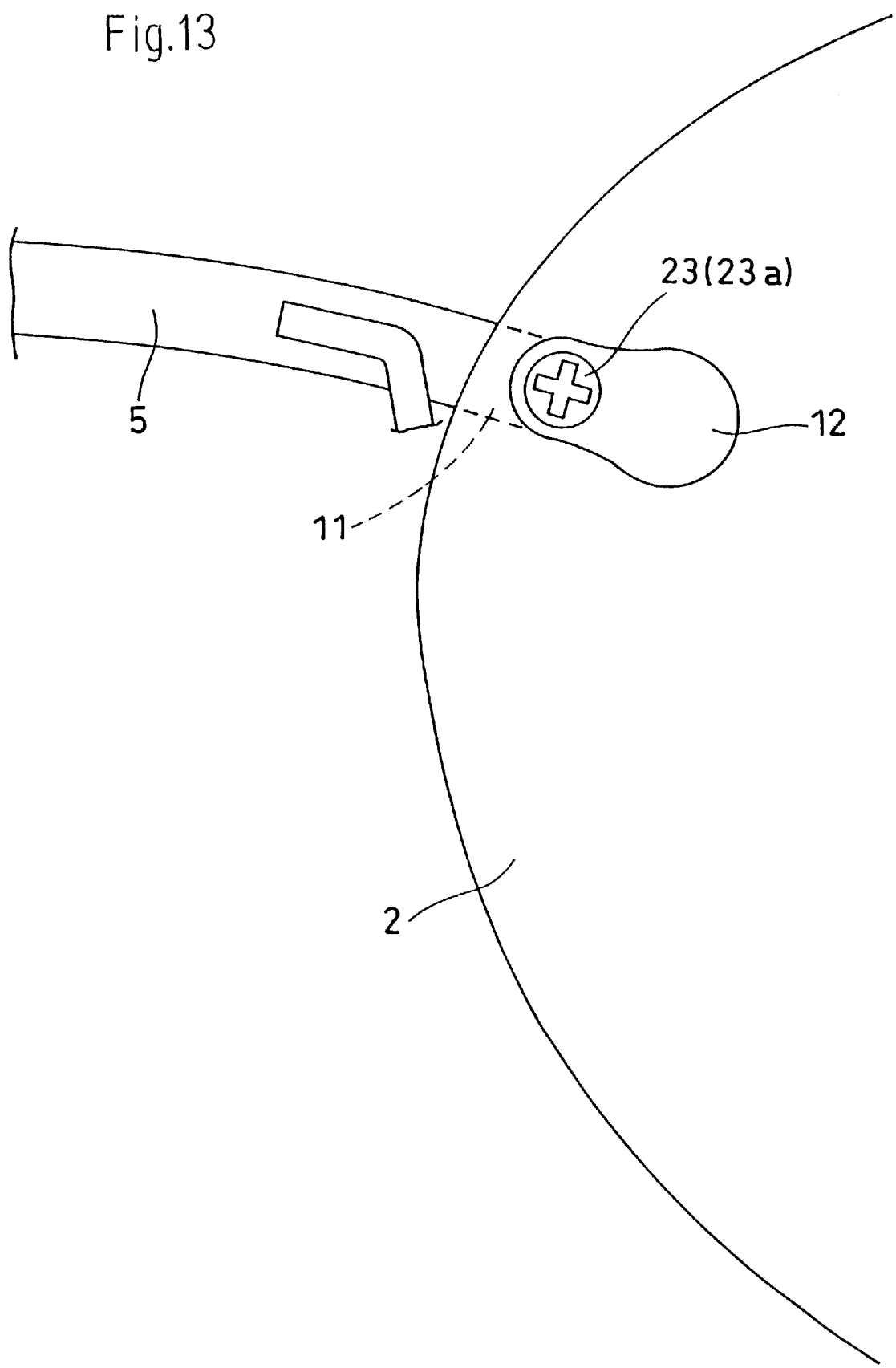
FIG. 13 shows a cross sectional view showing a state of a connection of the bridge at an adjusted angle.

Specific explanation concerning means to connect the end part 11 of the bridge 5 to the lens 2 is omitted, however, the means is similar to the above-mentioned means adopted when the bracket 7 is connected to the lens 2. FIG. 12 shows how the end part 11 of the bridge 5 is rotated and adjusted. In FIG. 12, a state of rotation of the connecting means 12 is shown in a solid line, a chain line and a chain double-dashed line. FIG. 13 shows a state in which a position of the end part 11 is determined by rotation and adjustment, and is fixed by screwing down of the self-tapping screw 23*a*.

(Second Embodiment)

Figure 14:
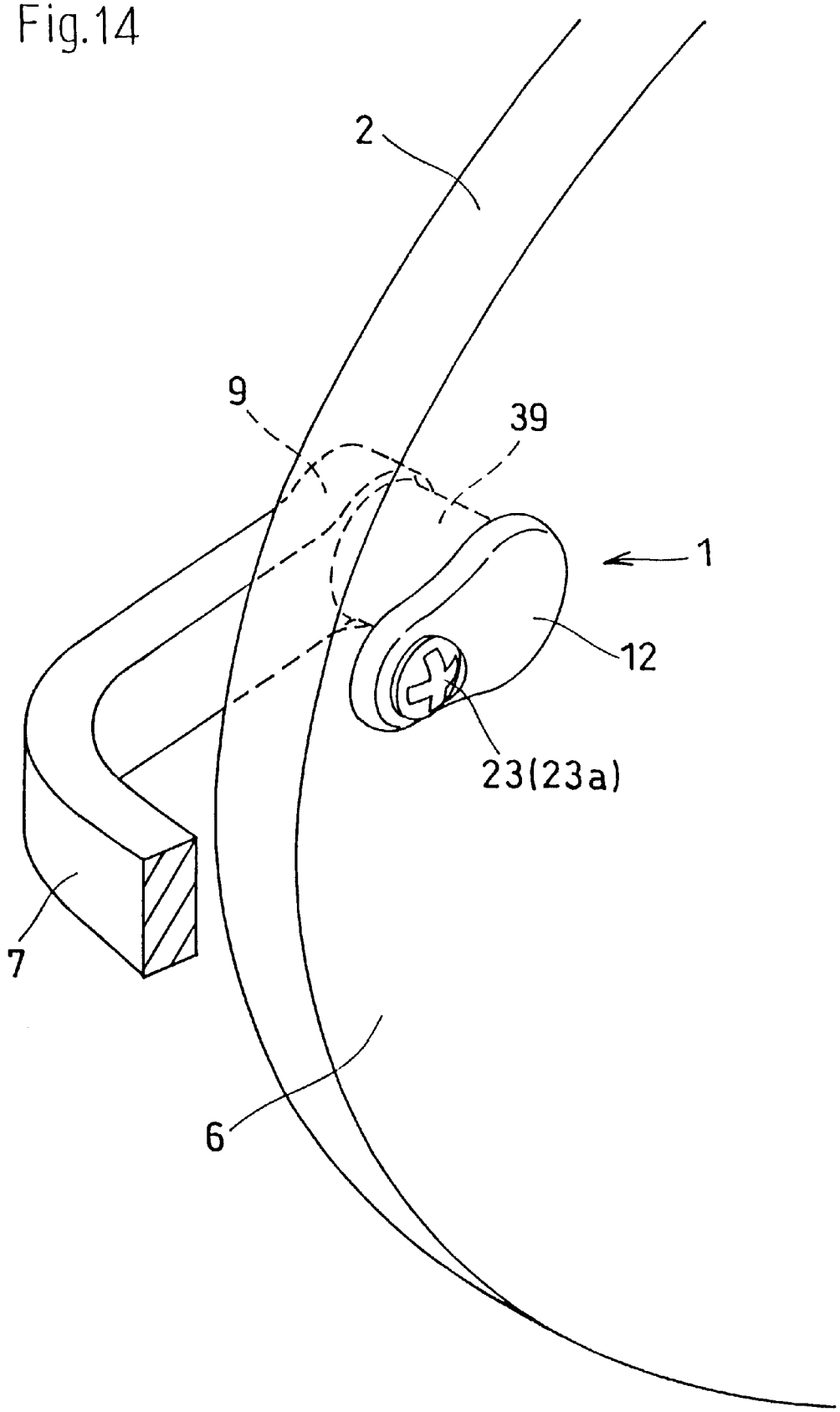
FIG. 14 shows a perspective view showing another embodiment of the lens connecting device applied to the bracket.
Figure 15:
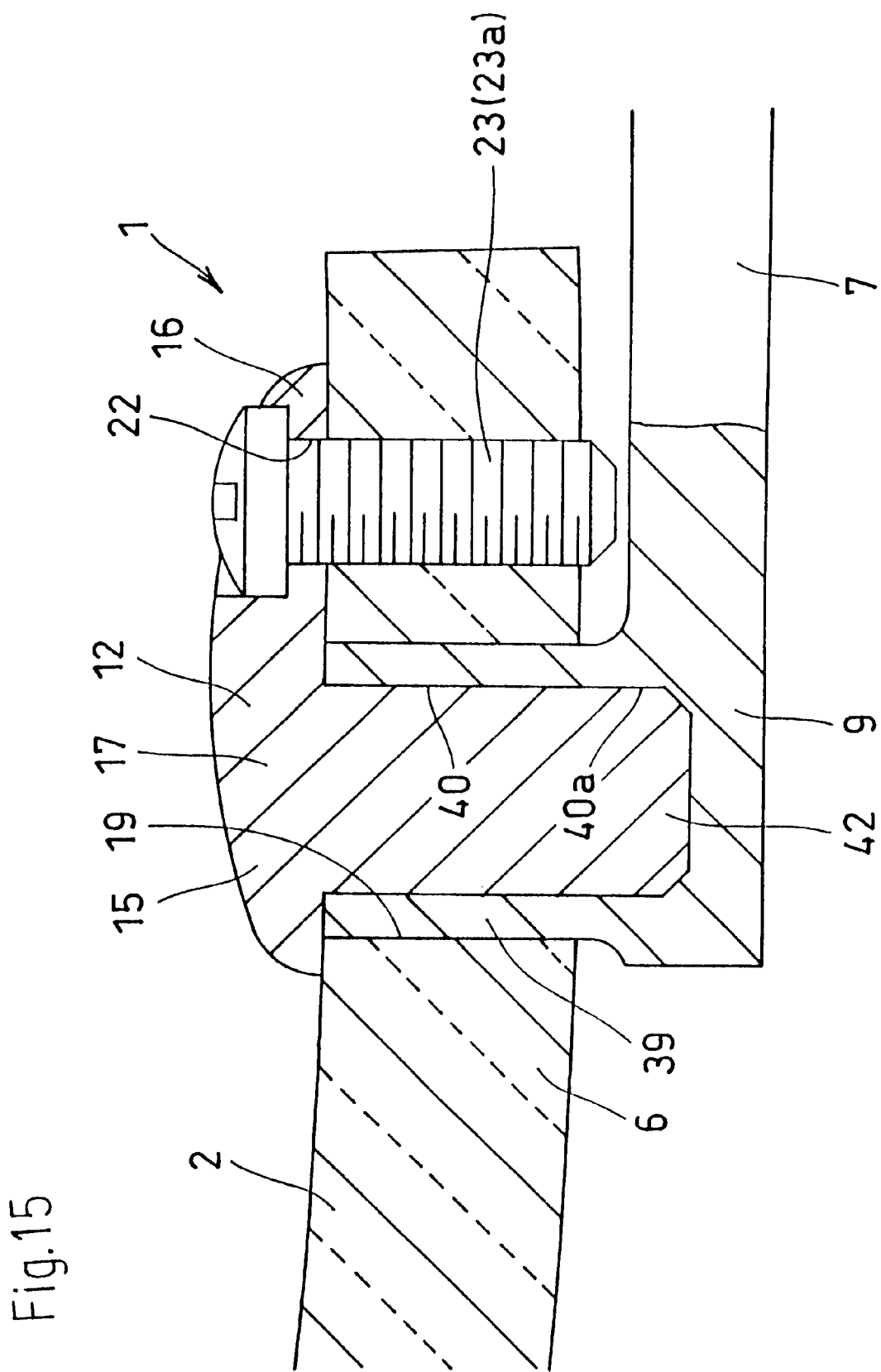
FIG. 15 shows a cross sectional view of the lens connecting device shown in FIG. 14.
Figure 16:
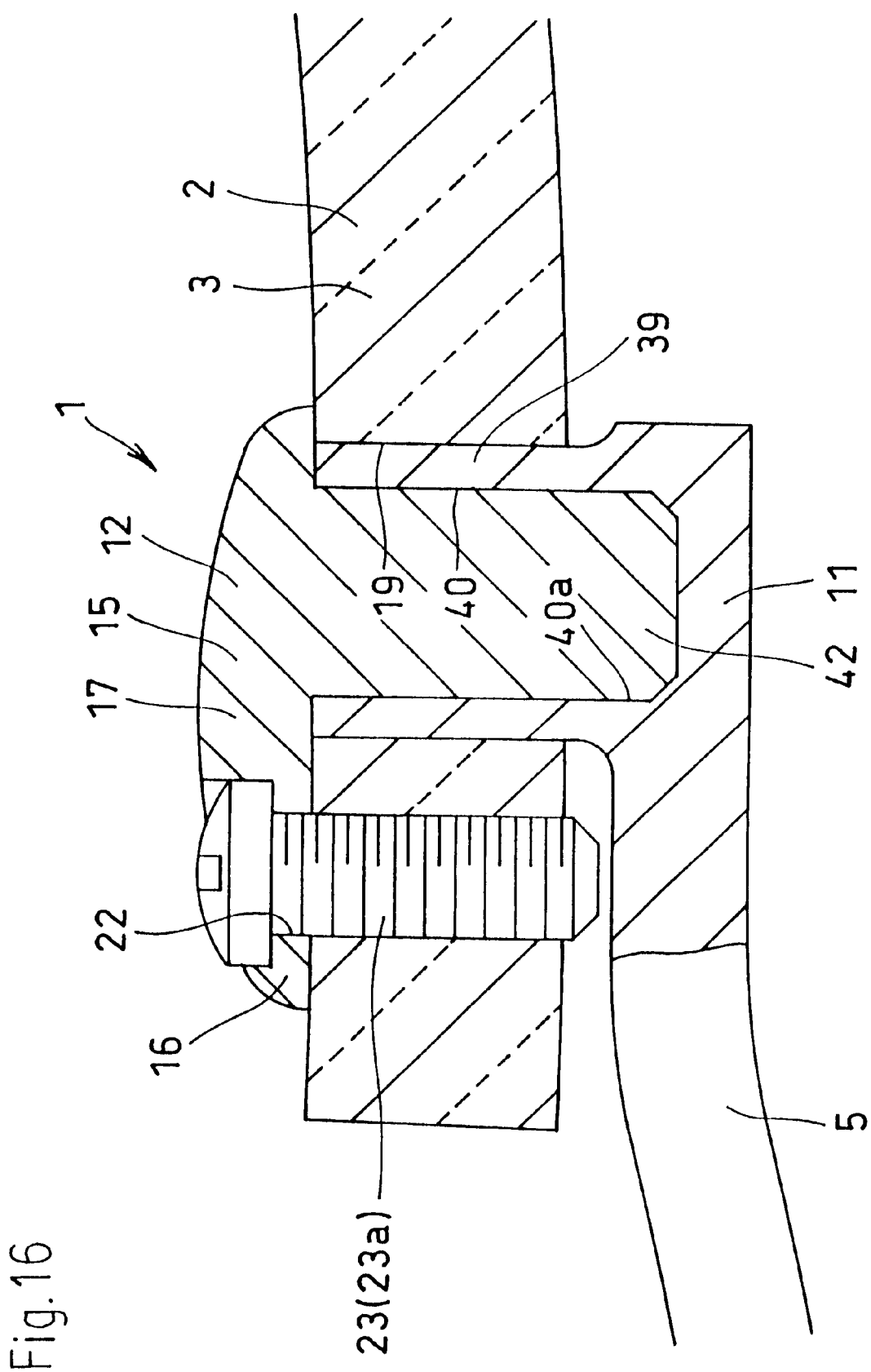
FIG. 16 shows a cross sectional view of another embodiment of the lens connecting device applied to the bracket.

FIGS. 14 to 16 show another embodiment of the lens connecting device 1 according to this invention, in which the connecting means 12 is made of metal.

Figure 17:
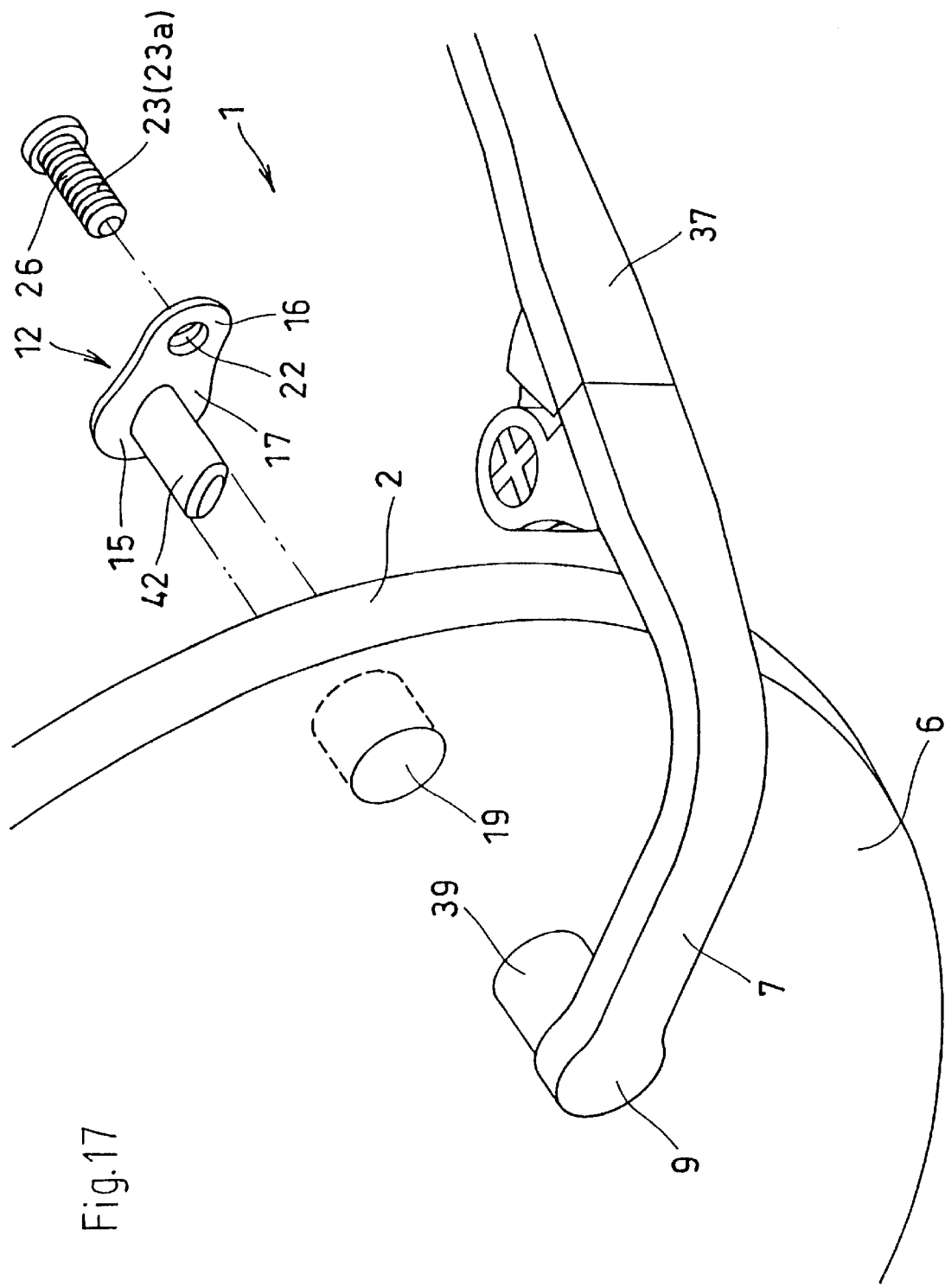
FIG. 17 shows a perspective view of another embodiment of the lens connecting device taken apart, which is applied to the bracket.
Figure 18:
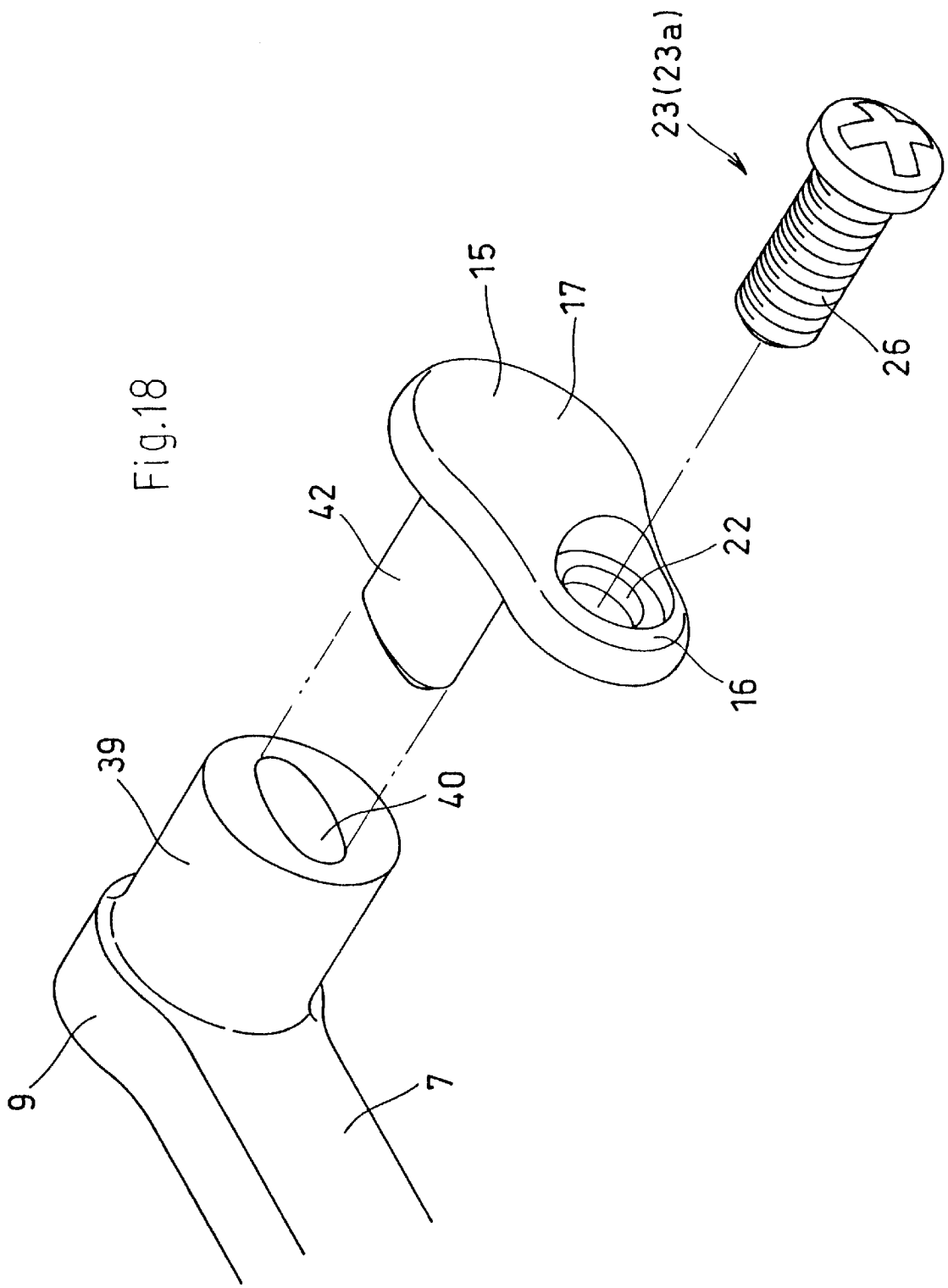
FIG. 18 shows a perspective view of another embodiment of the lens connecting device taken apart, which is applied to the bracket.
Figure 19:
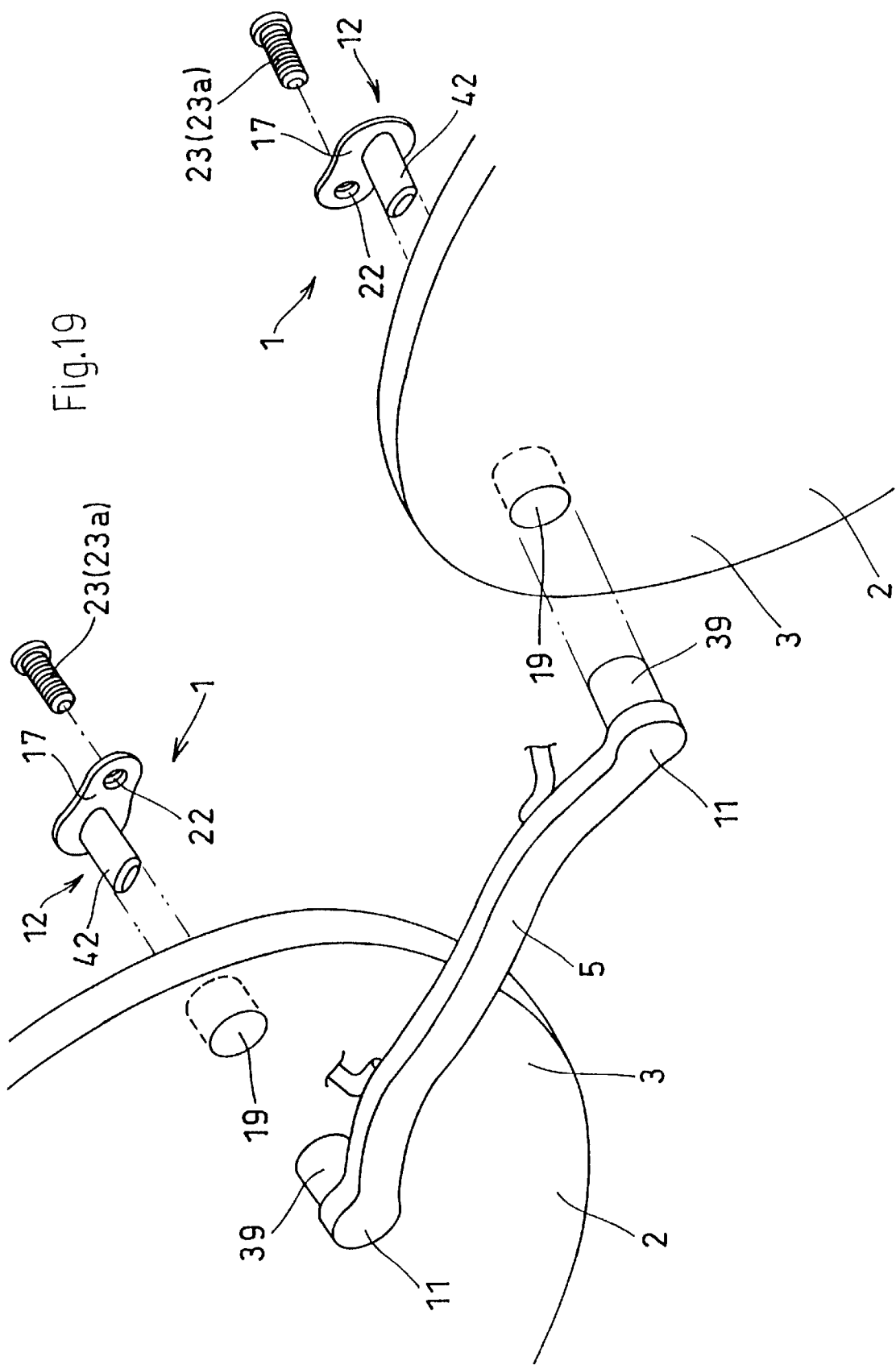
FIG. 19 shows a perspective view of another embodiment of the lens connecting device taken apart, which is applied to the bridge.

As shown in FIGS. 17 to 19, a cylindrical element 39 is provided to project on each of the end part 9 of the bracket 7 and the end part 11 of the bridge 5 so as to be closely inserted from the front side of the lens 2 into each of the circular-shaped connecting openings 19, 19 formed at each of the outer edge parts 6 and the inner edge part 3. As shown in FIGS. 15, 16 and 18, an oval-shaped insertion opening 40, whose width is longer than that of the length for example, is provided in the cylindrical element 39. The insertion opening 40 is open at one end thereof and a base end part 40*a* is arranged in the end parts 9, 11. The reason for the insertion opening 40 being provided not only in the cylindrical element 39 but also in the end parts 9, 11 is to secure such a frictional force that can prevent a below-mentioned shaft element 42 from coming out as described hereinafter even when a thickness of the lens 2 differs. The cylindrical element 39 is preferably made of resin in view of securing the required frictional force obtained by insertion under pressure of the shaft element 42, in which case, whole of the bracket 7 and whole of the bridge 5 are preferably made of resin.

The connecting means 12 is arranged at the rear side of the lens 2, for example, and is provided with a base plate 17 in which the large-bore base plate portion 15 and the small-bore base plate portion 16 are made to be continued to form a Dharma-doll shape as shown in FIGS. 15 to 19. And in the middle of a front surface of the large-bore base plate portion 15, an oval-shaped shaft element 42, whose width is longer than a height thereof, is provided to project. The shaft element 42 is inserted under pressure into the insertion opening 40 provided in the cylindrical element 39. In the small-bore base plate portion 16, the two-stage detent opening 22 is provided which is structured as described above.

Figure 20:
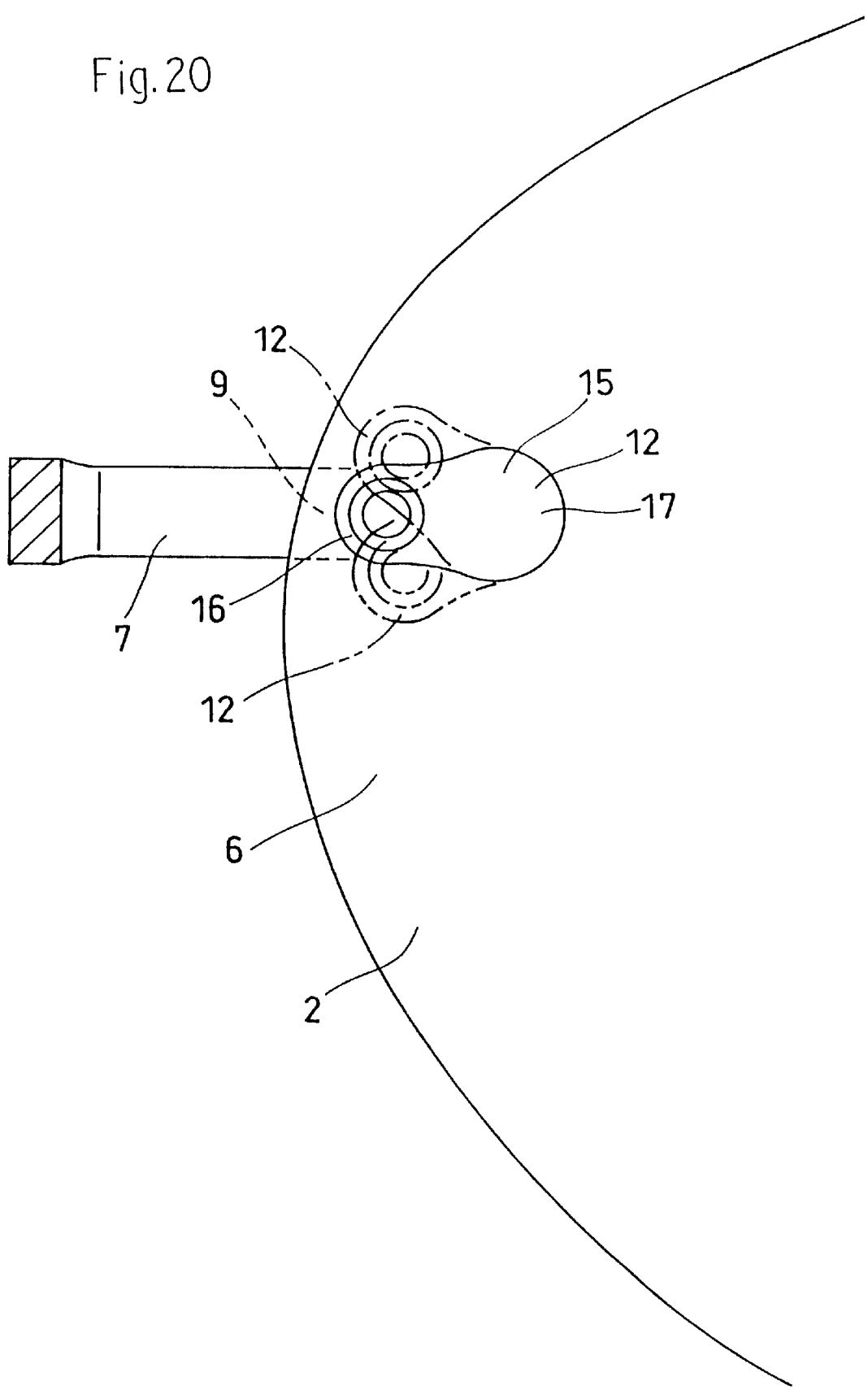
FIG. 20 shows a back view depicting how an angle of the bracket is adjusted.
Figure 21:
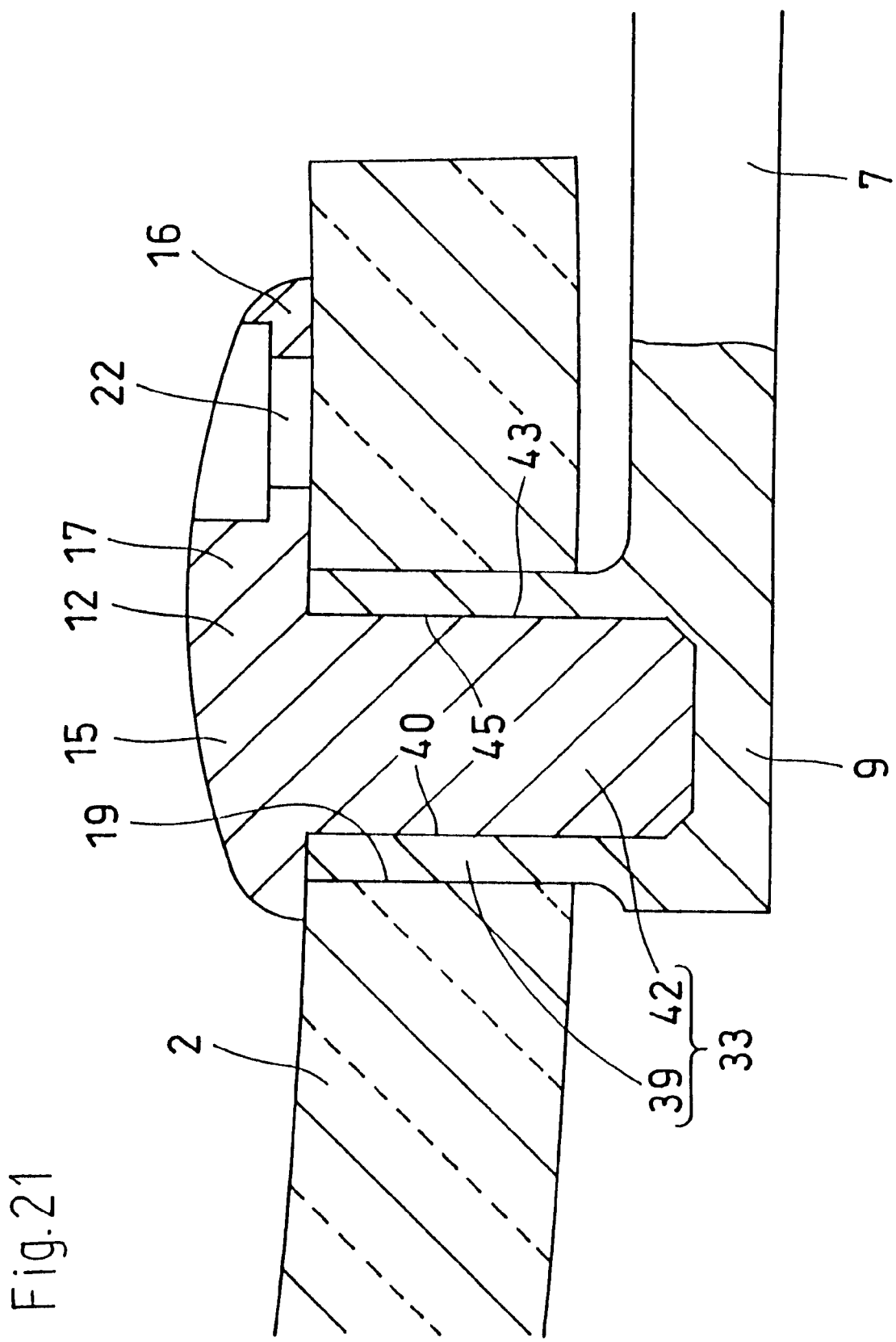
FIG. 21 shows a cross sectional view depicting a state of a connection of the bracket at an adjusted angle.

When each of the end part 9 of the bracket 7 and the end part 11 of the bridge 5 is fixed to the lens 2 by using the lens connecting device 1 having the above-mentioned structure, a process described below, referring to the bracket 7 as a representative, is taken. As shown in FIGS. 20 and 21, the shaft element 42, which is provided with the end part 9 of the bracket 7 to project, is inserted into the connecting opening 19. Then, as shown in FIG. 20 the base plate 17 is placed sideways in a manner that the small-bore base plate portion 16 is placed at the outer side periphery of the lens 2 and the large-bore base plate portion 15 at the inner side periphery of the lens 2, and as shown in FIG. 21, the shaft element 42 of the connecting means 12 is inserted under pressure into the insertion opening 40 of the cylindrical element 39. By the insertion under pressure, an outer peripheral surface 43 of the shaft element 42 comes into close contact under pressure with an inner peripheral surface 45 of the insertion opening 40, and by a frictional force generated between outer peripheral surface 43 and the inner peripheral surface 45, the shaft element 42 and the cylindrical element 39 become integrated with each other. Accordingly, the base plate 17 becomes integrated with the end part 9 via a connecting element 33 comprising the cylindrical element 39 and the shaft element 42. Namely, as the shaft element 42, whose cross sectional view is an oval-shaped, is inserted under pressure into the oval-shaped insertion opening 19, the cylindrical element 39 and the shaft element 42 do not rotate relatively to each other around the axis thereof, and the cylindrical element 39 and the shaft element 42 do not come apart because of the frictional force.

Figure 22:
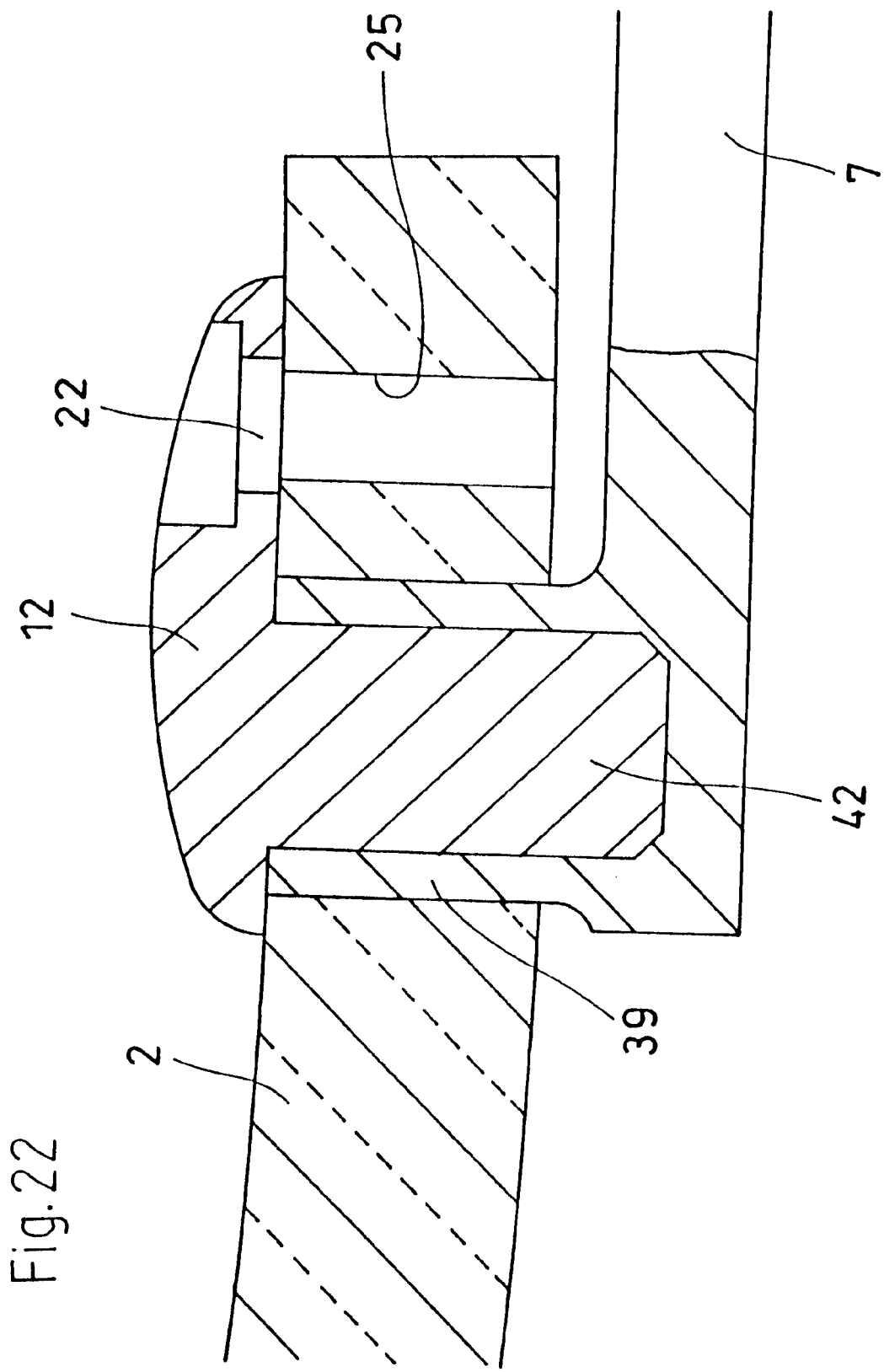
FIG. 22 shows a cross sectional view of a opening provided in the lens having a detent opening as a guide.
Figure 23:
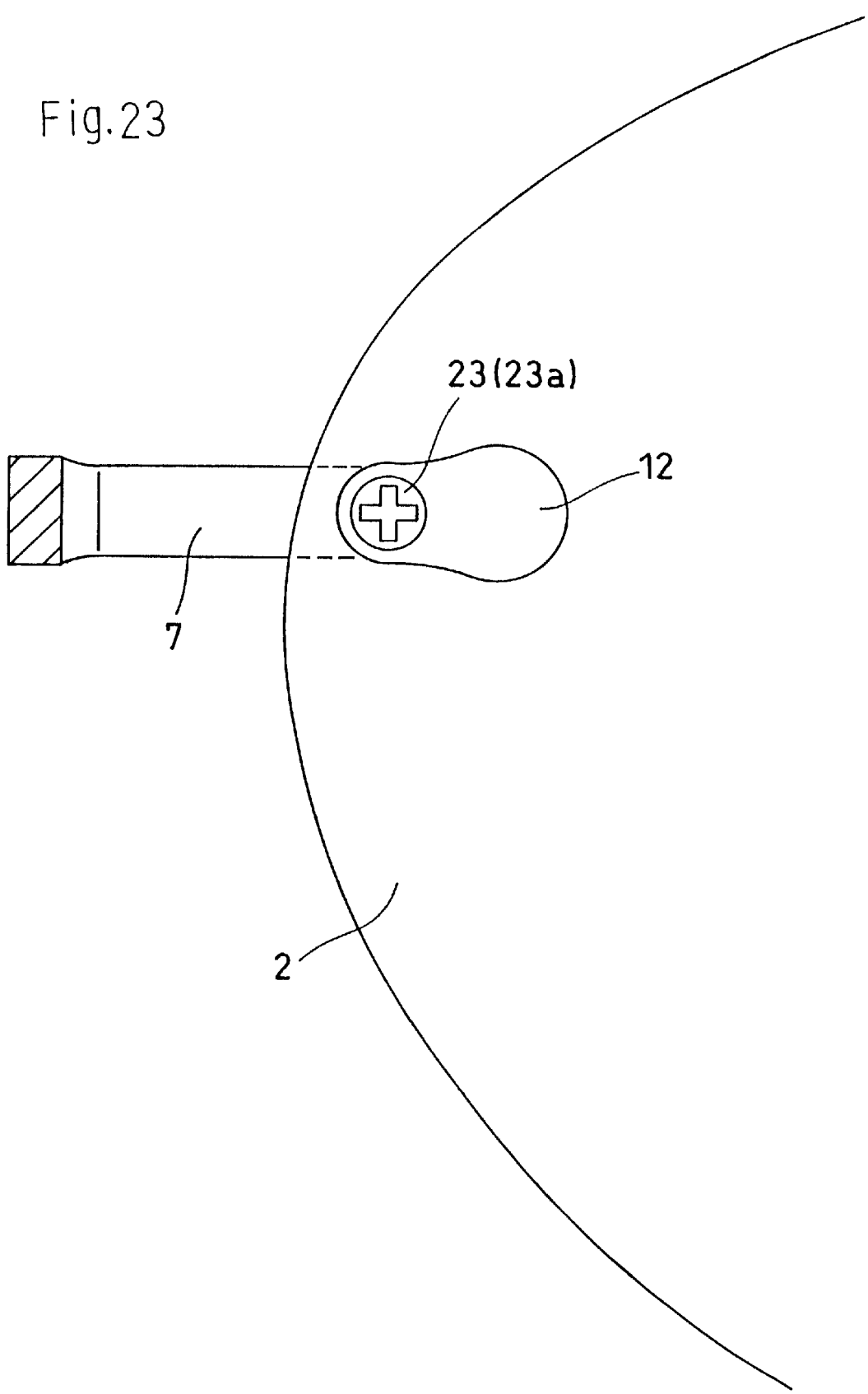
FIG. 23 shows a back view of a state of a connection of the bracket at an adjusted angle.
Figure 24:
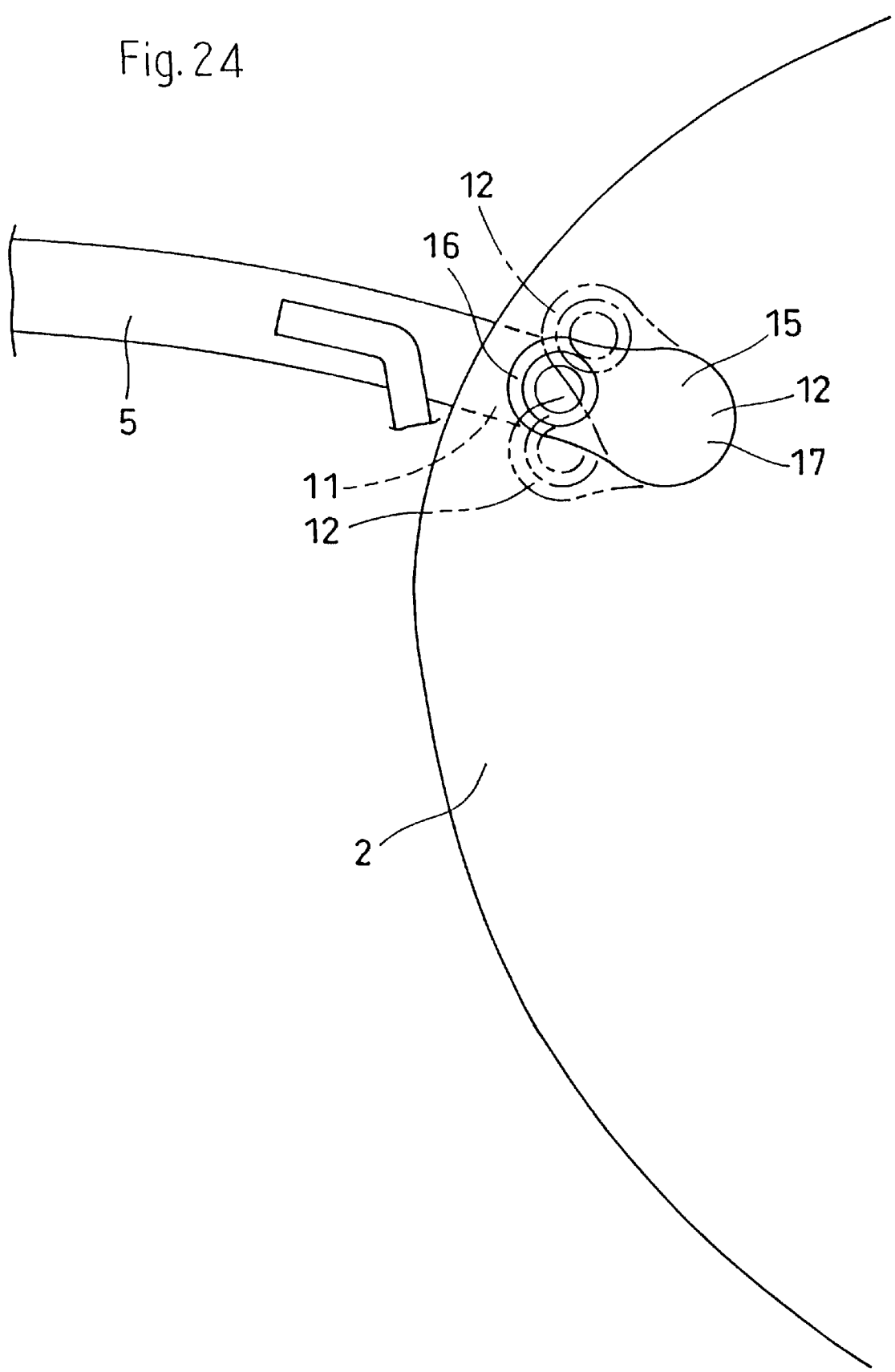
FIG. 24 shows a back view depicting how an angle of the bridge is adjusted.
Figure 25:
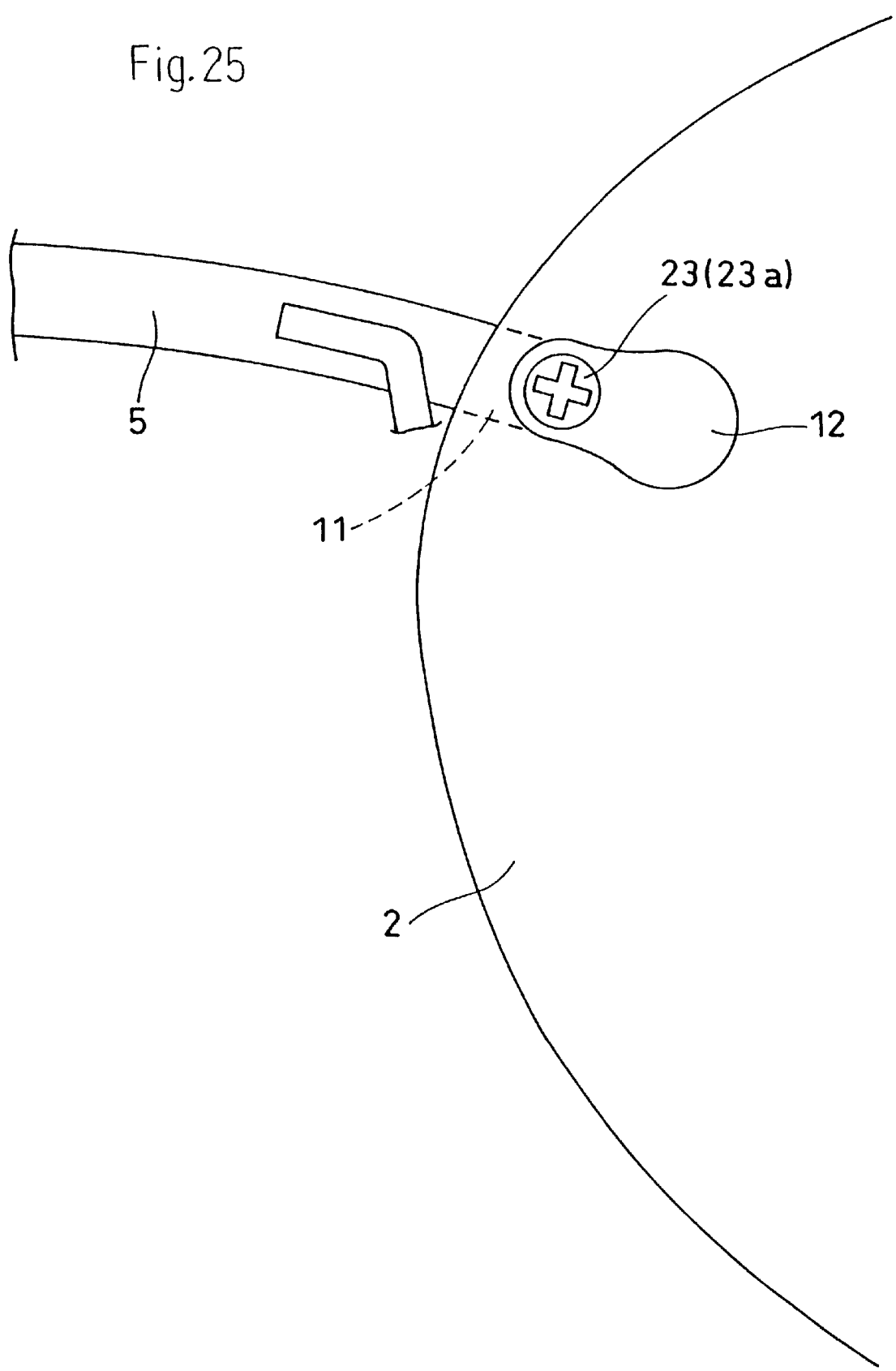
FIG. 25 shows a back view of a state of a connection of the bridge at an adjusted angle.

Then, when the bracket 7 is rotated around the axis of the connecting opening 19 as necessity requires, the connecting means 12 can also rotate together with the bracket 7 in a state of integration. A state of the rotation of the connecting means 12 is shown in FIG. 8 by a solid line, a chain line and a chain double-dashed line. A direction of outward projection of the bracket 7 from the lens 2 through an adjustment of the end part 9 by rotation, for example, is shown in FIG. 20 by a solid line. In a set state shown in FIG. 21, a boring tool such as a drill is inserted into the lens 2 using the detent opening 22 as a guide, as shown in FIG. 22, in order to form the opening (provisional opening) 25 for the self tapping screw 23*a* to be inserted. Next, as shown in FIGS. 15 and 16, the self tapping screw 23*a* coming through the detent opening 22 is screwed into the provisional opening 25 and fastened tightly. Consequently, the direction of outward projection of the bracket 7 from the lens is adjusted properly as shown in FIGS. 14, 15, and 23, and the bracket 7 is connected to the lens 2. A manner for connecting the end part 11 of the bridge 5 to the lens 2 is similar to such a manner as in the bracket 7 as described above. FIG. 24 shows how the end part 11 of the bridge 5 is rotated for adjustment, and a state of rotation of the connecting means 12 is indicated by a solid line, a chain line and a chain double-dashed line, and FIG. 25 shows a state in which a position of the end portion 11 is fixed by screwing down of the self tapping screw 23*a* after adjustment by rotation.

(Third Embodiment)

FIGS. 26 to 30 show another embodiment of the lens connecting device 1 according to this invention comprising the bracket 7 arranged on the front surface of the lens 2, the bridge 5, and the connecting means 12 arranged on the rear surface of the lens 2.

The connecting means 12 is provided with a base plate 17 in which a large-bore base plate portion 15 and a small-bore base plate portion 16 are made to be continued to form a Dharma-doll shape, as described above. In the middle of the front surface of the large-bore base plate portion 15, a hexagonal-shaped screw shaft 46 is provided to project, which can be inserted through a connecting opening 19 provided at an outer edge part 6 or an inner edge part 3 of the lens 2. The screw shaft 46 is brazed to the large-bore base plate portion 15, or is pressingly formed on the large-bore base plate portion 15 to be integrated therewith. A two-stage detent opening 22 having the same structure as aforementioned is provided in the small-bore base plate portion 16. Further, a hexagonal-shaped through opening 47, through which the screw shaft 46 is inserted, is provided in an end part 11 of the bridge 5.

Figure 31:
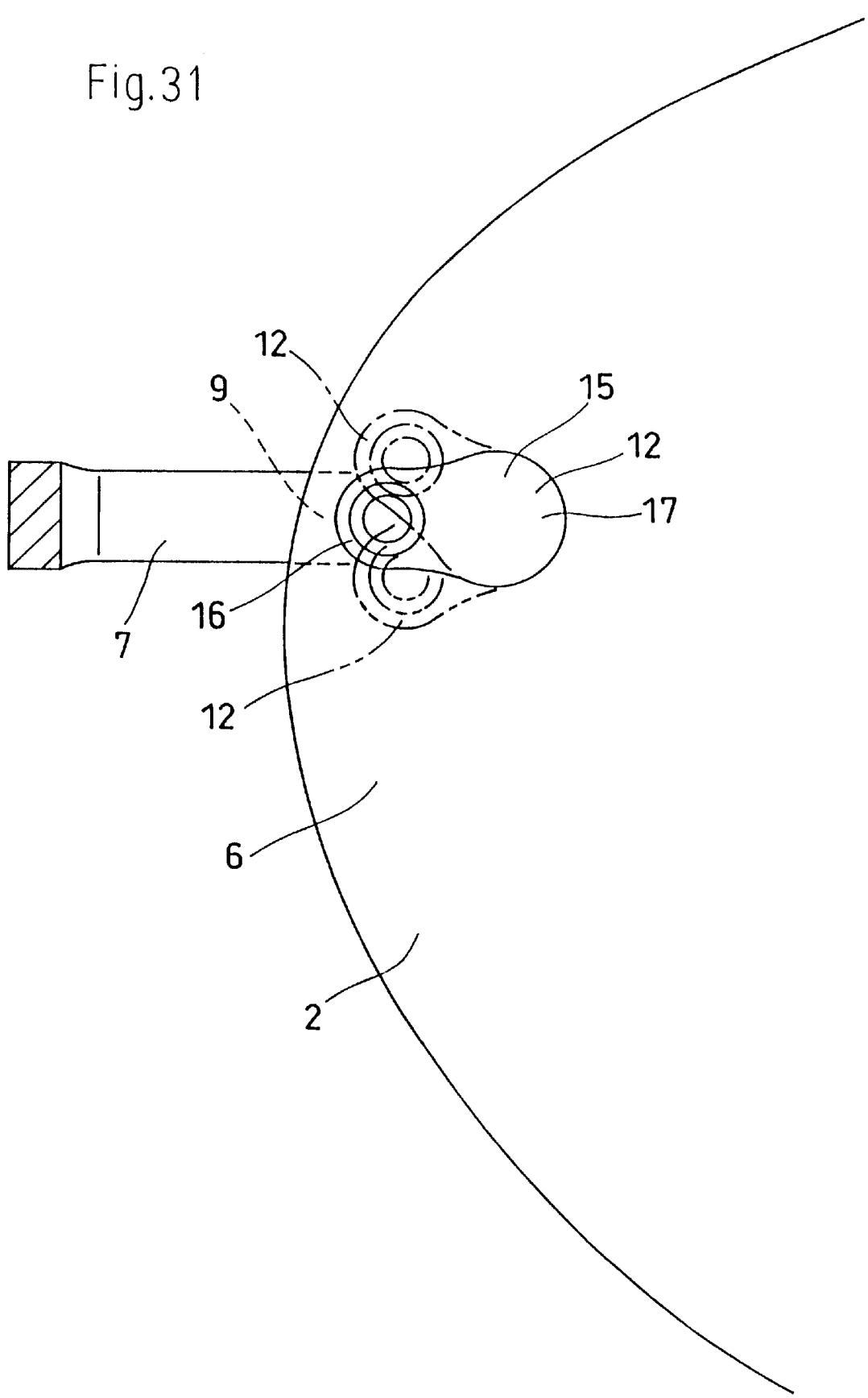
FIG. 31 shows a back view depicting how an angle of the bracket is adjusted.
Figure 32:
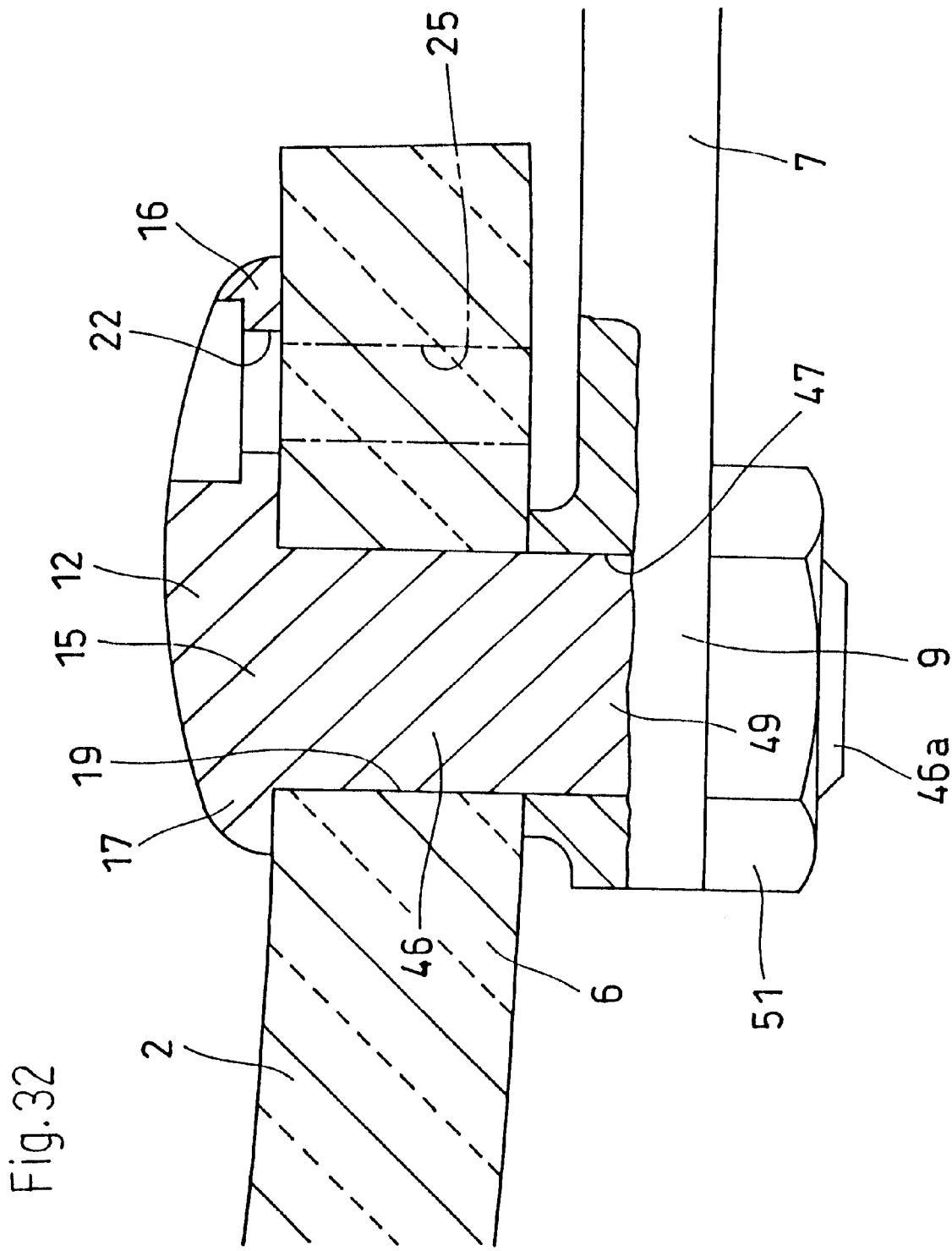
FIG. 32 shows a cross sectional view of a state of a connection of the bracket at an adjusted angle.

When the end part 9 of the bracket 7 or the end part 11 of the bridge 5 is fixed to the lens 2 by using the lens connecting device 1 having the above-mentioned structure, a process described below, referring to the bracket 7 as a representative, is taken. Namely, as shown in FIGS. 31 and 32, the connecting means 12 is placed on a rear side of the lens 2 and the base plate 17 is placed sideways so that the small-bore base plate portion 16 can be placed at the outer side of the periphery of the lens 2 and the large-bore base plate portion 15 at the inner side of the lens 2. And then a tip 49 of the screw shaft 46 is inserted into the through opening 47 of the end part 9 and a nut 51 is screwed down to a screw shaft 46*a* projecting from the front surface of the bracket 7. Accordingly, the base plate 17 is integrated with the end part 9 via a connecting element 33 comprising the screw shaft 46 and the nut 51. Consequently, the base plate 17 and the end part 9 do not rotate relatively to each other around an axis thereof, and the base plate 17 and the end part 9 do not come apart.

Figure 26:
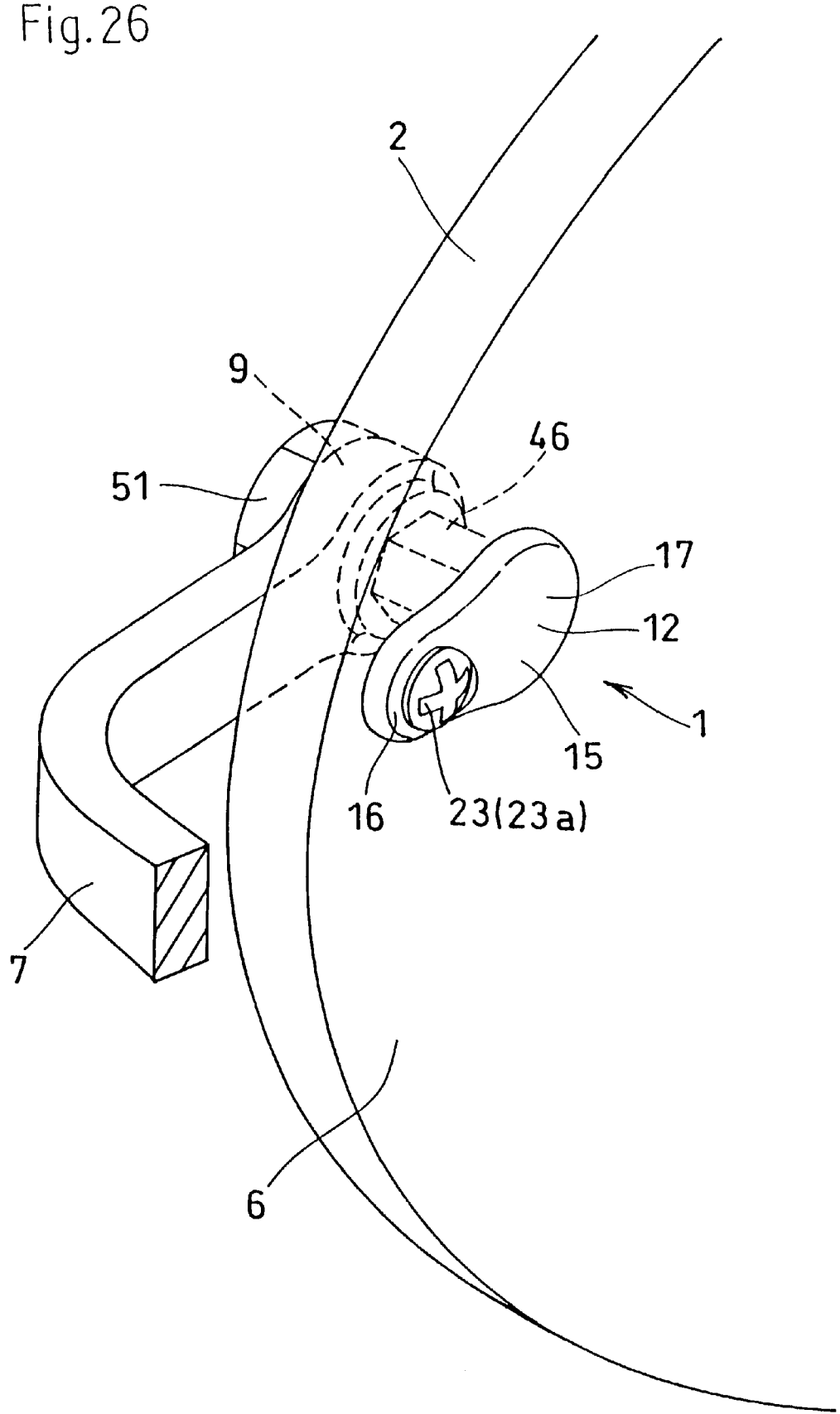
FIG. 26 shows a perspective view of another embodiment of the lens connecting device applied to the bracket.
Figure 27:
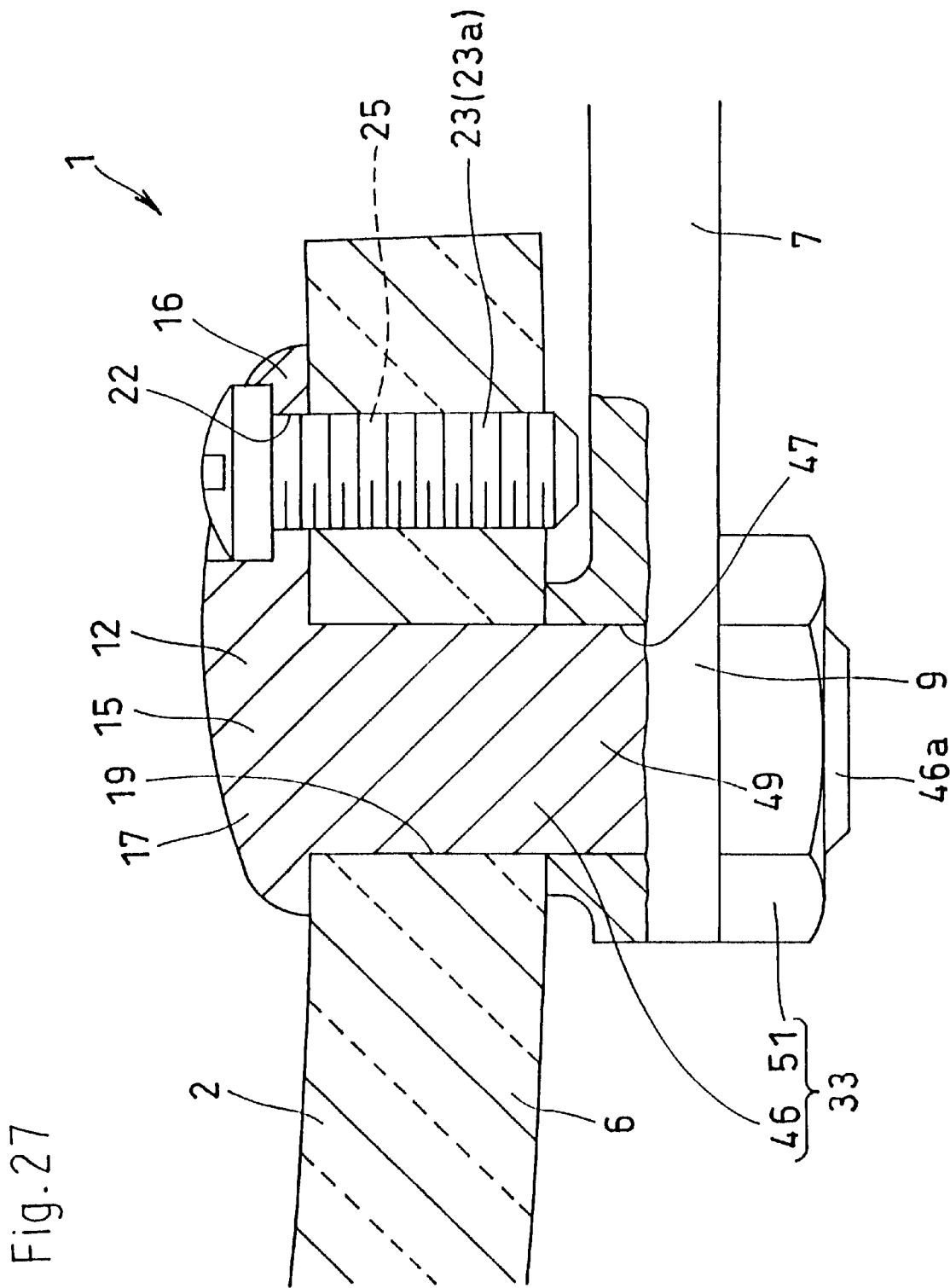
FIG. 27 shows a cross sectional view of the lens connecting device shown in FIG. 26.
Figure 28:
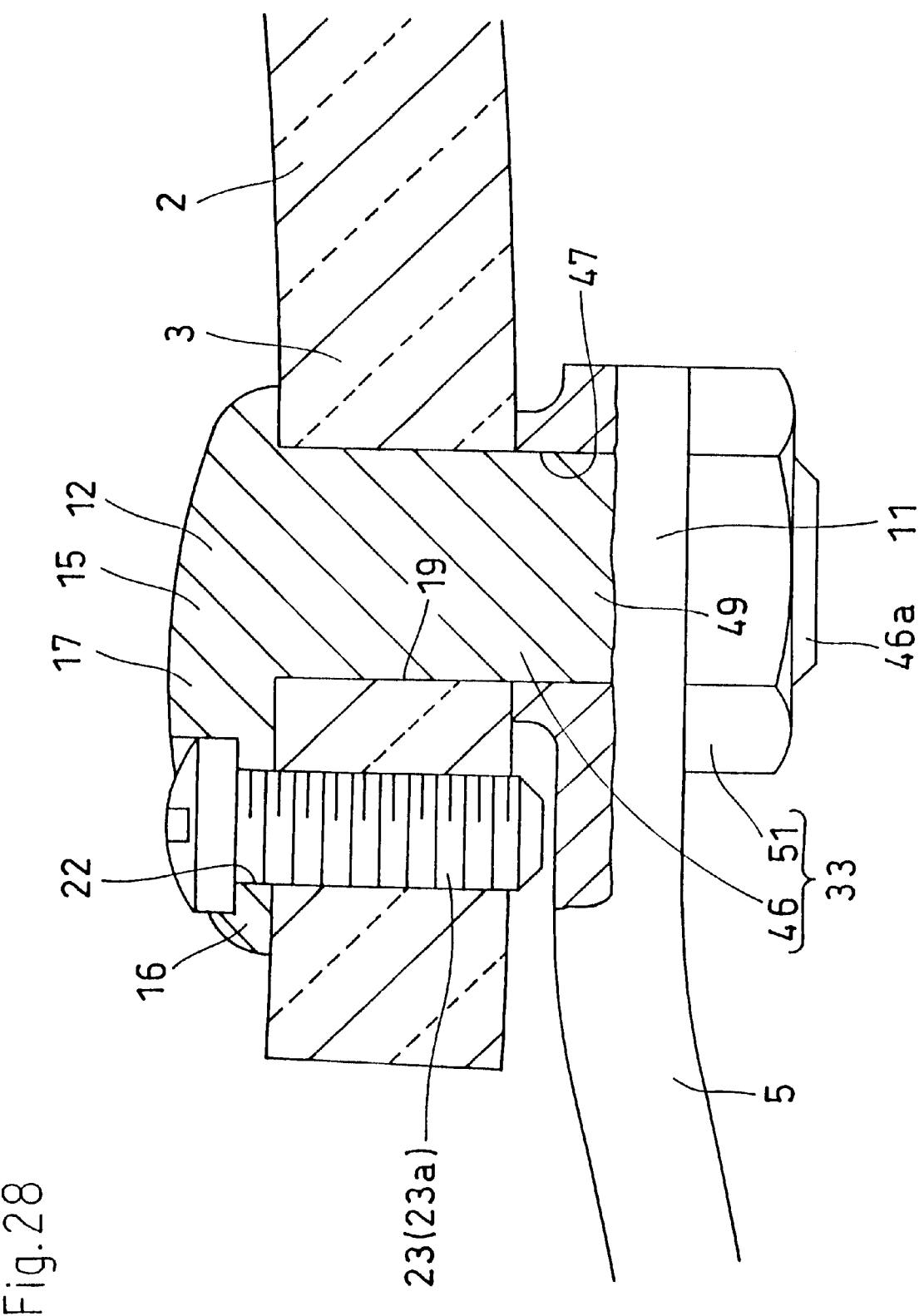
FIG. 28 shows a cross sectional view of another embodiment of the lens connecting device applied to the bridge.

Then, when the bracket 7 is rotated around the axis of the connecting opening 19 as necessity requires, the connecting means 12 can also rotate together with the bracket 7 in a state of integration. A state of the rotation of the connecting means 12 is shown in FIG. 8 by a solid line, a chain line and a chain double-dashed line. A direction of outward projection of the bracket 7 from the lens 2 after an adjustment of the end part 9 by rotation, for example, is shown in FIG. 31 by a solid line. In a set state shown in FIG. 32, a boring tool such as a drill is inserted into the lens 2 using the detent opening 32 as a guide, as shown by a chain line in FIG. 32, in order to form an opening (provisional opening) 25 for a fixing shaft 23 as a self tapping screw 23*a* to be inserted. Next, as shown in FIG. 27, the self tapping screw 23*a* coming through the detent opening 22 is screwed into the provisional opening 25 and fastened tightly. Consequently, the direction of outward projection of the bracket 7 from the lens is adjusted properly as shown in FIGS. 26, and 27, and the bracket 7 is connected to the lens 2. A manner for connecting the end part 11 of the bridge 5 to the lens 2 is similar to such a manner as in the bracket 7 as described above.

(Fourth Embodiment)

FIGS. 33 to 37 show another embodiment of the lens connecting device 1 according to this invention, which comprises a bracket 7 arranged on the front surface of the lens 2, a bridge 5, and a connecting means 12 arranged on the rear surface of the lens 2.

At the end part 9 of the bracket 7 and at the end part 11 of the bridge 5, a hexagonal-shaped screw shaft 52 is provided which can be inserted into a circular-shaped connecting opening 19 provided in an outer edge part 6 or an inner edge part 3 of a lens 2. The screw shaft 52 is brazed to the end parts 9, 11, or is, for instance, formed under pressure to be integrated therewith.

Further, the connecting means 12 is provided with a Dharma-doll-shaped base plate 17 in which a large-bore base plate portion 15 and a small-bore base plate portion 16 are continued to each other in the same manner as aforementioned. And in the middle of the large-bore base plate portion 15, a hexagonal-shaped through opening 53 is provided through which the screw shaft 52 can be inserted. In the small-bore base plate portion 16, a two-stage detent opening 22 is provided, which is structured in the same manner as aforementioned.

When the end part 9 of the bracket 7 or the end part 11 of the bridge 5 is fixed to the lens 2 by using the lens connecting device 1 having the above-mentioned structure, a process described below, referring to the bracket 7 as a representative, is taken. Namely, the screw shaft 52 provided at the end part to project, is inserted through the through opening 53. Then, a nut 55 is fit and screwed down to the screw shaft 52*a* projecting at a rear side of a large-bore base plate portion 15, by which the base plate 17 becomes integrated with the end part 9 via a connecting element 33 comprising the screw shaft 52 and the nut 55. Accordingly, the base plate 17 and the end part 9 do not rotate relatively to each other around an axis thereof, and the base plate 17 and the end part 9 do not come apart.

Figure 33:
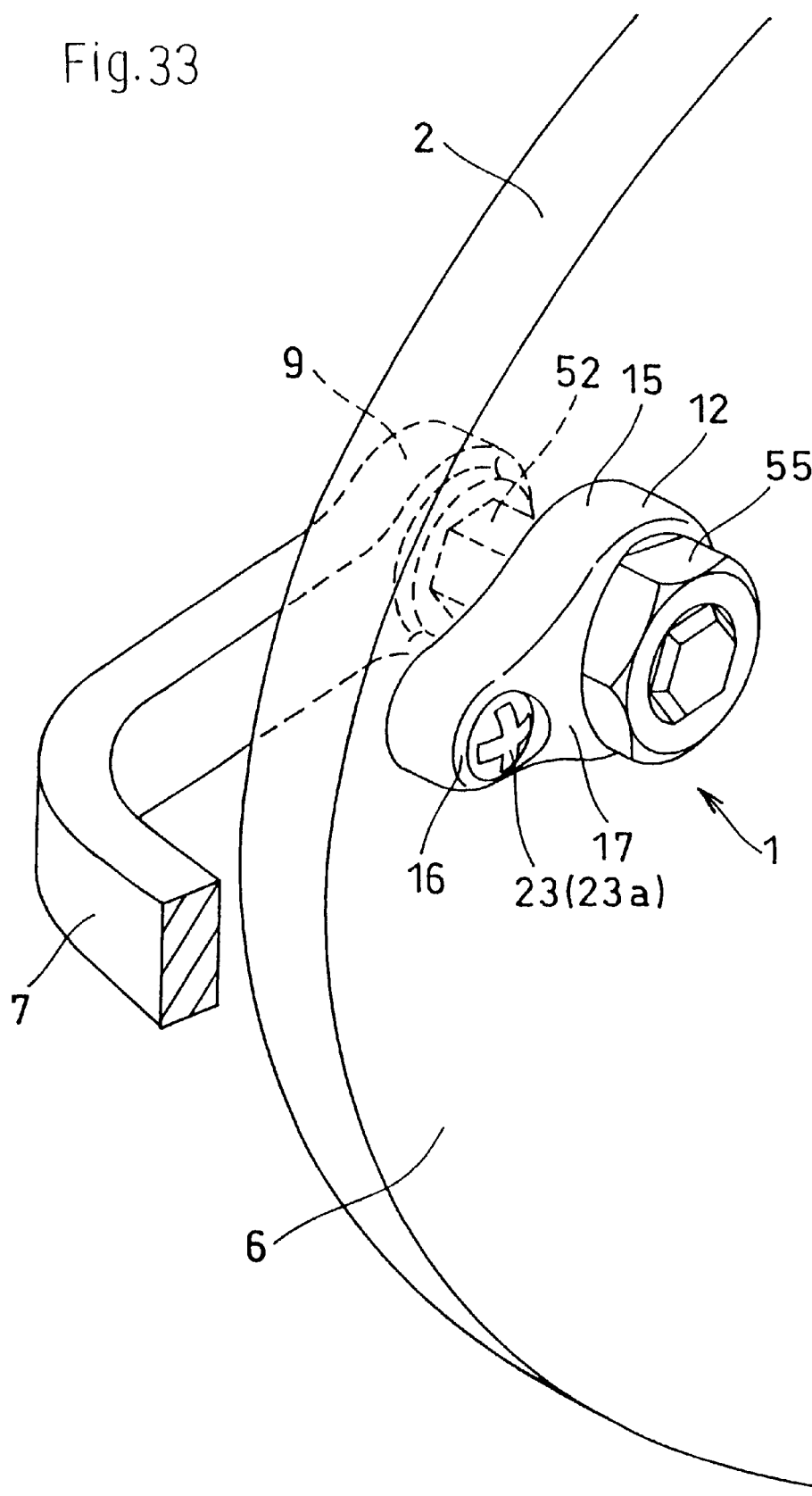
FIG. 33 shows a perspective view of another embodiment of the lens connecting device applied to the bracket.
Figure 34:
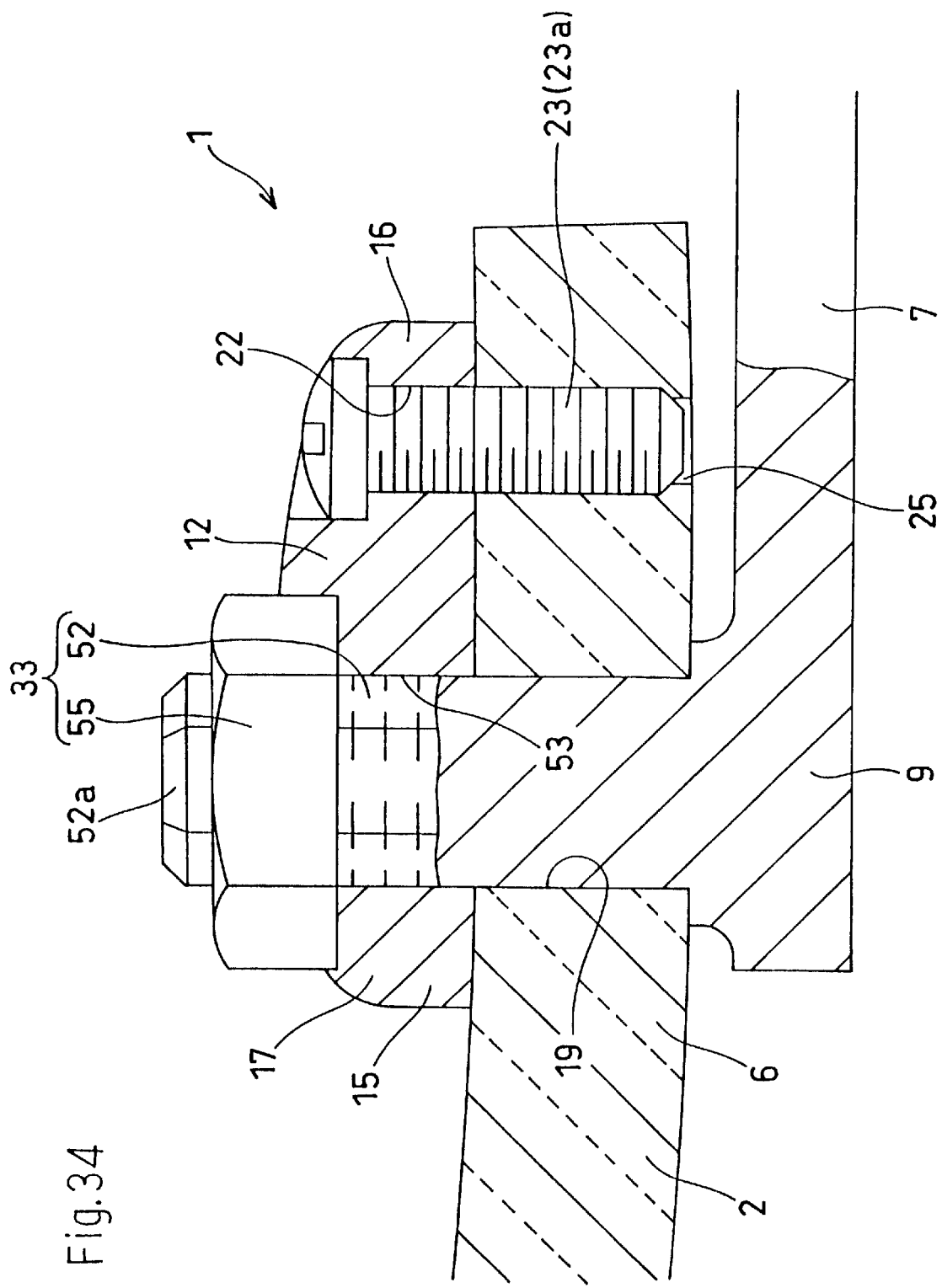
FIG. 34 shows a cross sectional view of the lens connecting device shown in FIG. 33.
Figure 35:
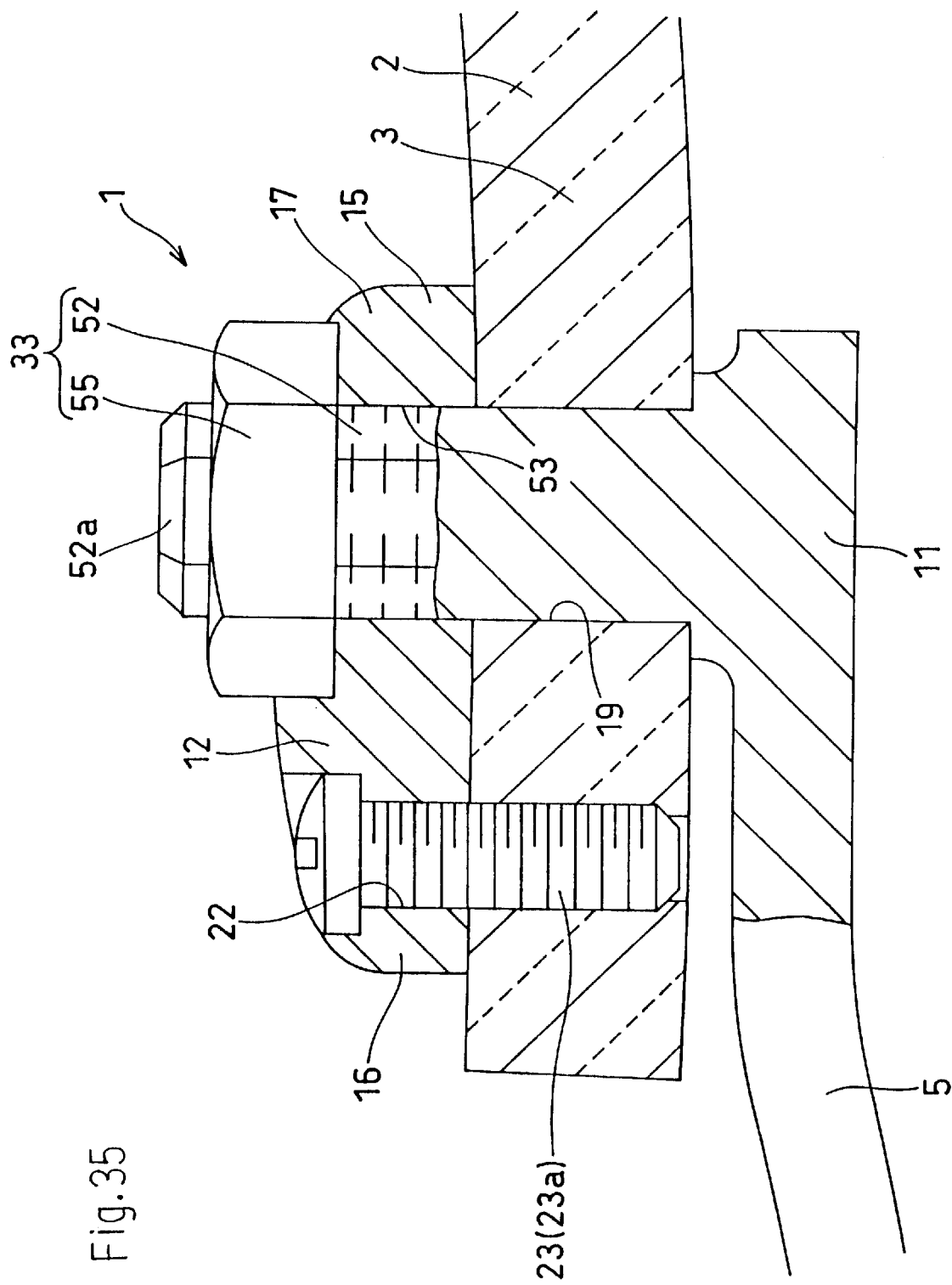
FIG. 35 shows a cross sectional view of another embodiment of the lens connecting device applied to the bridge.
Figure 38:
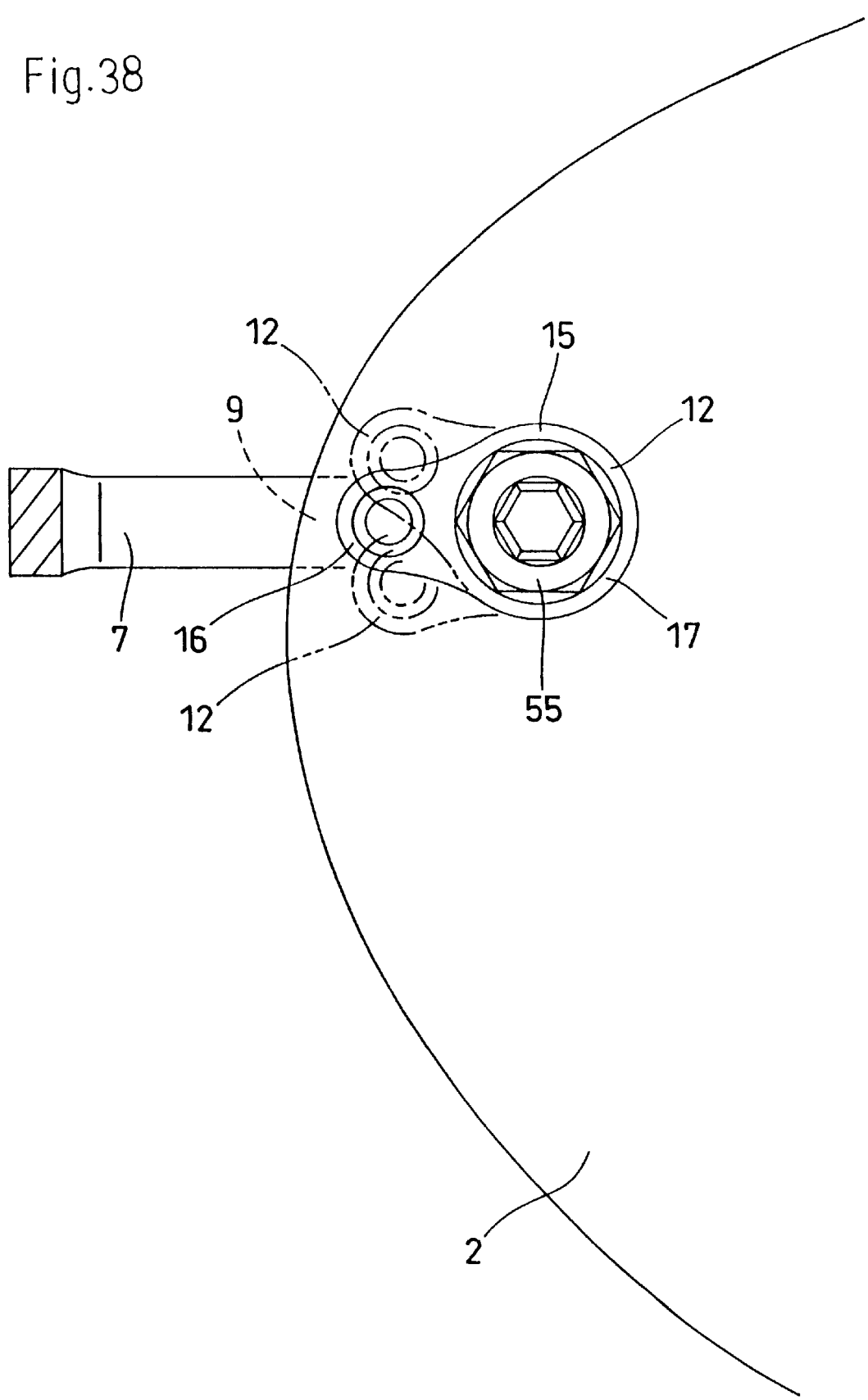
FIG. 38 shows a back view depicting how an angle of the bracket is adjusted.
Figure 39:
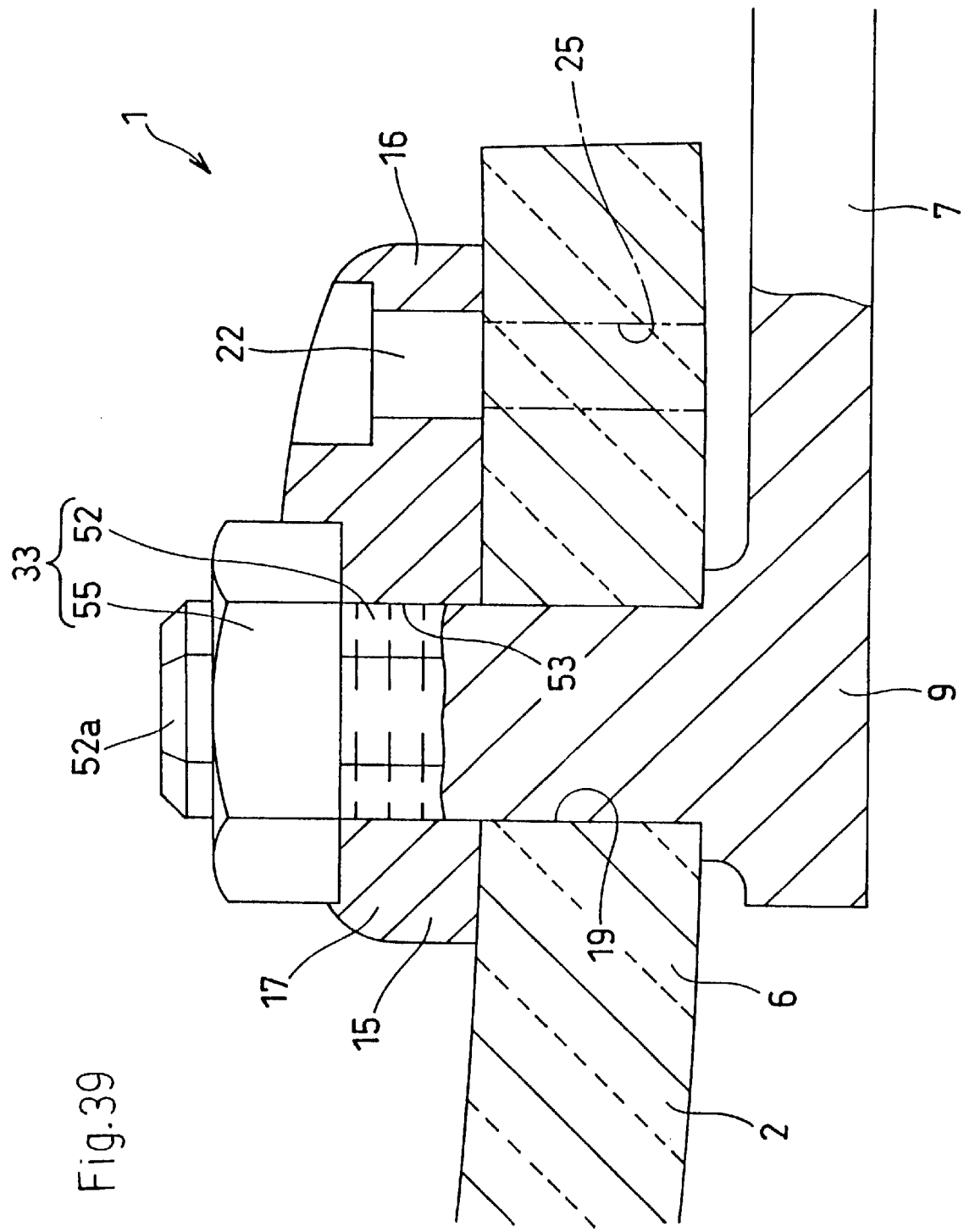
FIG. 39 shows a cross sectional view showing a state of connection of the bracket at an adjusted angle.

Then, when the bracket 7 is rotated around the axis of a connecting opening 19, the connecting means 12 can also rotate together with the bracket 7 in a state of integration. A direction of outward projection of the bracket 7 from the lens 2 after an adjustment of the end part 9 by rotation, for example, is shown in FIG. 38 by a solid line. In a set state shown in FIG. 39, a boring tool such as a drill is inserted into the lens 2 using the detent opening 22 as a guide, as shown by a chain line in FIG. 39, in order to form a opening (provisional opening) 25 for a fixing shaft 23 as a self tapping screw 23*a* to be inserted. Next, as shown in FIG. 34, the self tapping screw 23*a* coming through the detent opening 22 is screwed into the provisional opening 25 and fastened tightly. Consequently, the direction of outward projection of the bracket 7 from the lens is adjusted properly as shown in FIGS. 33, and 34, and the bracket 7 is connected to the lens 2. A method for connecting the end part 11 of the bridge 5 to the lens 2 is similar to a method as in the bracket 7 as described above.

(Fifth Embodiment)

FIGS. 40 to 44 show another embodiment of the lens connecting device 1 according to this invention, which comprises a bracket 7 arranged on the front surface of the lens 2, a bridge 5, and a connecting means 12 arranged on the rear surface of the lens 2.

At each of the end part 9 of the bracket 7 and the end part 11 of the bridge 5, a hexagonal-shaped through opening 60 is provided through which a screw shaft 56 of a connecting screw 59 comprising the screw shaft 56 and a screw head 57 mounted at a tip of the screw shaft 56 can be inserted. A cross sectional view of the screw shaft is hexagonal-shaped.

Further, the connecting means 12 is provided with a Dharma-doll-shaped base plate 17 in which a large-bore base plate portion 15 and the small-bore base plate portion 16 are continued in a same manner as aforementioned. And in the middle of the large-bore base plate portion 15, a hexagonal-shaped through opening 61 is provided through which the screw shaft 56 can be inserted. In the small-bore base plate portion 16, a two-stage detent opening 22 is provided which is structured in the same manner as aforementioned.

Furthermore, in each of an outer edge part 6 and an inner periphery part 3 of the lens 2, a hexagonal-shaped connecting opening 19 is provided through which the screw shaft 56 can be inserted.

When the bracket 7 or the bridge 5 is connected to the lens 2 by using the lens connecting device 1 having the above-mentioned structure, a process described below, referring to the bracket 7 as a representative, is taken. Namely, the through opening 61 provided in the base plate 17, the connecting opening 19 provided in the lens 2 and the insertion opening 60 provided at the end part 9 are relatively positioned so that three those openings can be continued, through which the connecting screw 59 is inserted from a side of the bracket 7, for example. Then a nut 62 is fit to and screwed down to a screw shaft 56a projecting from a front surface of the base plate 17, by which the base plate 17 becomes integrated with the end part 9 via a connecting element 33 comprising the connecting screw 59 and the nut 62. Accordingly, the base plate 17 and the end part 9 do not rotate relatively to each other around an axis thereof, and the base plate 17 and the end part 9 do not come apart.

Figure 40:
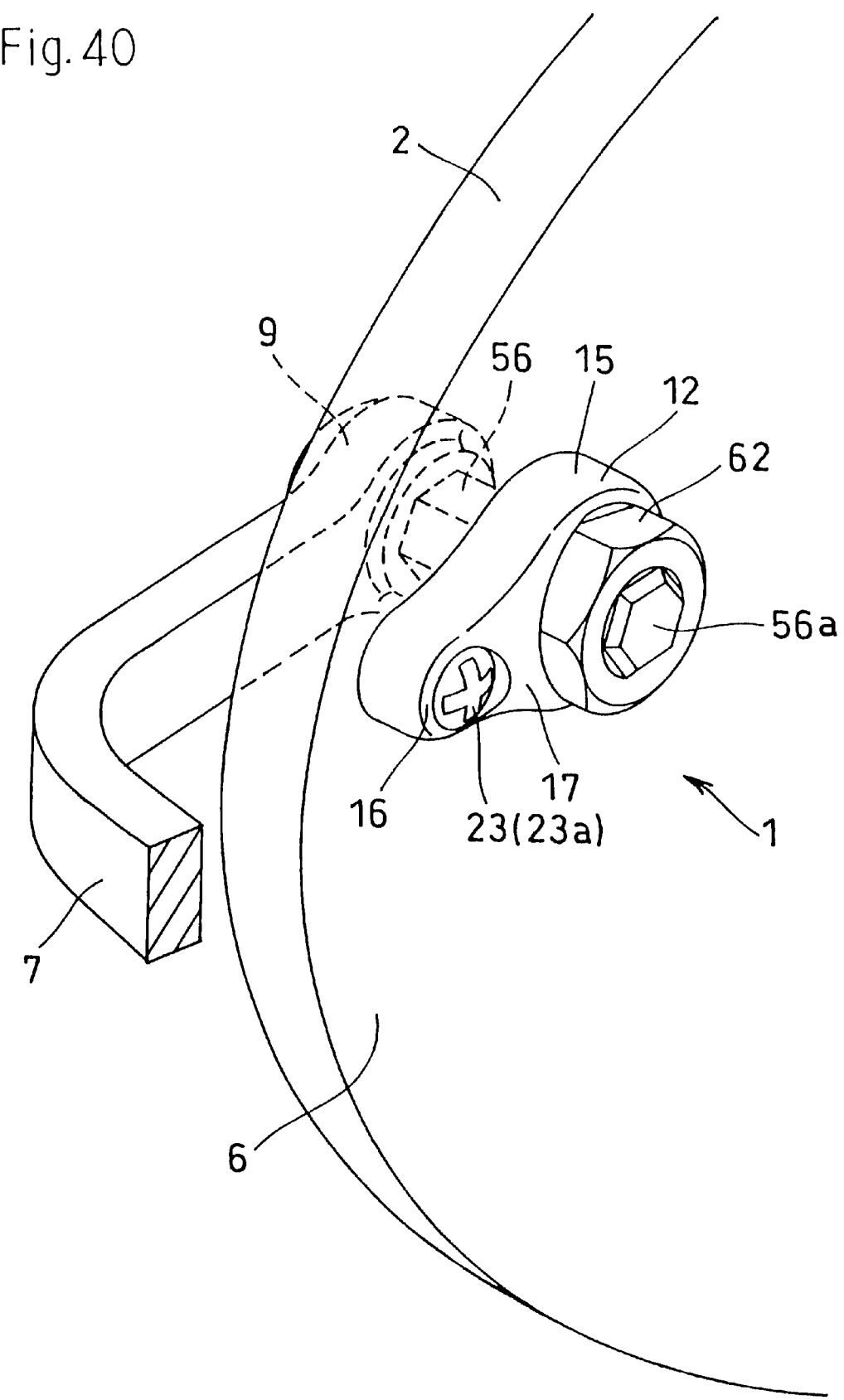
FIG. 40 shows a perspective view of another embodiment of the lens connecting device applied to the bracket.
Figure 41:
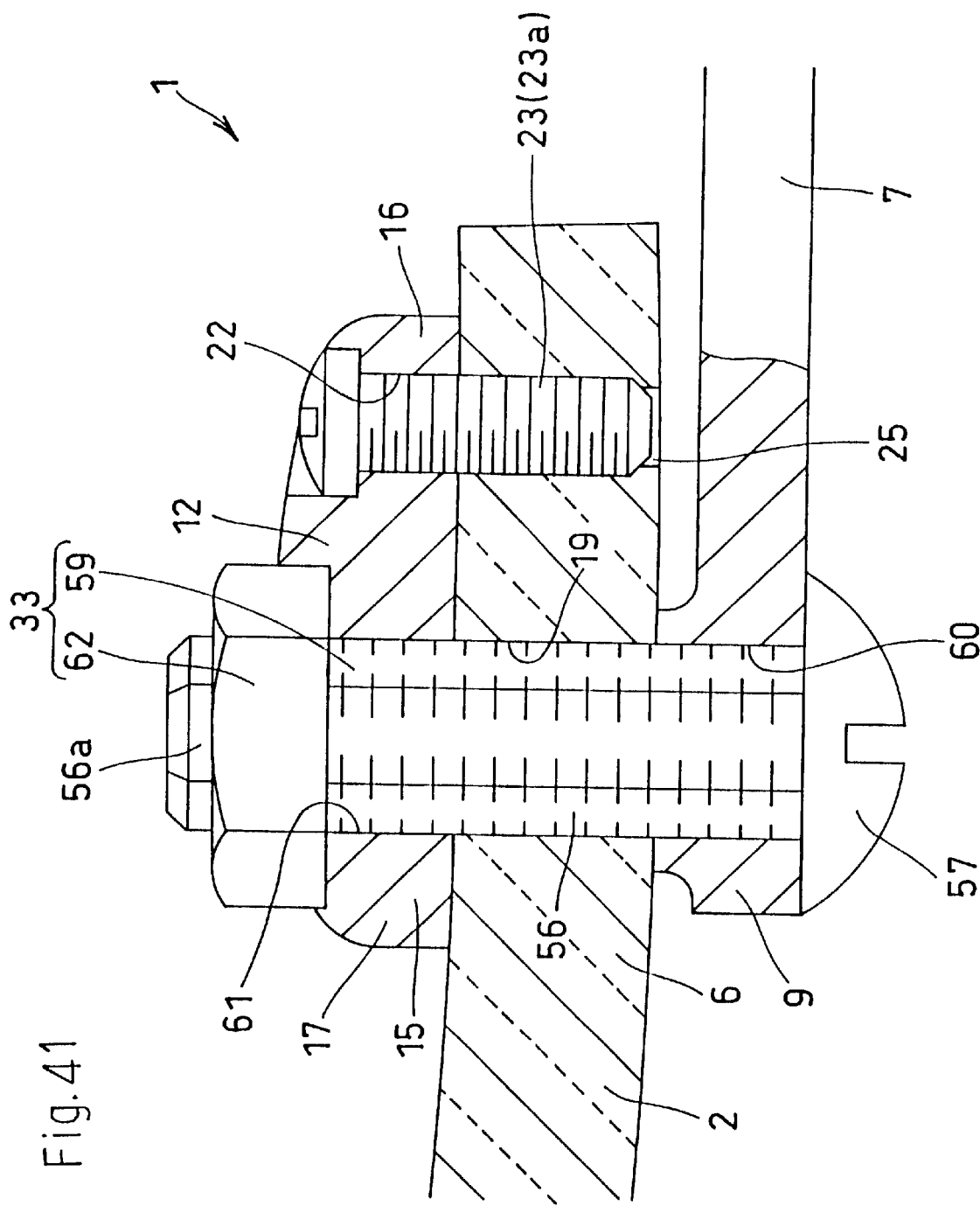
FIG. 41 shows a cross sectional view of the lens connecting device shown in FIG. 40.
Figure 42:
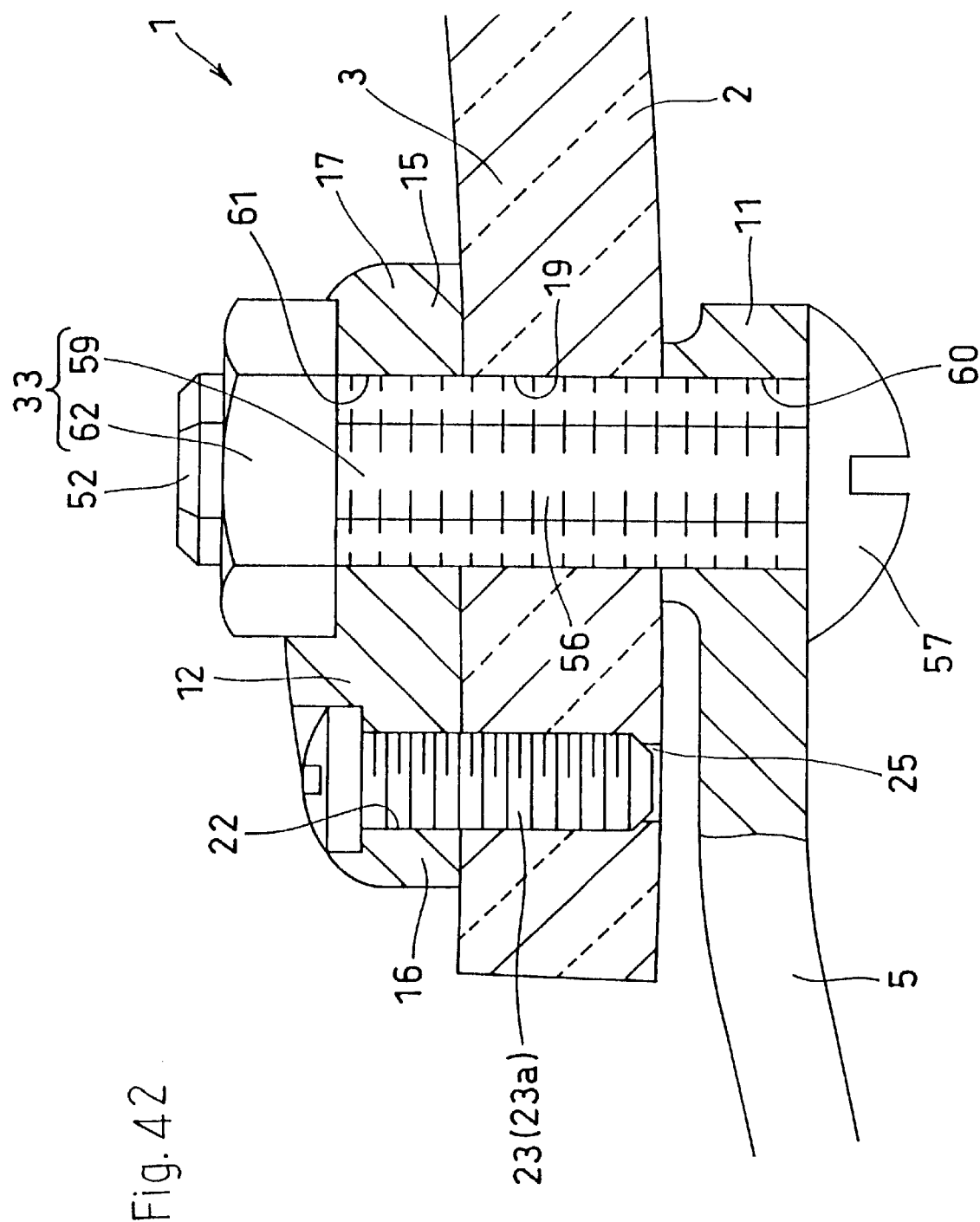
FIG. 42 shows another embodiment of the lens connecting device applied to the bridge.
Figure 43:
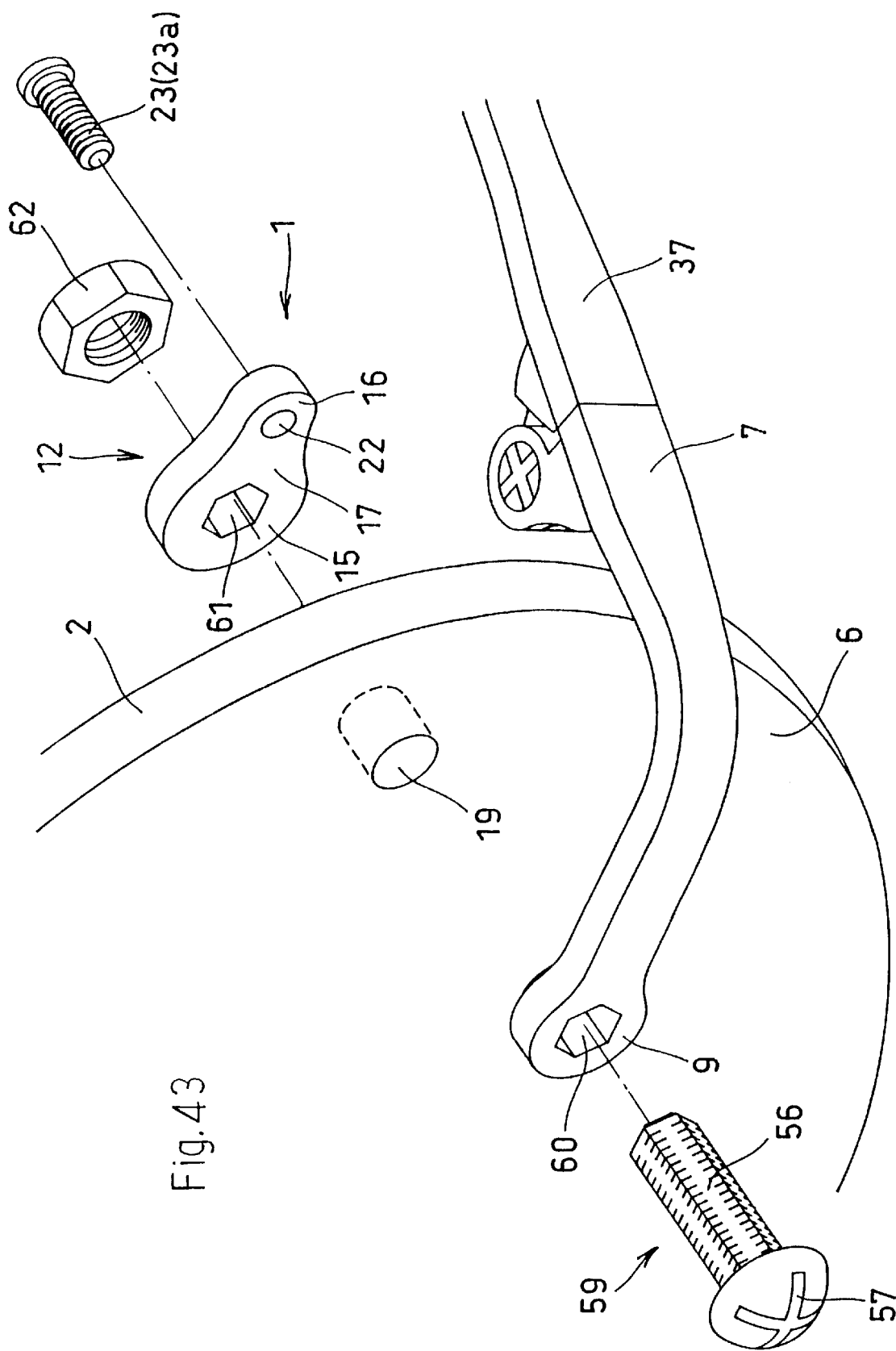
FIG. 43 shows a perspective view of the lens connecting device taken apart, which is applied to the bracket.
Figure 45:
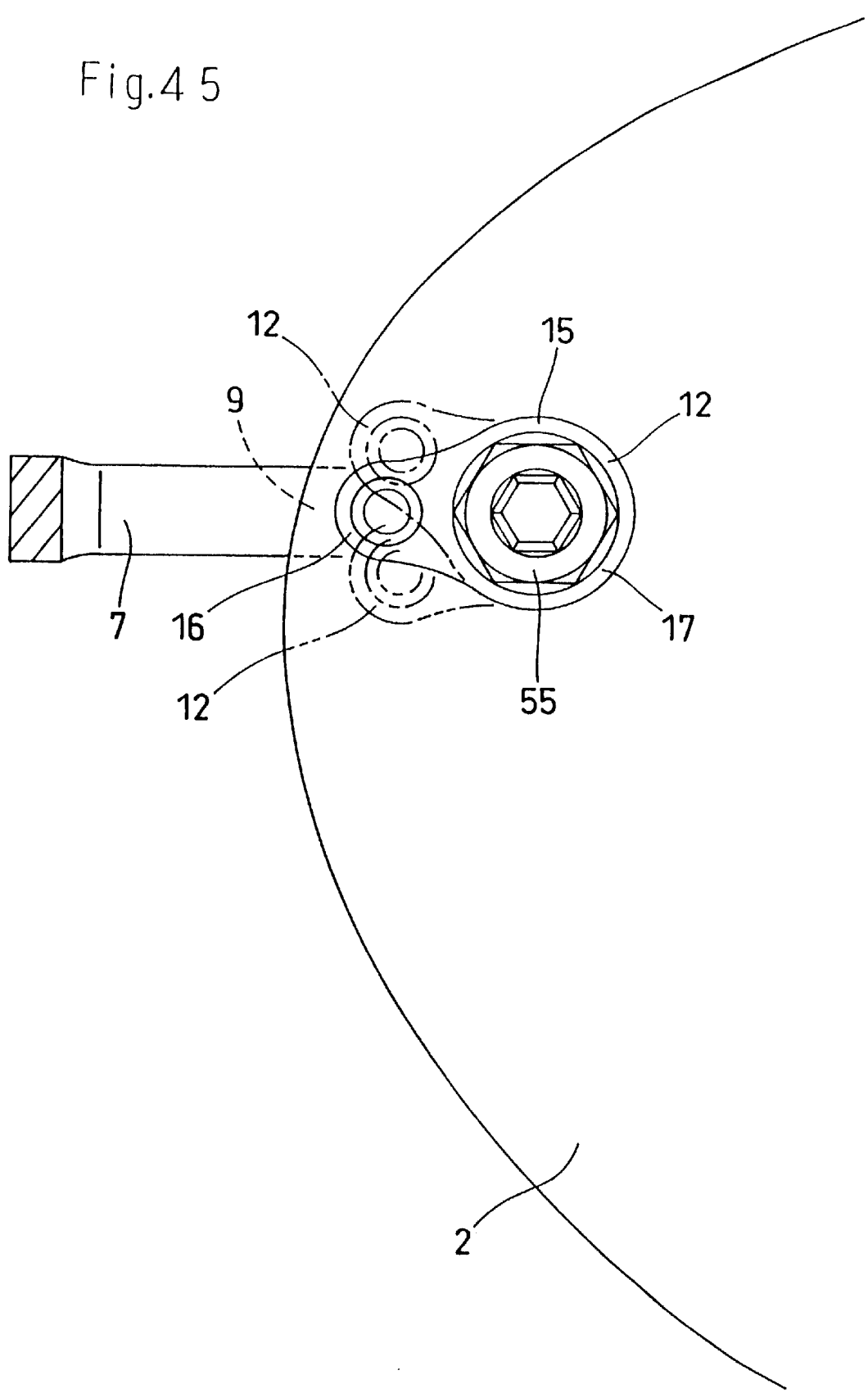
FIG. 45 shows a back view depicting how an angle of the bracket is adjusted.
Figure 46:
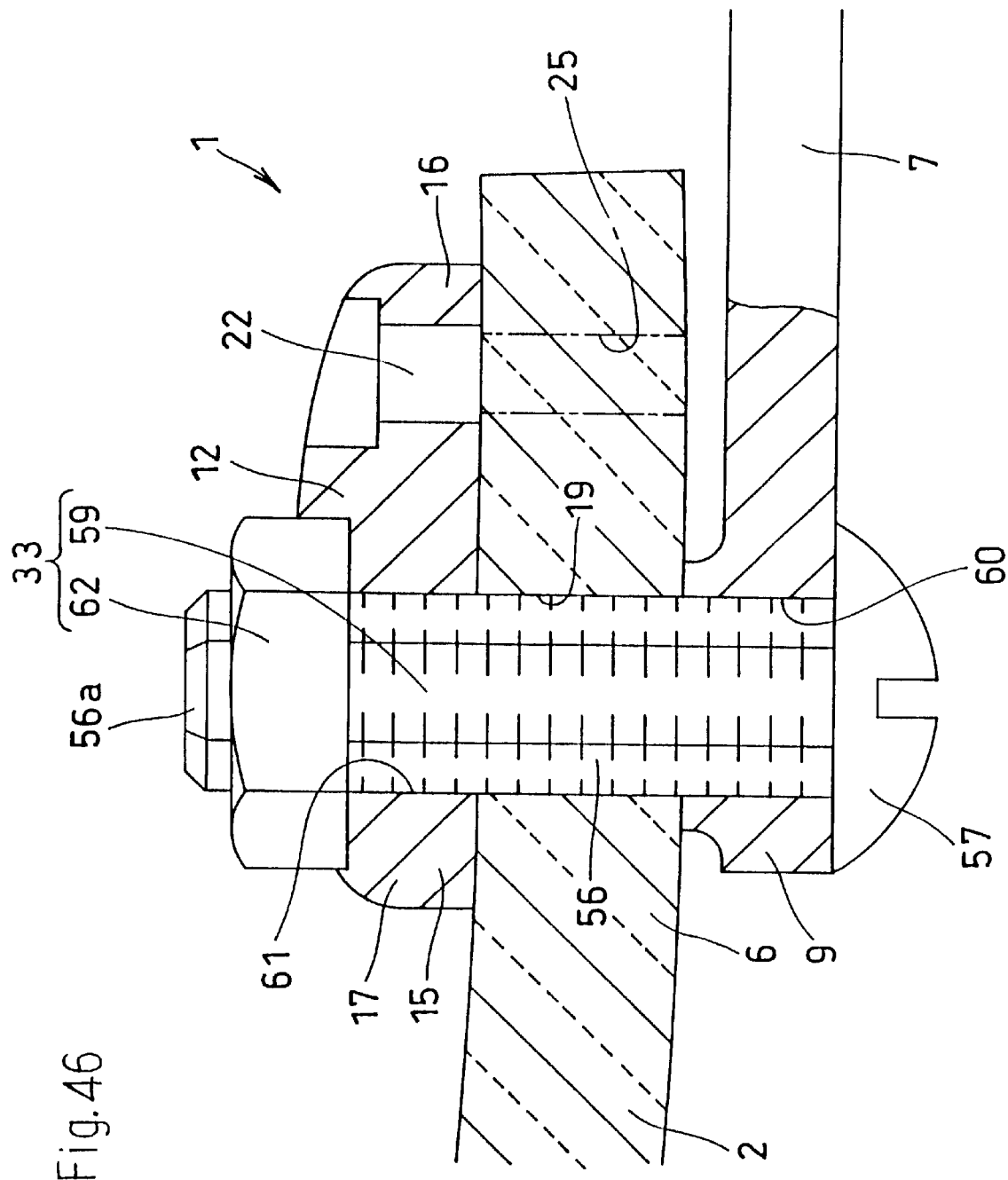
FIG. 46 shows a cross sectional view depicting a state of connection of the bracket at an adjusted angle.

Then, when the bracket 7 is rotated around the axis of the connecting opening 19 as necessity requires, the connecting means 12 can also rotate together with the bracket 7 in a state of integration. A direction of outward projection of the bracket 7 from the lens 2 after an adjustment of the end part 9 by rotation, for example, is shown in FIG. 45 by a solid line. In a set state shown in FIG. 46, a boring tool such as a drill is inserted into the lens 2 using the detent opening 32 as a guide, as shown in FIG. 46, in order to form a opening (provisional opening) 25 for a fixing shaft 23 as a self tapping screw 23a to be inserted. Next, as shown in FIG. 41, the self-tapping screw 23a coming through the detent opening 22 is screwed into the provisional opening 25 and fastened tightly. Consequently, the direction of outward projection of the bracket 7 from the lens is adjusted properly as shown in FIGS. 40, and 41, and the bracket 7 is connected to the lens 2.

Figure 47:
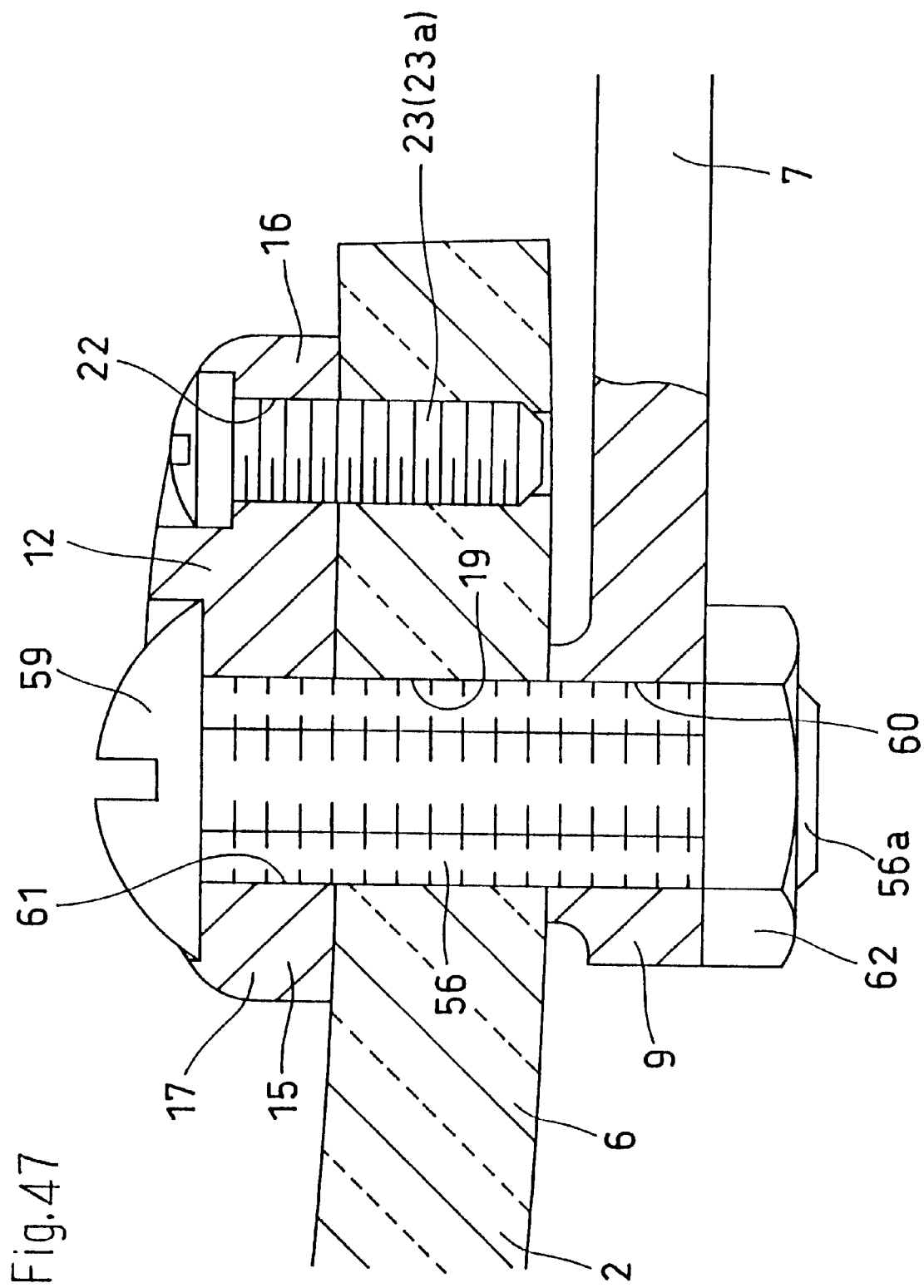
FIG. 47 shows a cross sectional view of another embodiment of a lens connecting device applied to a bracket.

FIG. 47 shows a state in which the connecting screw 59 is inserted from a side of the base plate 17, being an opposite direction of the above-mentioned direction, and the nut 62 is fit and screwed down to the screw shaft 56a projecting from the front surface of the bracket 7. A method for connecting the end part 11 of the bridge 5 to the lens 2 is the same as in a case of the bracket 7.

(The Other Embodiments)

Figure 48:
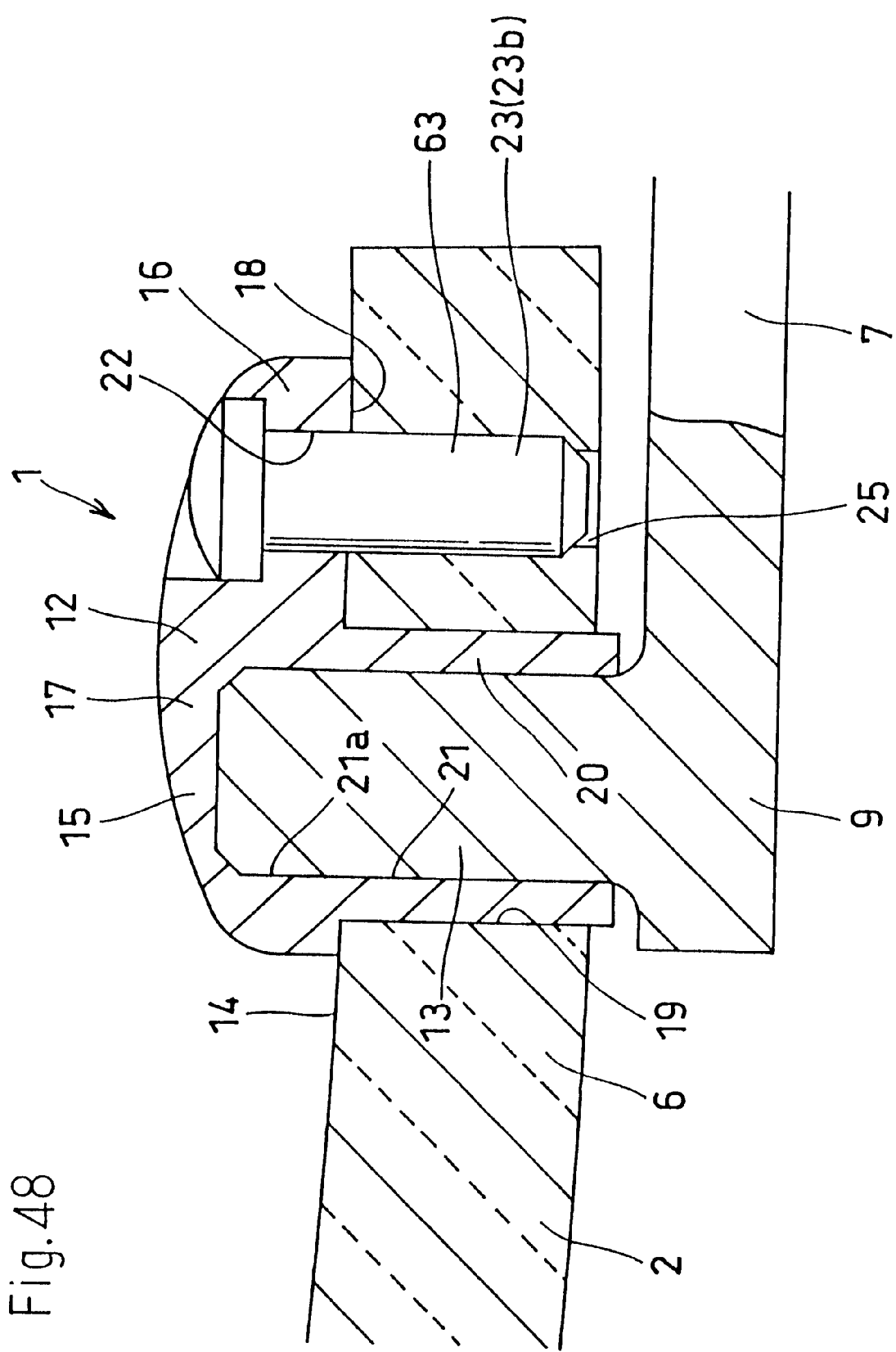
FIG. 48 shows a cross sectional view of the lens connecting device using a fixing pin as a fixing shaft.
Figure 49:
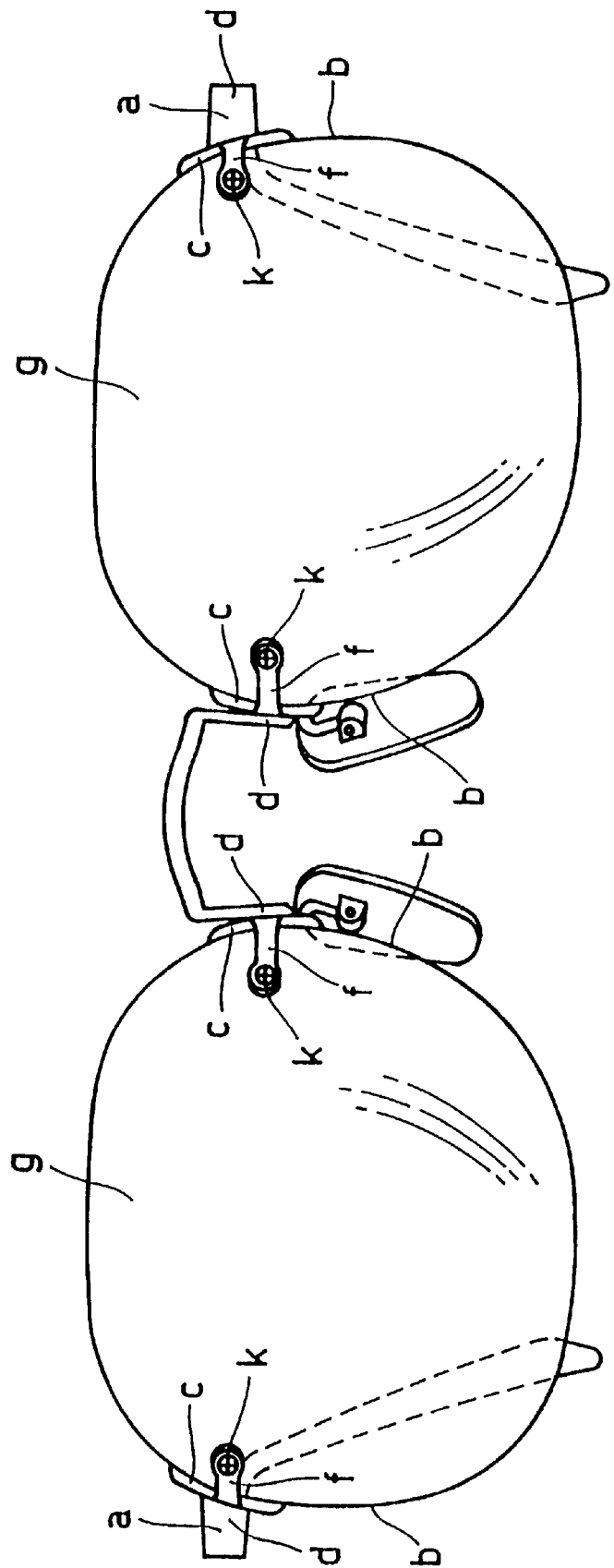
FIG. 49 shows a front view of conventional rimless glasses provided with a contacting piece for detent.
Figure 50:
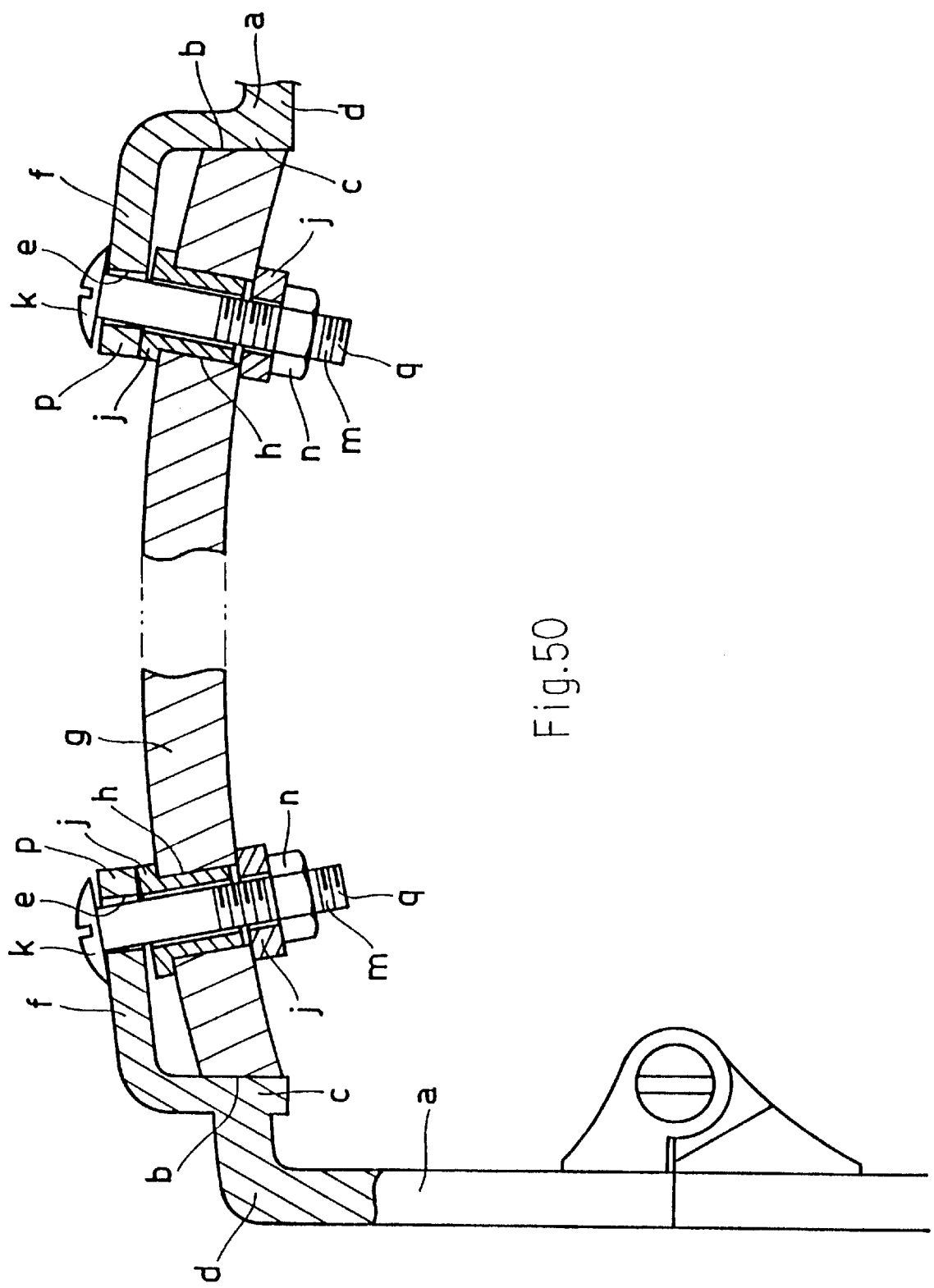
FIG. 50 shows a cross sectional view of the rimless glasses shown in FIG. 49.
Figure 51:
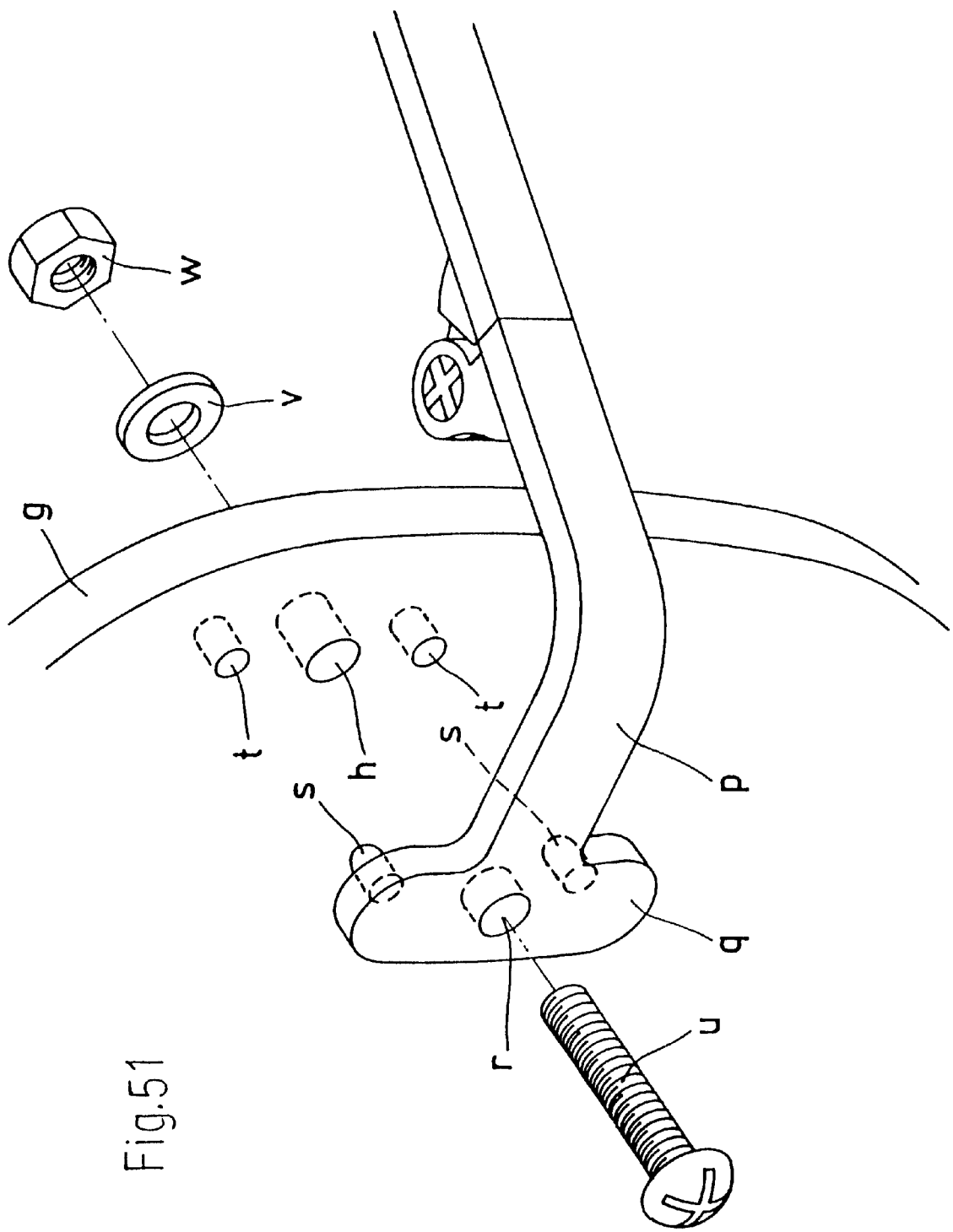
FIG. 51 shows a perspective view of conventional rimless glasses taken apart in which the contacting piece for detent is omitted.

(1) The fixing shaft 23 inserted into the opening 25 may be a fixing pin 23b made of resin, for example, as shown in FIG. 48 as well as the above-mentioned self-tapping screw. The opening 25 is provided in a state so as to be continued with the detent opening 22. When the fixing pin 23b is used, a function of detent of the connecting means 12 can be obtained by pressingly inserting a shaft element 63 of the fixing pin 23b into the opening 25.

(2) The lens connecting means according to this invention may also comprises a screw as a fixing shaft 23, which is inserted through the opening 25 continued with the detent opening 22, and a tip of the screw is screwed down to the above-mentioned end part, meaning an end part 9 of the bracket 7, for example.

(3) The opening 25 which is provided to be continued with the detent opening 22 may be formed as a blind hole as well as being formed to be a through opening which is bored through a lens 2.

(4) The base plate 17 of the connecting means 12 is not necessarily formed to be a Dharma-doll-shaped as described in the above-mentioned descriptions of the embodiments. As far as the detent opening 22 is provided in the edge part of the connecting element, any shape of the base plate and any position of the detent opening 22 may be adopted.

(5) In case the base plate 17 is formed to be a Dharma-doll-shape as described in the above-mentioned descriptions of the embodiments, when the connecting means 12 is mounted to the lens 2, the base plate 17 may be placed sideways in a state that the large-bore base plate portion 15 can be placed on the outer periphery of the lens 2 and small-bore base plate portion 16 on the inner periphery of the lens 2, which is reverse of the above-mentioned arrangements. In that case, as the opening 25 formed having the above-mentioned detent opening as a guide can be positioned away from the edge part of the lens, there is an advantage that the edge part of the lens is not made weakened even when the connecting opening 19 is arranged near the edge part of the lens. The base plate 17 may be arranged in a vertical direction or in slanted direction.

(6) In case the connecting means 12 is placed on a rear surface of the lens, as the base plate 17 can be seen through the lens from a front side, the base plate 17 can be used as a kind of an ornamental piece and the lens can be decorated effectively by designing a shape of the base plate 17 as required.

(7) The bracket 7 and the bridge 5 may be arranged on the rear side of the lens and the connecting means 12 may be arranged on the front side of the lens, which is a reverse state of the above-mentioned embodiments.

Figure 29:
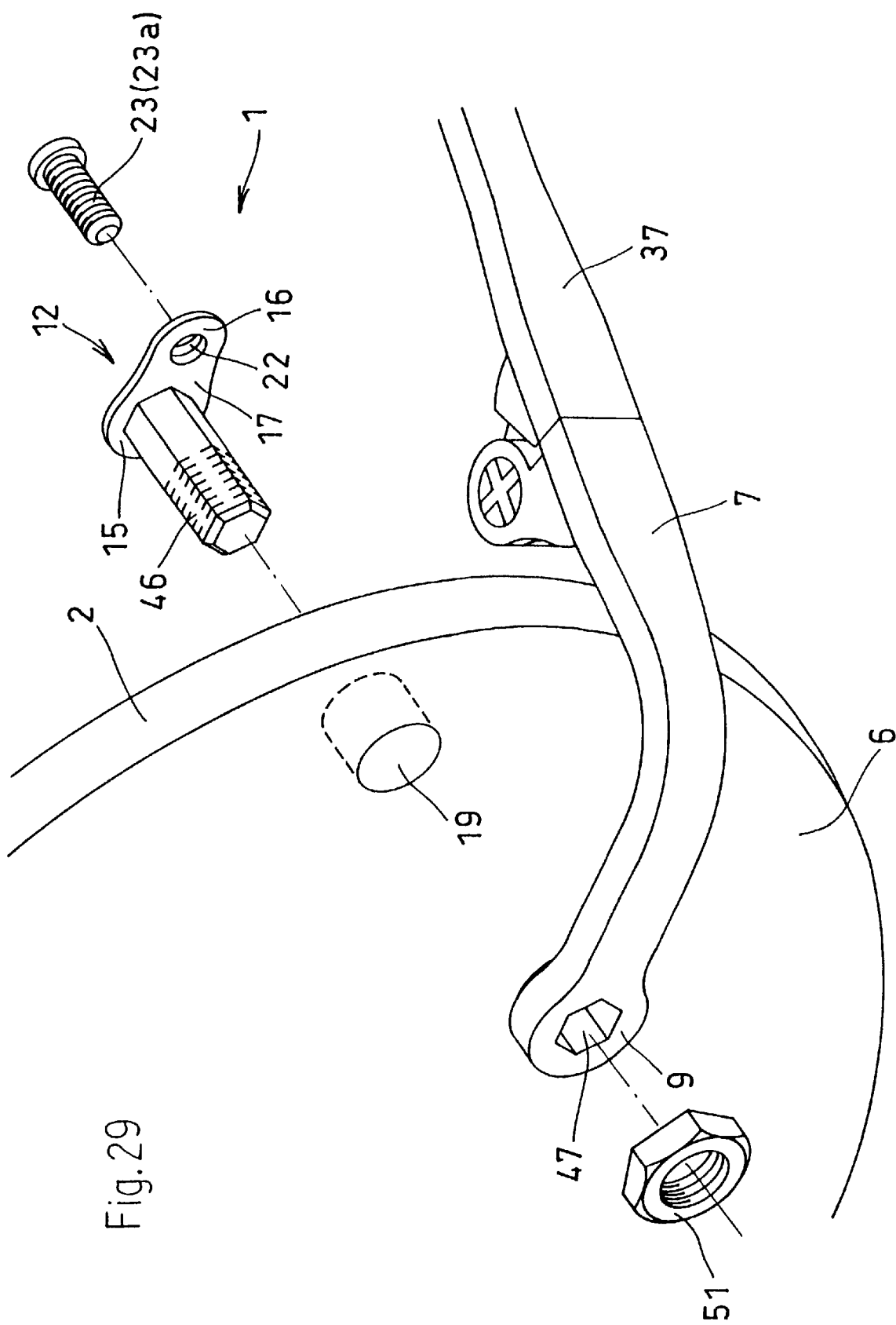
FIG. 29 shows a perspective view of another embodiment of the lens connecting device taken apart, which is applied to the bracket.
Figure 30:
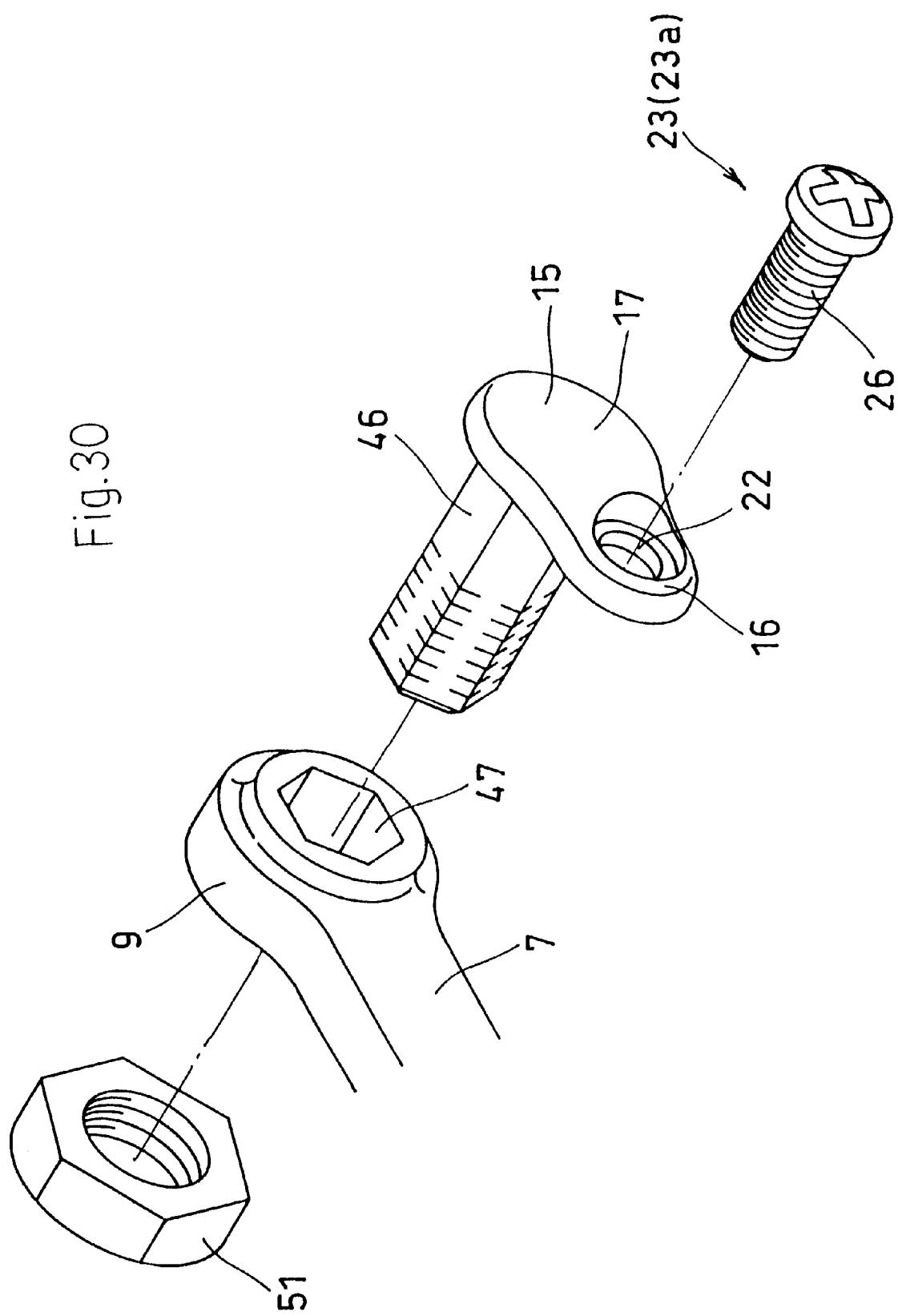
FIG. 30 shows a perspective view of another embodiment of the lens connecting device taken apart, which is applied to the bracket.
Figure 36:
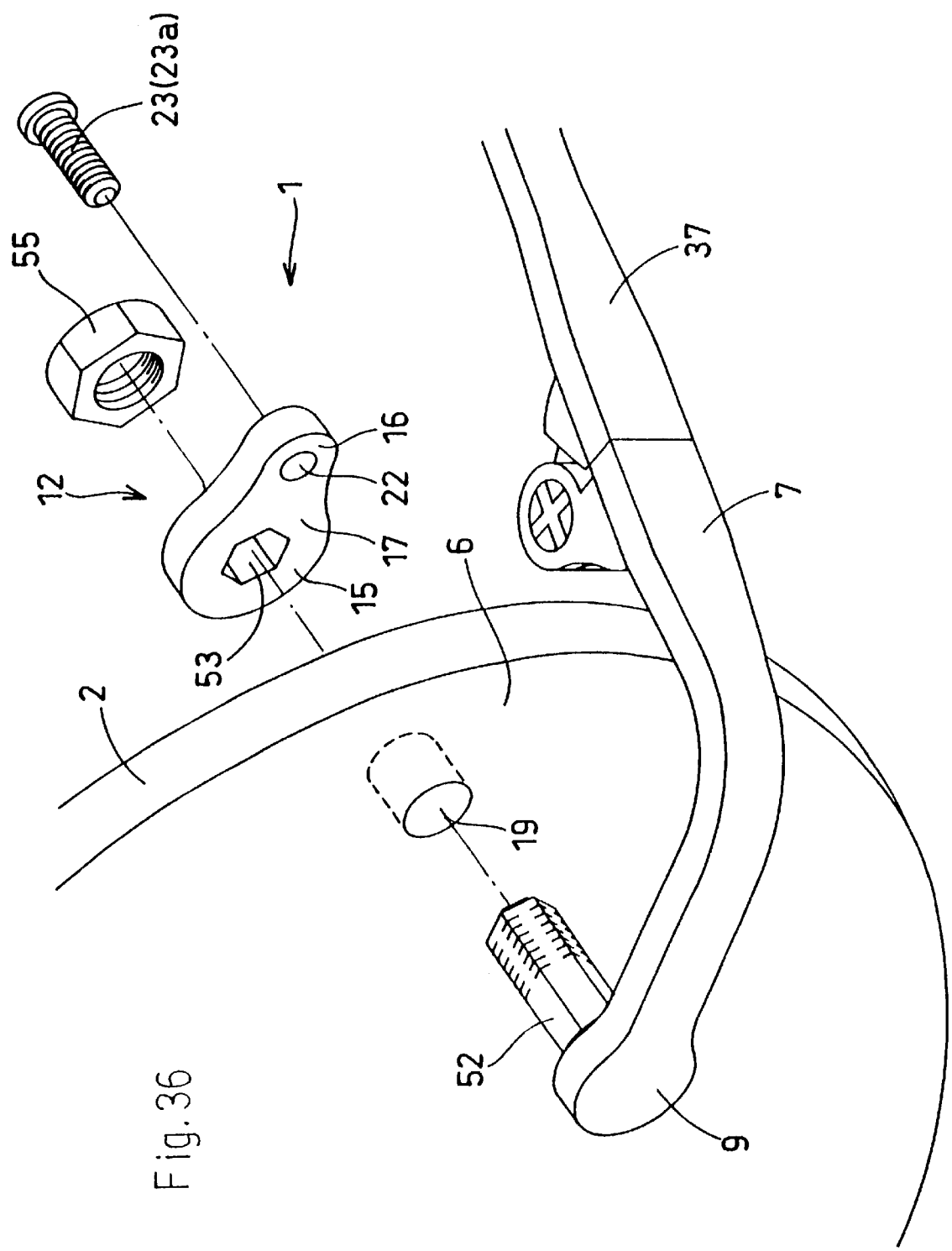
FIG. 36 shows a perspective view of a lens connecting device taken apart, which is applied to the bracket.
Figure 37:
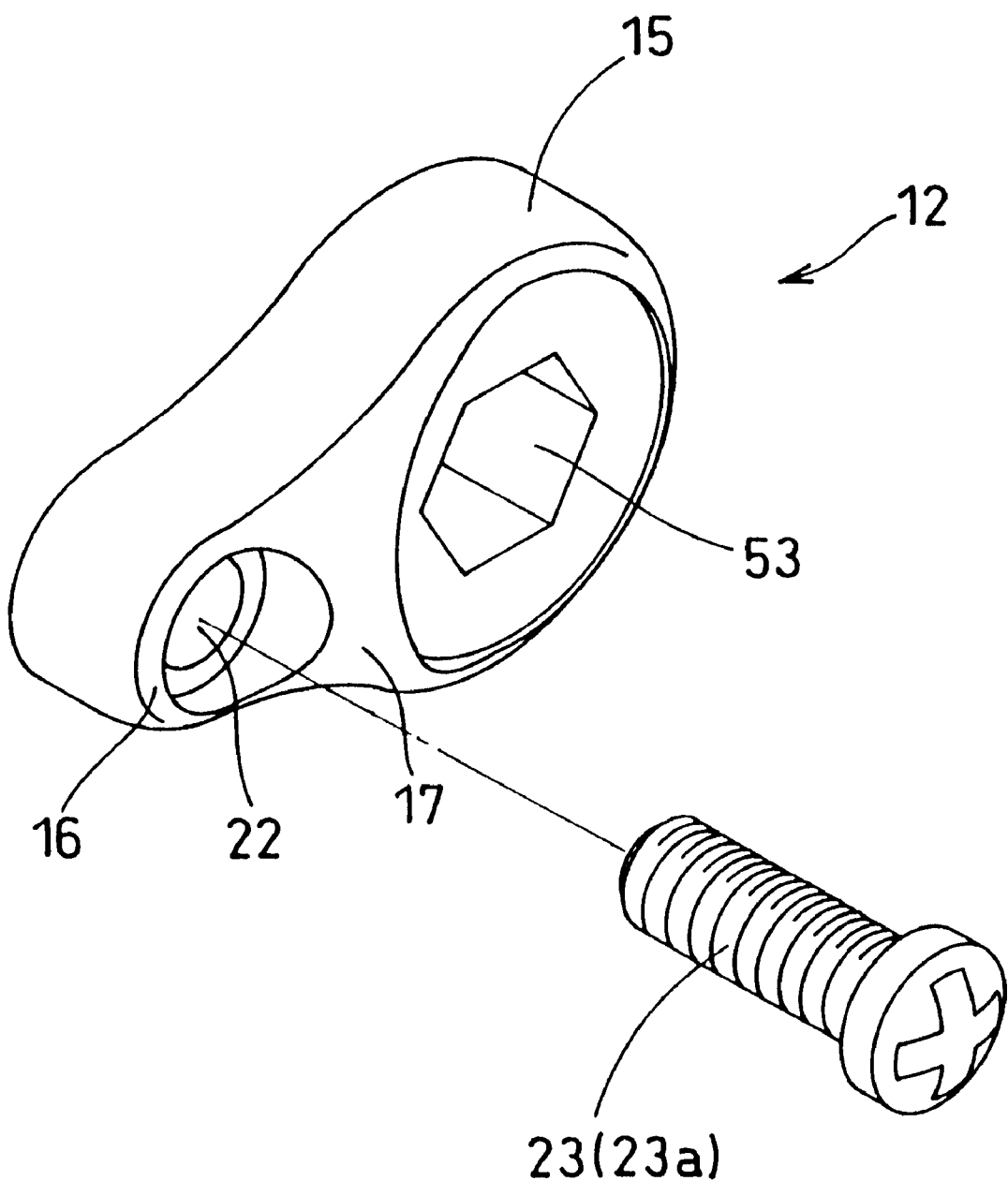
FIG. 37 shows a perspective view of connecting means and a fixing shaft comprising the lens connecting device shown in FIG. 36.
Figure 44:
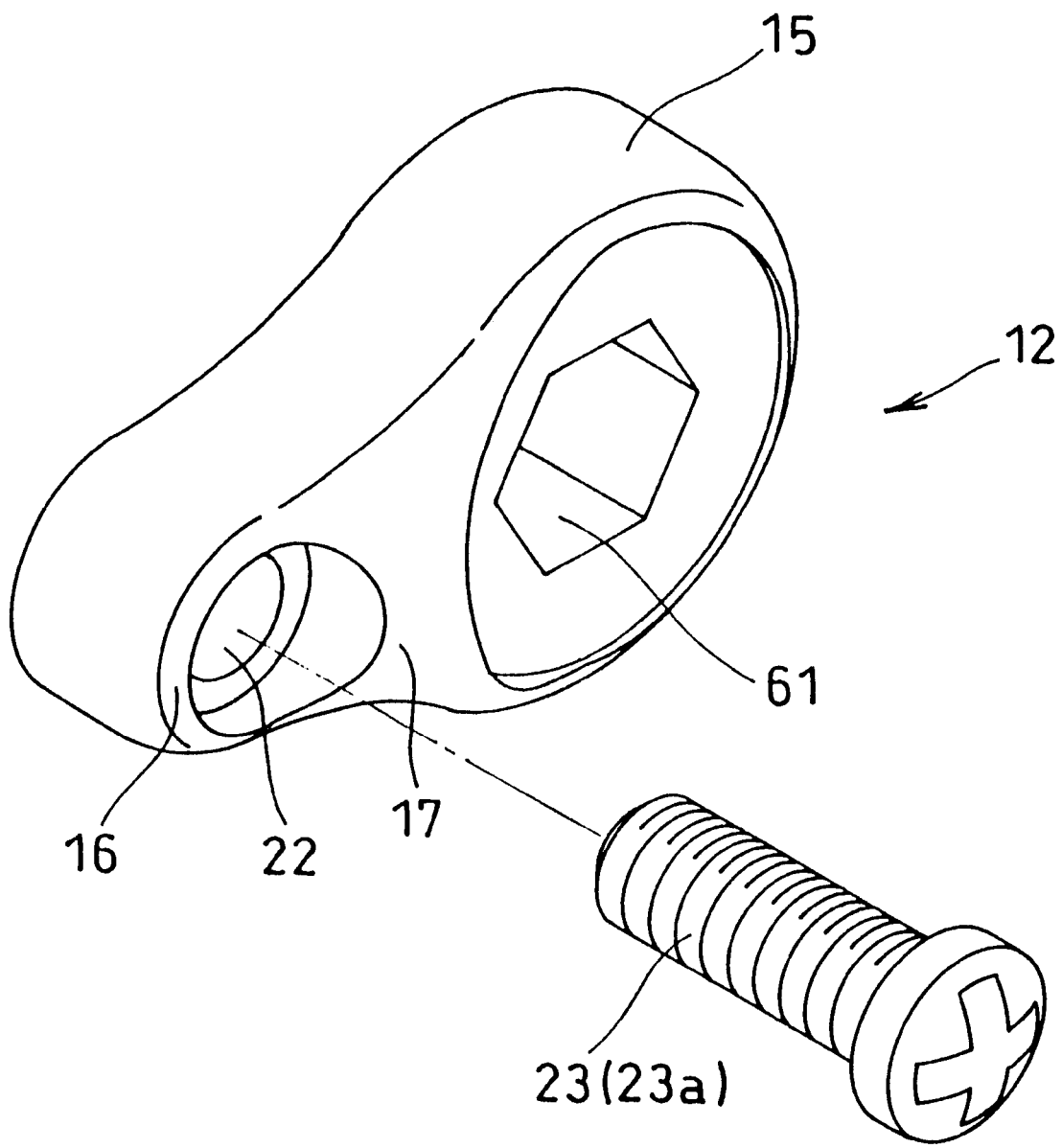
FIG. 44 shows a perspective view of connecting means and a fixing shaft used in the lens connecting device shown in FIG. 43.

(8) As shown in FIGS. 29 and 36, in case the screw shafts 46, 52 are mounted to project onto the base plate 17 and the end part 9 or the end part 11 respectively, a detent function can be obtained between the screw shaft 46 and the end part 9 or the end part 11, and between the screw shaft 52 and the base plate 17. If an engaging state between the screw shaft 52 and the base plate 17 can be obtained in which a detent function can be obtained, a cross sectional view of the screw shaft may not be limited to be hexagonal-shaped. Similarly, a cross sectional view of the screw shaft 56 of the connecting screw 59, which is inserted through the base plate 17 and the end parts 9, 11 as shown in FIG. 44, may not also be limited to be hexagonal-shaped.

(9) A sectional view of the shafts 13, 42 and the insertion openings 21, 40 may also be polygonal shaped, star-shaped, or the other various kinds of shapes as well as the above-mentioned oval-shape, as far as a relative rotation between the base plate and the end parts 21, 40 can be prevented.

(10) In case the connecting element 33 is structured using either one of the screw shafts 46, 52, or the connecting element 33 is structured using the connecting screw 59, a resin cylinder, into which either one of the screw shafts or the connecting screw is inserted, may be arranged through the connecting opening 19 of the lens in order to protect the lens.

What is claimed is:

1. A lens connecting device for rimless glasses in which right and left plastic lenses are connected to each other with a bridge at inside edges of the lenses and an end part of each of brackets is connected to each of outside edges of the lenses, said device comprising;

connecting means for connecting an end part of the bridge and/or an end part of the bracket to the lens; said connecting means having a base plate, a connecting element inserted into a circular-shaped connecting opening which is formed with an edge part of the lens, said base plate being integrated with the end part(s) of the bridge and/or the bracket via the connecting element, a detent opening formed with a suitable portion of the base plate around the connecting element, said base plate also being structured to be rotatable by an axis of the connecting opening in a state that the base plate is integrated with the end part(s) of the bridge and/or the bracket, an opening formed with the lens by means of a drilling tool using the detent opening as a guide means thereto in a state that the end part(s) of the bridge and/or the bracket is(are) rotated and adjusted suitably, and a fixing shaft inserted into the opening and fixing a position of the connecting element.

2. The device as claimed in claim 1, wherein the fixing shaft comprises a self-tapping screw which is screwed into the end part(s) of the bridge and/or bracket.

3. The device as claimed in claim 2, wherein where the bracket and/or the bridge is(are) arranged in front of the lens, the detent opening is provided to be hidden rearwardly of the bracket and/or the bridge in a front view of the glasses.

4. A lens connecting device for rimless glasses in which right and left plastic lenses are connected to each other with a bridge at inside edges of the lenses and an end part of each of brackets is connected to each of outside edges of the lenses, said device comprising;

connecting means for connecting an end part of the bridge and/or an end part of the bracket to the lens; said connecting means having a base plate, said base plate having a cylindrical element which is inserted, in a tight fitting state, into a circular-shaped connecting opening which is formed with an edge part of the lens; said cylindrical element having an insertion opening, a shaft element provided with the end part(s) of the bridge and/or the bracket to project, a connecting element consisting of the cylindrical element and the shaft element, the base plate being integrated with the end part(s) of the bridge and/or the bracket via the connecting element by inserting under pressure the shaft element projecting from the end part(s) of the bridge and/or the bracket, into the insertion opening of the cylindrical element which is inserted into the connecting opening, a detent opening formed with a suitable portion of the base plate around the cylindrical element, the base plate also being structured to be rotatable by an axis of the connecting opening in a state that the base plate is integrated with the end part(s) of the bridge and/or the bracket, an opening formed with the lens by means of a drilling tool using the detent opening as a guide means thereto in a state that the end part(s) of the bridge and/or the bracket is(are) rotated and adjusted suitably, and a fixing shaft inserted into the opening and fixing a position of the connecting element.

5. The device as claimed in claim 4, wherein the connecting means is made of plastics.

6. The device as claimed in claim 5, wherein the base part of the insertion opening is provided to indent the base plate.

7. The device as claimed in claim 6, wherein the fixing shaft comprises a self-tapping screw which is screwed into the end part(s) of the bridge and/or bracket.

8. The device as claimed in claim 7, wherein where the bracket and/or the bridge is(are) arranged in front of the lens, the detent opening is provided to be hidden rearwardly of the bracket and/or the bridge in a front view of the glasses.

9. A lens connecting device for rimless glasses in which right and left plastic lenses are connected to each other with a bridge at inside edges of the lenses and an end part of each of brackets is connected to each of outside edges of the lenses, said device comprising;

connecting means for connecting an end part of the bridge and/or an end part of the bracket to the lens, the connecting means having a base plate from which a shaft element is projecting, the end part(s) of the bridge and/or the bracket having a cylindrical element which is inserted, in a tight fitting state, into a circular-shaped connecting opening which is formed with an edge part of the lens; said cylindrical element having an insertion opening, a connecting element consisting of the cylindrical element and the shaft element, the base plate being integrated with the end part(s) of the bridge and/or the bracket via the connecting element by inserting under pressure the shaft element projecting from the end part(s) of the bridge and/or the bracket, into the insertion opening of the cylindrical element which is inserted into the connecting opening a detent opening formed with a suitable portion of the base plate around the shaft element, the base plate also being structured to be rotatable by an axis of the connecting opening in a state that the base plate is integrated with the end part(s) of the bridge and/or the bracket, an opening formed with the lens by means of a drilling tool using the detent opening as a guide means thereto in a state that the end part(s) of the bridge and/or the bracket is(are) rotated and adjusted suitably, and a fixing shaft inserted into the opening and fixing a position of the connecting element.

10. The device as claimed in claim 9, wherein the cylindrical element is made of plastics.

11. The device as claimed in claim 10, wherein the base part of the insertion opening is provided to indent the end part(s) of the bridge and/or the bracket.

12. The device as claimed in claim 11, wherein the fixing shaft comprises a self-tapping screw which is screwed into the end part(s) of the bridge and/or bracket.

13. The device as claimed in claim 12, wherein where the bracket and/or the bridge is(are) arranged in front of the lens, the detent opening is provided to be hidden rearwardly of the bracket and/or the bridge in a front view of the glasses.

14. A lens connecting device for rimless glasses in which right and left plastic lenses are connected to each other with a bridge at inside edges of the lenses and an end part of each of brackets is connected to each of outside edges of the lenses, said device comprising;

connecting means for connecting an end part of the bridge and/or an end part of the bracket to the lens, the connecting means having a base plate from which a screw shaft is projecting, which screw shaft is inserted into a circular-connecting opening formed with an edge part of the lens; the insertion of the screw shaft being made in an engaging state that detent of the screw shaft and the end part(s) of the bridge and/or the bracket may be carried out by inserting a tip part of the screw shaft into the insertion opening of the end part(s) after inserting the screw shaft into the connecting opening, a nut for the screw shaft, a connecting element consisting of the screw shaft and the nut, the base plate being integrated with the end part(s) of the bridge and/or the bracket via the connecting element by stopping disengagement of the screw shaft by screwing the nut onto the screw shaft projecting from the end part(s), a detent opening formed with a suitable portion of the base plate around the screw shaft, the base plate also being structured to be rotatable by an axis of the connecting opening in a state that the base plate is integrated with the end part(s) of the bridge and/or the bracket, an opening formed with the lens by means of a drilling tool using the detent opening as a guide means thereto in a state that the end part(s) of the bridge and/or the bracket is(are) rotated and adjusted suitably, and a fixing shaft inserted into the opening and fixing a position of the connecting element.

15. The device as claimed in claim 14, wherein the fixing shaft comprises a self-tapping screw, which is screwed into the end part(s) of the bridge and/or bracket.

16. The device as claimed in claim 15, wherein where the bracket and/or the bridge is(are) arranged in front of the lens, the detent opening is provided to be hidden rearwardly of the bracket and/or the bridge in a front view of the glasses.

17. A lens connecting device for rimless glasses in which right and left plastic lenses are connected to each other with a bridge at inside edges of the lenses and an end part of each of brackets is connected to each of outside edges of the lenses, said device comprising;

connecting means for connecting an end part of the bridge and/or an end part of the bracket to the lens, the connecting means having a base plate with which an insertion opening is formed, a screw shaft provided with the end part(s) of the bridge and/or the bracket, which screw shaft is inserted into a circular-connecting opening formed with an edge part of the lens; the insertion of the screw shaft being made in an engaging state that detent of the screw shaft and the base plate may be carried out by inserting a tip part of the screw shaft into the insertion opening of the base plate after inserting the screw shaft into the insertion opening, a nut for the screw shaft, a connecting element consisting of the screw shaft and the nut, the base plate being integrated with the end part(s) of the bridge and/or the bracket via the connecting element by stopping disengagement of the screw shaft by screwing the nut onto the screw shaft projecting from the base plate, a detent opening formed with a suitable portion of the base plate around the insertion opening, the base plate also being structured to be rotatable by an axis of the connecting opening in a state that the base plate is integrated with the end part(s) of the bridge and/or the bracket, an opening formed with the lens by means of a drilling tool using the detent opening as a guide means thereto in a state that the end part(s) of the bridge and/or the bracket is(are) rotated and adjusted suitably, and a fixing shaft inserted into the opening and fixing a position of the connecting element.

18. The device as claimed in claim 17, wherein the fixing shaft comprises a self-tapping screw, which is screwed into the end part(s) of the bridge and/or bracket.

19. The device as claimed in claim 18, wherein where the bracket and/or the bridge is(are) arranged in front of the lens, the detent opening is provided to be hidden rearwardly of the bracket and/or the bridge in a front view of the glasses.

20. A lens connecting device for rimless glasses in which right and left plastic lenses are connected to each other with a bridge at inside edges of the lenses and an end part of each of brackets is connected to each of outside edges of the lenses, said device comprising;

connecting means for connecting an end part(s) of the bridge and/or an end part of the bracket to the lens, a connecting screw having a screw shaft which is inserted into a circular-shaped connecting opening formed with the end part(s), the connecting means having a base plate with which an insertion opening is formed for inserting the screw shaft; the insertion of the screw shaft into the insertion opening being made in an engaging state that detent of the screw shaft and the insertion opening may be carried out, the screw shaft of the connecting screw being structured to be inserted into a tip part of the screw shaft into the insertion opening after inserting the screw shaft into the insertion opening in an engaging that the detent of the screw shaft and the end part(s) may be carried out; the insertion of the screw shaft into the insertion opening of the end part(s) being made in an engaging state that detent of the screw shaft and the end part(s) may be carried out, a nut for the screw shaft, a connecting element consisting of the screw shaft and the nut, the base plate being integrated with the end part(s) of the bridge and/or the bracket via the connecting element by stopping disengagement of the screw shaft by screwing the nut onto the screw shaft projecting from the end part(s), a detent opening formed with a suitable portion of the base plate around the insertion opening, the base plate also being structured to be rotatable by an axis of the connecting opening in a state that the base plate is integrated with the end part(s) of the bridge and/or the bracket, an opening formed with the lens by means of a drilling tool using the detent opening as a guide means thereto in a state that the end part(s) of the bridge and/or the bracket is(are) rotated and adjusted suitably, and a fixing shaft inserted into the opening and fixing a position of the connecting element.

21. The device as claimed in claim 20, wherein the fixing shaft comprises a self-tapping screw, which is screwed into the end part(s) of the bridge and/or bracket.

22. The device as claimed in claim 21, wherein where the bracket and/or the bridge is(are) arranged in front of the lens, the detent opening is provided to be hidden rearwardly of the bracket and/or the bridge in a front view of the glasses.

23. A lens connecting device for rimless glasses in which right and left plastic lenses are connected to each other with a bridge at inside edges of the lenses and an end part of each of brackets is connected to each of outside edges of the lenses, said device comprising;

connecting means for connecting an end part(s) of the bridge and/or an end part of the bracket to the lens; said connecting means having a base plate with which an insertion opening is formed, a connecting screw having a screw shaft, an insertion opening formed with the end part of the lens for inserting the screw shaft of the connecting screw which is inserted into a circular-shaped connecting opening formed with the edge part of the lens; the insertion of the screw shaft being made in an engaging state that detent of the screw shaft and the insertion opening may be carried out, a tip part of the screw shaft of the connecting screw being inserted into the insertion opening of the base plate; the insertion of the screw shaft being made in an engaging that detent of the screw shaft and the base plate may be carried out, a nut for the screw shaft, a connecting element consisting of the connecting screw and the nut, the base plate being integrated with the end part(s) of the bridge and/or the bracket via the connecting element by stopping disengagement of the screw shaft by screwing the nut onto the screw shaft projecting from the end part(s), a detent opening formed with a suitable portion of the base plate around the insertion opening, the base plate also being structured to be rotatable by an axis of the connecting opening in a state that the base plate is integrated with the end part(s) of the bridge and/or the bracket, an opening formed with the lens by means of a drilling tool using the detent opening as a guide means thereto in a state that the end part(s) of the bridge and/or the bracket is(are) rotated and adjusted suitably, and a fixing shaft inserted into the opening and fixing a position of the connecting element.

24. The device as claimed in claim 23, wherein the fixing shaft comprises a self-tapping screw, which is screwed into the end part(s) of the bridge and/or bracket.

25. The device as claimed in claim 24, wherein where the bracket and/or the bridge is(are) arranged in front of the lens, the detent opening is provided to be hidden rearwardly of the bracket and/or the bridge in a front view of the glasses.

26. A method of connecting a lens for rimless glasses in which at least one of a bridge for connecting right and left lenses of plastics and a bracket for connecting a temple to the lens is connected to an inside edge part of the lens or an outside edge part of the lens by means of connecting means which provides a base plate which is structured to be integrated with the end part(s) of the bridge and/or the bracket via s connecting element which is inserted into a circular-shaped connecting opening which is formed with the edge part of the lens, and in which a detent opening is formed with a suitable portion of the base plate around the connecting element so that the base plate may be rotatable about an axis of the connecting opening in a state that the end part(s) of the bridge and/or the bracket are integrated with the base plate, said method comprising the steps of;

forming an opening by means of a drilling tool for inserting a fixing shaft by using the detent opening of the connecting element as a guide means in a state that: the end part(s) of the bridge and/or the bracket is(are) rotated at a suitable angle by the axis of the connecting opening, inserting the fixing shaft into the drilled opening, and then connecting the end part(s) of the bridge and/or the bracket to the lens in a suitable attitude.

* * * * *